United States Patent
Yasuoka et al.

(10) Patent No.: US 8,416,343 B2
(45) Date of Patent: Apr. 9, 2013

(54) SIGNAL PROCESSING APPARATUS AND METHOD, PROGRAM, AND RECORDING MEDIUM

(75) Inventors: Tomohiro Yasuoka, Tokyo (JP); Takafumi Morifuji, Tokyo (JP); Kunio Kawaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/066,504

(22) PCT Filed: Sep. 15, 2006

(86) PCT No.: PCT/JP2006/318372
§ 371 (c)(1),
(2), (4) Date: Mar. 12, 2008

(87) PCT Pub. No.: WO2007/032479
PCT Pub. Date: Mar. 22, 2007

(65) Prior Publication Data
US 2010/0128171 A1    May 27, 2010

(30) Foreign Application Priority Data
Sep. 16, 2005  (JP) .................................. 2005-269565

(51) Int. Cl.
*G03B 13/00* (2006.01)
*H04N 5/232* (2006.01)
*H04N 5/225* (2006.01)

(52) U.S. Cl. ......... 348/448; 348/441; 348/443; 348/447

(58) Field of Classification Search .................. 348/441, 348/443, 447, 448
See application file for complete search history.

(56) References Cited

U.S. PATENT DOCUMENTS

| 6,144,412 | A | * | 11/2000 | Hirano et al. ................. 348/441 |
| 7,082,161 | B2 | * | 7/2006 | Sumiyoshi et al. ...... 375/240.01 |
| 2002/0080269 | A1 | * | 6/2002 | Gotanda et al. ............... 348/448 |
| 2002/0109790 | A1 | * | 8/2002 | Mackinnon .................... 348/699 |
| 2006/0077289 | A1 | * | 4/2006 | Lee et al. ....................... 348/441 |

FOREIGN PATENT DOCUMENTS

| JP | 9 55879 | 2/1997 |
| JP | 9 322126 | 12/1997 |
| JP | 11 69227 | 3/1999 |
| JP | 2002 16944 | 1/2002 |
| JP | 2005 72863 | 3/2005 |

* cited by examiner

*Primary Examiner* — Pankaj Kumar
*Assistant Examiner* — Alazar Tilahun
(74) *Attorney, Agent, or Firm* — Oblon, Spivak, McClelland, Maier & Neustadt, L.L.P.

(57) ABSTRACT

A signal processing device and method, a program, and a recording medium configured so as to be able to detect 2-3 pulldown sequences, from various types of input, in a precise manner. A state estimation unit determines whether or not still positions between 10 fields to be handled fit the still positions of a 2-3 pulldown pattern configured of 12 fields including one sequence, using a difference evaluation value, a threshold value, and feature quantity, calculated by an evaluation value feature quantity calculating unit from the field of an 60I signal from an input terminal, and a field positioned temporally two fields earlier in the field memory, determination is made regarding whether or not a pattern regarding which determination has been made to fit has repeated transition in a transition order which the 2-3 pulldown pattern has for a predetermined number of times or more, and processing of an inverse 2-3 pd conversion unit is controlled according to the results of determination.

11 Claims, 43 Drawing Sheets

FIG. 5
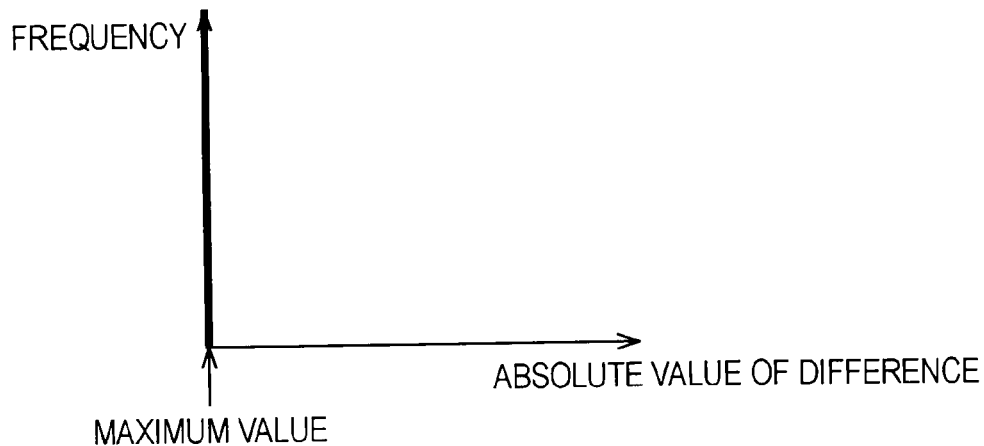
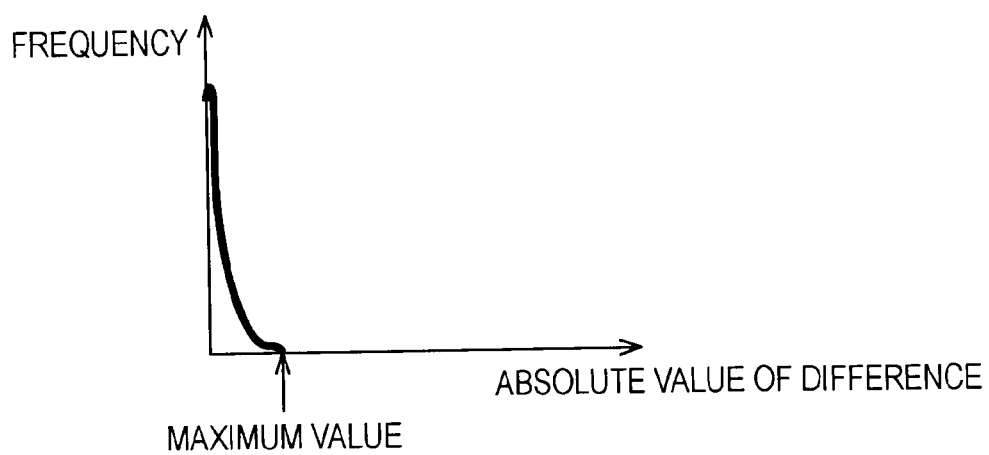
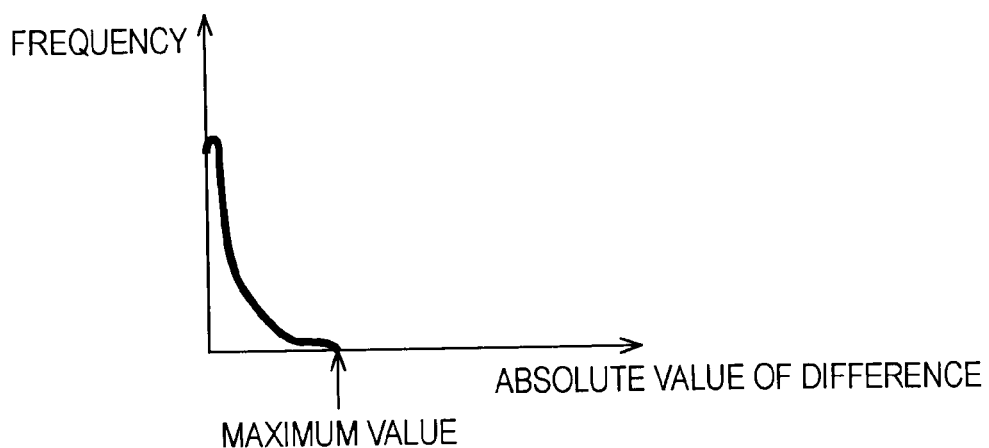

FIG. 19
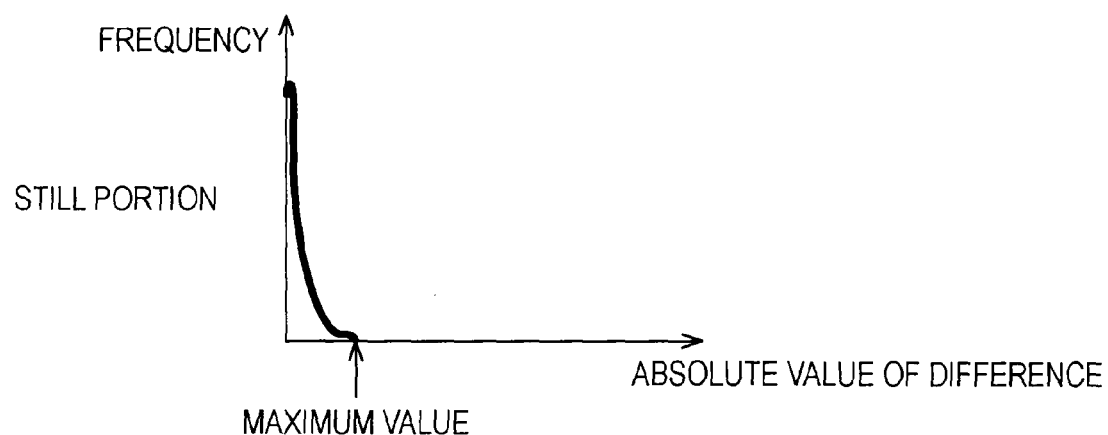
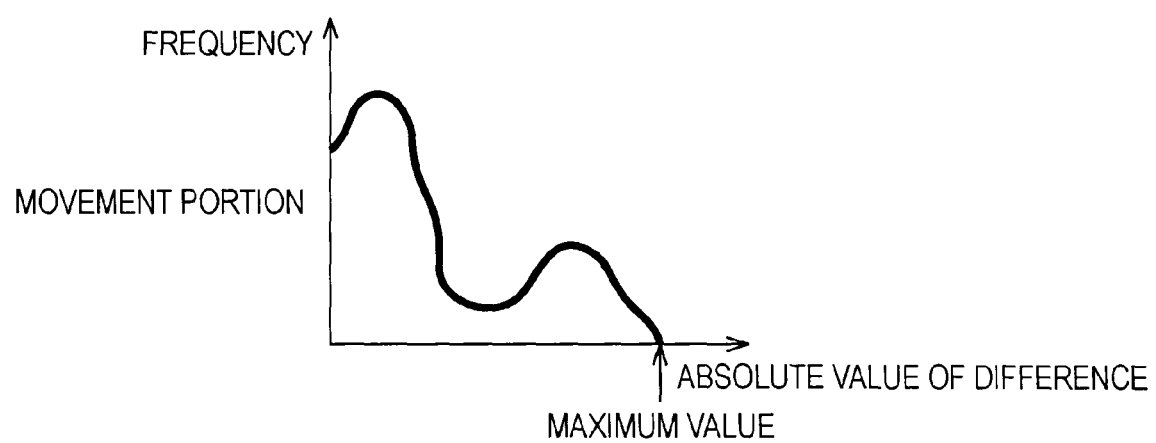

FIG. 24

| PATTERN NO. | | POSITION OF STILL (s) |
|---|---|---|
| 5B | s⟷11 m⟷9 m⟷7 m⟷5 m⟷3⟷1 / 10⟷8⟷6⟷4⟷2⟷0 (m m s m m) | 9,4 |
| 1T | 10⟷8⟷6⟷4⟷2⟷0 / 11⟷9⟷7⟷5⟷3⟷1 | 0,5 |
| 1B | 11⟷9⟷7⟷5⟷3⟷1 / 10⟷8⟷6⟷4⟷2⟷0 | 1,6 |
| 2T | 10⟷8⟷6⟷4⟷2⟷0 / 11⟷9⟷7⟷5⟷3⟷1 | 2,7 |
| 2B | 11⟷9⟷7⟷5⟷3⟷1 / 10⟷8⟷6⟷4⟷2⟷0 | 3,8 |
| 3T | 10⟷8⟷6⟷4⟷2⟷0 / 11⟷9⟷7⟷5⟷3⟷1 | 4,9 |
| 3B | 11⟷9⟷7⟷5⟷3⟷1 / 10⟷8⟷6⟷4⟷2⟷0 | 5,0 |
| 4T | 10⟷8⟷6⟷4⟷2⟷0 / 11⟷9⟷7⟷5⟷3⟷1 | 6,1 |
| 4B | 11⟷9⟷7⟷5⟷3⟷1 / 10⟷8⟷6⟷4⟷2⟷0 | 7,2 |
| 5T | 10⟷8⟷6⟷4⟷2⟷0 / 11⟷9⟷7⟷5⟷3⟷1 | 8,3 |

FIG. 25

|  |  | STATE | | | | |
|---|---|---|---|---|---|---|
|  |  | 1 | 2 | 3 | 4 | 5 |
| PRESENT CURRENT FIELD | 0(T) | { [0,5], | [2,7], | [4,9], | [6,1], | [8,3] } |
|  | 1(B) | { [1,6], | [3,8], | [5,0], | [7,2], | [9,4] } |

122

FIG. 35
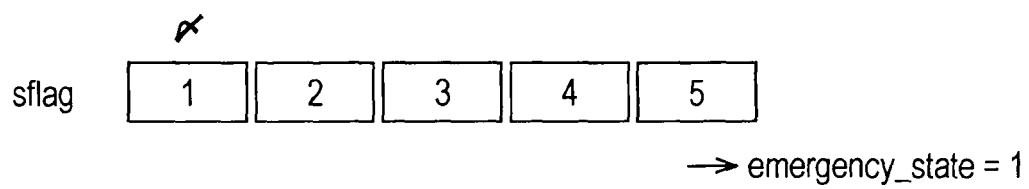
→ emergency_state = 1
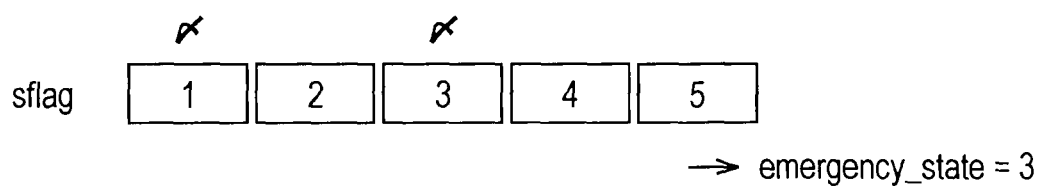
→ emergency_state = 3
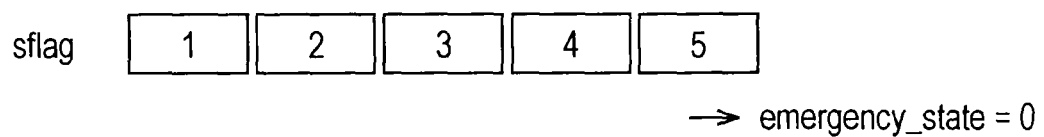
→ emergency_state = 0

SIGNAL PROCESSING APPARATUS AND METHOD, PROGRAM, AND RECORDING MEDIUM

TECHNICAL FIELD

The present invention relates to a signal processing device and method, a program, and a recording medium, and particularly relates to a signal processing device and method, a program, and a recording medium configured so as to be able to detect 2-3 pulldown sequences from 60I signals with an unclear nature in a precise manner.

BACKGROUND ART

For example, 2-3 pulldown conversion processing is used as a technique for converting 24 frame-per-second progressive signals which are the same as film pictures used in recording movies and so forth (24P signals) into 30 frame-per-second interlaced (i.e., 60 field-per-second) signals (60I signals).

As shown in FIG. 1, 2-3 pulldown conversion processing is processing wherein four frames of 24P signals prior to 2-3 pulldown (2-3 pd) are converted into ten fields (five frames) of 60I signals, which is repeated as a sequence, thereby converting 24P signals into 60I signals.

Shown at the upper portion in the example in FIG. 1 are four frames (one sequence) of 24P signals before 2-3 pulldown, along the passage of time t, and below the frames are illustrated ten fields (one sequence) of 60I signals following 2-3 pulldown. The Ts and Bs assigned to the ten fields indicate top fields and bottom fields, respectively.

That is to say, due to 2-3 pulldown conversion (hereafter also simply referred to as 2-3 pulldown), the first frame from the left in 24P signals is converted into the first top field from the left and the second bottom field from the left in the 60I signals. The second frame from the left in 24P signals is converted into the third top field from the left, the fourth bottom field from the left, and fifth top field from the left in the 60I signals. The third frame from the left in 24P signals is converted into the sixth bottom field from the left and the seventh top field from the left in the 60I signals. The fourth frame from the left in 24P signals is converted into the eighth bottom field from the left, the ninth top field from the left, and tenth bottom field from the left in the 60I signals. This conversion processing is repeated as one sequence, as illustrated at the bottom in FIG. 1.

Now, in order to differentiate between cases wherein a set of two fields is converted from a frame and cases wherein a set of three fields is converted from a frame in order to facilitate description, the lower portion of FIG. 1 illustrates the above-described one frame of 24 signals with two squares arrayed vertically, the top field and bottom field of the above-described 60I signals as an upper circle and lower circle arrayed in two tiers, and further, sets of three fields and the pre-conversion frames thereof are hatched. Note that this notation in FIG. 1 will be applied to subsequent drawings of conventional art and drawings of embodiments of the present invention.

Thus, performing 2-3 pulldown results in the same field being repeated twice at a rate of one field every five fields, and further, as a result thereof, the first frame from the left being converted in the order of top field and bottom field but the third frame from the left being converted in the order of bottom field and top field, the positional relation of the fields being shifted.

As can be understood from the above, 60I signals subjected to 2-3 pulldown differ greatly in nature from normal 60I signals (i.e., generated originally as 60I signals), so handling these equivalently is difficult.

Accordingly, a method can be conceived wherein whether or not 60I signals have been subjected to 2-3 pulldown conversion is detected, and processing is adaptively applied according to the results thereof. For example, in the event of estimating the original 24P signals for 60I signals which have been subjected to 2-3 pulldown (i.e., in the event of performing inverse 2-3 pulldown), there is the need to detect the 2-3 pulldown from the 60I signals in a precise manner.

As for such a 2-3 pulldown detection method, there is a method wherein, as shown in FIG. 2, matching fields and the time interval at which the fields appear is obtained, so as to determine which 2-3 pulldown pattern this falls under.

With the example in FIG. 2, the fields of the input 60I signals (above: top fields, below: bottom fields) are shown along the passage of time t.

That is to say, one sequence is shown configured, in order from the left, of a set of two fields made up of a top field and a bottom field, a set of three fields made up of a top field, a bottom field, and a top field, a set of two fields made up of a bottom field and a top field, a set of three fields made up of a bottom field, a top field, and a bottom field, following which the next sequence configured in the same way as this sequence is shown.

As described above, with 60I signals subjected to 2-3 pulldown, two of the same field is repeated in a set of three fields. Accordingly, in order to detect 2-3 pulldown, fields which match between temporally adjacent top fields or temporally adjacent bottom fields can be detected, and the time interval at which the detected fields appear be obtained, thereby determining which 2-3 pulldown pattern this falls under.

For example, in an ideal case for 2-3 pulldown detection, i.e., in a case wherein the 60I signals are digital signals and proper 2-3 pulldown sequences continue, the difference (pixel difference) between matching fields is zero, as shown in FIG. 3. Accordingly, with such an ideal case, detecting matching fields is relatively simple. Also, in this case, matching fields appear at equal intervals, so determining which 2-3 pulldown pattern this falls under is easy.

However, when we consider actual output television signals or output from player devices such as DVD (Digital Versatile Disk) or the like, the difference between fields which should be matching is not necessarily zero.

That is to say, with television signals, there are cases wherein the main feature of the program is 60I signals subjected to 2-3 pulldown, while commercials are 60I signals not subjected to 2-3 pulldown and so forth, with mixed 60I signals of multiple natures.

With DVD as well, there are cases wherein signals of multiple 60I natures coexist as with television signals, such as a case wherein the main feature of the program is 60I signals subjected to 2-3 pulldown and the menu screen is 60I signals not subjected to 2-3 pulldown. Also, with DVD, there are cases wherein exceptional fields shown in FIG. 4 are inserted in the main feature as well due to authoring and the like, and consequently the proper 2-3 pulldown sequence is not maintained.

In light of the above, input of proper 2-3 pulldown sequence 60I signals is rare, so the difference between fields which should be matching is often not zero. Accordingly, detection among matching fields with little movement is difficult, and consequently, detection of whether or not there has been 2-3 pulldown is difficult.

Now, conventionally, there has been proposed a method for detecting between mating fields using a fixed threshold value for 2-3 pulldown detection.

However, the pixel (brightness) difference values for each pixel between fields which originally should match greatly differ depending on the nature of the input 60I signals, as shown in FIG. 5.

FIG. 5 is a diagram illustrating the absolute values of difference of the pixels between fields, and the frequency thereof.

The example in FIG. 5 shows graphs illustrating the absolute values and the frequency thereof for a case wherein the input 60I signals are digital signals, a case of analog signals, and a base of DVD material such as a menu screen for a DVD or the like, in that order from the top of the drawing. With these graphs, the horizontal axes represent the value of absolute difference, and the vertical axes represent the frequency thereof.

In the case of digital signals, the value of absolute difference in pixels between fields is constantly zero. That is to say, the maximum value of value of absolute difference of pixels between the fields is zero in the case of digital signals.

In the case of analog signals, the maximum value of value of absolute difference of pixels between fields is somewhat greater than with the case of digital signals, due to the effects of A/D (Analog/Digital) conversion and white noise. That is to say, value of absolute difference of pixels between the fields is around 5 in the case of analog signals.

In the case of DVD material, the maximum value of value of absolute difference of pixels between fields is considerably greater than with the case of analog signals, due to the effects of MPEG (Moving Picture Experts Group) encoding distortion and the state of authoring. That is to say, value of absolute difference of pixels between the fields is around 40 in the case of DVD material.

Accordingly, in the event that there is a possibility of such signals with different natures being input as 60I signals, setting the threshold value to be used for 2-3 pulldown low, for example, will result in fields to be determined to be matching in the case of DVD material being erroneously determined to be not matching.

Also, setting the threshold value too high may result in fields which should not be determined to be matching being determined as being matching.

Patent Document 1 Japanese Unexamined Patent Application Publication No. 11-69227

DISCLOSURE OF INVENTION

Technical Problem

As described above, conventionally, 2-3 pulldown detection has been performed with a fixed threshold value on 60I signals of various natures, but in the event that television signals are to be handed for example, the threshold value differs for each image according to the nature of the signal, which is digital or analog, so performing 2-3 pulldown in a precise manner has been difficult.

Also, with DVDs such as movies in which 60I signals subjected to 2-3 pulldown are encoded, the degree of effect of MPEG noise differs according to the authoring state, so performing 2-3 pulldown in a precise manner has been difficult.

The present invention has been made in light of the above, and is to enable 2-3 pulldown in a precise manner with regard to various types of input, and perform signal processing effectively according to the detection results.

Technical Solution

The signal processing device according to an aspect of the present invention is a signal processing device for detecting, from input interlaced signals, a sequence in which same fields are repeated at a predetermined rate, the signal processing device including: still/movement determining means configured to determine whether or not there is movement between a predetermined number of input fields, based on the second smallest value of difference evaluation values between fields calculated for each; and sequence detecting means configured to determine whether or not the predetermined number of fields fall under any one of a plurality of patterns classified based on the position of a repeated field in which the same field in the sequence is repeated as to the predetermined number of fields, and have a transition order making transition for each input of a field, based on a still position between fields regarding which determination has been made by the still/movement determining means that the movement is not present, and to determine whether or not the pattern, regarding which determination is made that the predetermined number of fields fall under, is making transition in the transition order from the pattern regarding which determination was made that the predetermined number of fields from a predetermined number of times earlier fall under, thereby detecting the sequence from the interlaced signals.

The sequence detecting means may include: pattern detecting means configured to detect whether or not the predetermined number of fields fall under any one of the plurality of patterns, based on a still position between fields regarding which determination has been made by the still/movement determining means that the movement is not present; and pattern transition determining means configured to determine whether or not the pattern regarding which determination has been made that the predetermined number of fields fall under is making transition in the transition order from the pattern regarding which determination was made that the predetermined number of fields from a predetermined number of times earlier fall under.

The pattern determining means may determine whether or not the predetermined number of fields fall under a pattern, to which the pattern, regarding which determination has been made that the predetermined number of fields from one time earlier fall under, should make transition to next, based on a still position between fields regarding which determination has been made by the still/movement determining means that the movement is not present, and in the event that determination is made that the predetermined number of fields fall under the pattern to which transition should be made next, the pattern determining means count the number of times of consecutive transition; with the pattern transition determining means determining whether or not the number of times of consecutive transition counted by the pattern determining means is equal to or greater than a predetermined number of times, thereby determining whether or not the pattern regarding which determination has been made that the predetermined number of fields fall under is making transition in the transition order from the pattern regarding which determination was made that the predetermined number of fields from a predetermined number of times earlier fall under.

The signal processing device may further include: evaluation value calculating means configured to calculate difference evaluation value between each of the predetermined number of fields; and threshold value calculating means configured to calculate a threshold, based on the second smallest value of difference evaluation values between the fields calculated by the evaluation value calculating means; with the still/movement determining means determining whether or not there is movement in the fields, based on the difference evaluation values between the fields calculated by the evaluation value calculating means, and the threshold value calculated by the threshold value calculating means.

The signal processing device may further include: number-of-movements calculating means configured to calculate the number of fields with movement in the predetermined number of fields, based on the difference evaluation values between the fields calculated by the evaluation value calculating means, and the threshold value calculated by the threshold value calculating means; with the sequence detecting means determining whether or not the predetermined number of fields fall under the pattern, based on the number of fields with movement in the predetermined number of fields, calculated by the number-of-movements calculating means.

The signal processing device may further include: signal processing means configured to perform predetermined signal processing according to the detection results of the sequence performed by the sequence detecting means.

In the event that the sequence has been detected by the sequence detecting means, the signal processing means may perform signal processing to thin the repeated field so as to convert the interlaced signals into progressive signals.

The signal processing device may further include: IP conversion means configured to perform IP (interlaced/progressive) conversion of the interlaced signals into progressive signals; frame rate conversion means configured to perform frame rate conversion of the progressive signals converted by the signal processing means; and signal switchover means configured to switch between the progressive signals converted by the IP conversion means and the progressive signals of which the frame rate has been converted by the frame rate conversion means, in accordance with the sequence detection results performed by the sequence detecting means, and output downstream.

The signal processing method according to an aspect of the present invention is a signal processing method for a signal processing device for detecting, from input interlaced signals, a sequence in which same fields are repeated at a predetermined rate, the method including the steps of: determining whether or not there is movement between a predetermined number of input fields, based on the second smallest value of difference evaluation values between fields calculated for each; determining whether or not the predetermined number of fields fall under any one of a plurality of patterns classified based on the position of a repeated field in which the same field in the sequence is repeated as to the predetermined number of fields, and have a transition order making transition for each input of a field, based on a still position between fields regarding which determination has been made by the still/movement determining means that the movement is not present; and determining whether or not the pattern, regarding which determination is made that the predetermined number of fields fall under, is making transition in the transition order from the pattern regarding which determination was made that the predetermined number of fields from a predetermined number of times earlier fall under, thereby detecting the sequence from the interlaced signals.

The program according to an aspect of the present invention is a program of a signal processing method for a signal processing device for detecting, from input interlaced signals, a sequence in which same fields are repeated at a predetermined rate, the program including the steps of: determining whether or not there is movement between a predetermined number of input fields, based on the second smallest value of difference evaluation values between fields calculated for each; determining whether or not the predetermined number of fields fall under any one of a plurality of patterns classified based on the position of a repeated field in which the same field in the sequence is repeated as to the predetermined number of fields, and have a transition order making transition for each input of a field, based on a still position between fields regarding which determination has been made by the still/movement determining means that the movement is not present; and determining whether or not the pattern, regarding which determination is made that the predetermined number of fields fall under, is making transition in the transition order from the pattern regarding which determination was made that the predetermined number of fields from a predetermined number of times earlier fall under, thereby detecting the sequence from the interlaced signals.

The program recorded in the recording medium according to an aspect of the present invention is a program of a signal processing method for a signal processing device for detecting, from input interlaced signals, a sequence in which same fields are repeated at a predetermined rate, the program including the steps of: determining whether or not there is movement between a predetermined number of input fields, based on the second smallest value of difference evaluation values between fields calculated for each; determining whether or not the predetermined number of fields fall under any one of a plurality of patterns classified based on the position of a repeated field in which the same field in the sequence is repeated as to the predetermined number of fields, and have a transition order making transition for each input of a field, based on a still position between fields regarding which determination has been made by the still/movement determining means that the movement is not present; and determining whether or not the pattern, regarding which determination is made that the predetermined number of fields fall under, is making transition in the transition order from the pattern regarding which determination was made that the predetermined number of fields from a predetermined number of times earlier fall under, thereby detecting the sequence from the interlaced signals.

According to an aspect of the present invention, whether or not there is movement among a predetermined number of input fields is determined, based on the second smallest value of difference evaluation values between fields calculated for each. Whether or not the predetermined number of fields fall under any one of a plurality of patterns classified based on the position of a repeated field in which the same field in the sequence is repeated as to the predetermined number of fields, and have a transition order making transition for each input of a field, is determined, based on a still position between fields regarding which determination has been made by the still/movement determining means that the movement is not present; and whether or not the pattern, regarding which determination is made that the predetermined number of fields fall under, is making transition in the transition order from the pattern regarding which determination was made that the predetermined number of fields from a predetermined number of times earlier fall under, is determined, thereby detecting the sequence from the interlaced signals.

Advantageous Effects

According to an aspect of the present invention, 2-3 pulldown can be detected in a precise manner from various types of input. Thus, signal processing can be effectively performed according to the results of 2-3 pulldown detection.

BRIEF DESCRIPTION OF DRAWINGS

FIG. 5 is a diagram for describing absolute values of difference for each pixel between fields, and the frequency thereof.

FIG. 19 is a diagram for describing absolute value of difference for each pixel between fields.

FIG. 24 is a diagram for describing a still position in the 2-3 pulldown pattern shown in FIG. 11.

FIG. 25 is a diagram for describing the LUT shown in FIG. 16.

FIG. 35 is a diagram for describing an emergency state.

Figure 1:
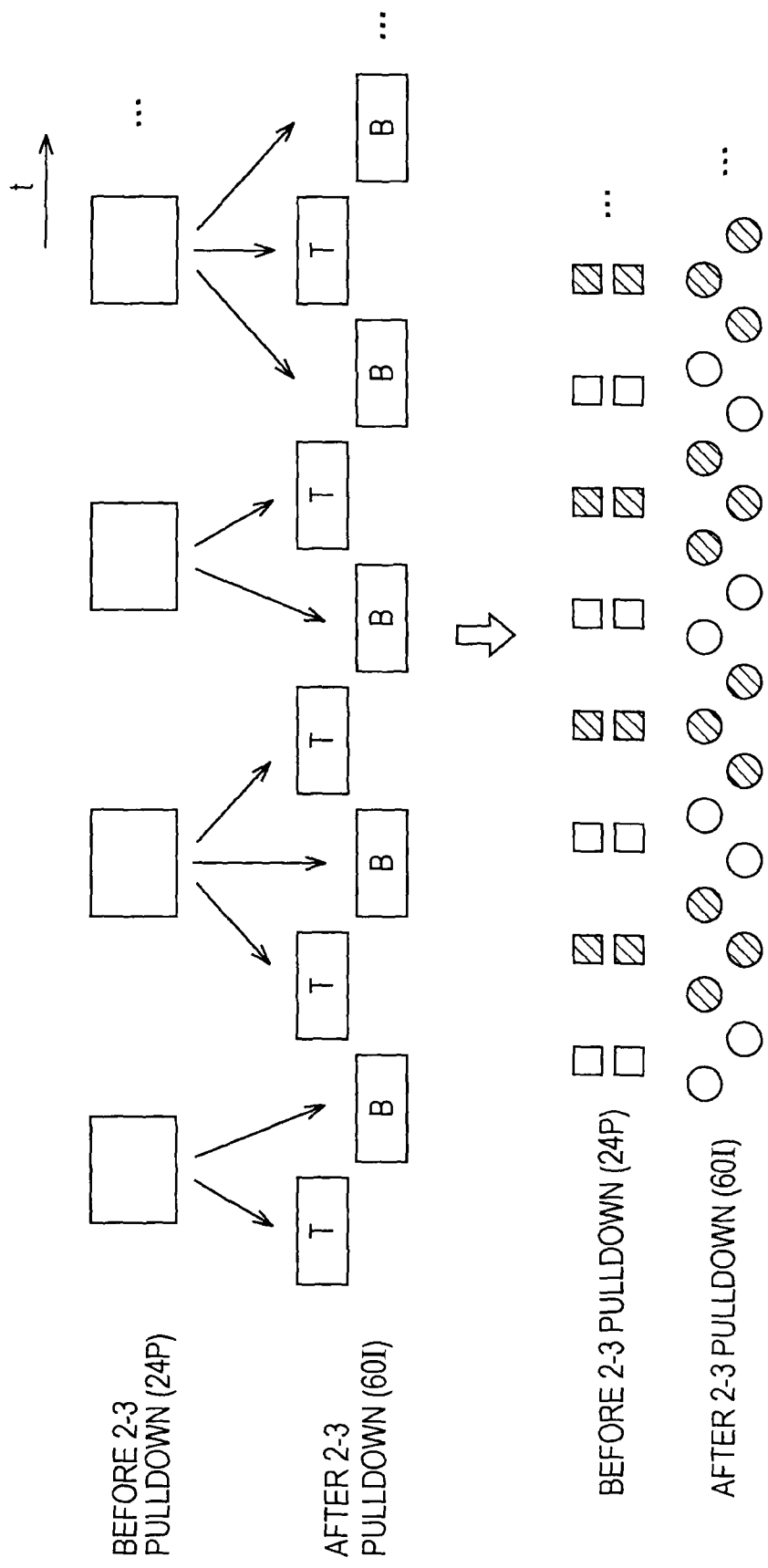
FIG. 1 is a diagram for describing 2-3 pulldown conversion processing.
Figure 2:
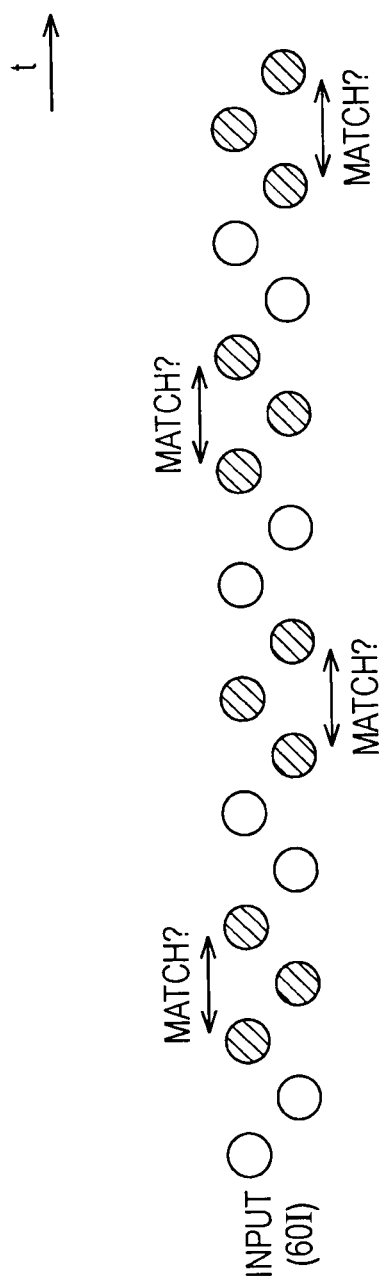
FIG. 2 is a diagram for describing a 2-3 pulldown detection method.
Figure 3:
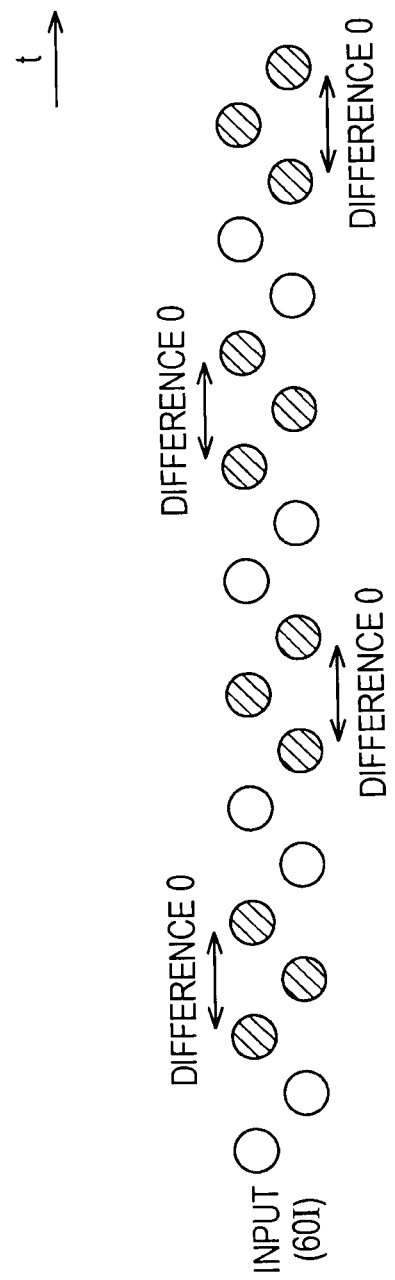
FIG. 3 is a diagram for describing a 2-3 pulldown detection method in a case ideal for 2-3 pulldown detection.
Figure 4:
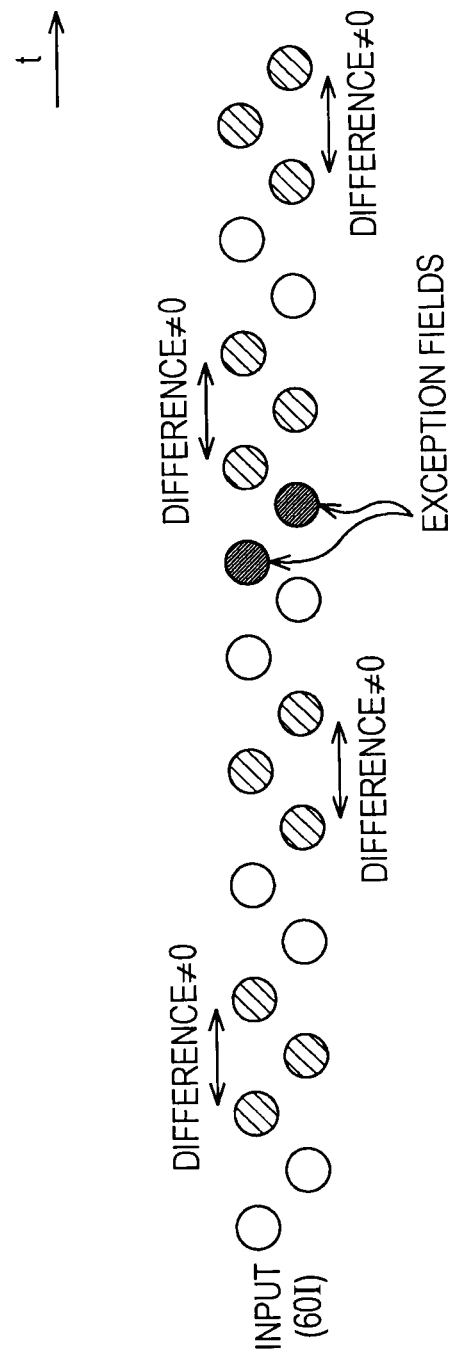
FIG. 4 is a diagram for describing an actual 2-3 pulldown detection method.

EXPLANATION OF REFERENCE NUMERALS 1 signal processing device, 21 2-3 pd determining unit, 22 inverse 2-3 pd conversion unit, 31 field memory, 32 evaluation value feature quantity calculating unit, 33 state estimation unit, 101 difference evaluation value calculating unit, 102 evaluation value memory, 103 threshold value calculating unit, 104 threshold value memory, 105 evaluation value still/movement determining unit, 106 evaluation value table, 107 movement field number calculating unit, 108 movement field number memory, 121 flag setting unit, 122 LUT, 123 state flag memory, 124 state estimation processing unit, 125 number of consecutive successes determining unit, 126 mode setting unit, 201 signal processing device, 211 24P signal generating unit, 212 frame rate conversion unit, 213 delay unit, 214 IP conversion unit, 215 switchover flag generating unit, 216 signal switchover unit

BEST MODE FOR CARRYING OUT THE INVENTION

Embodiments of the present invention will be described below with reference to the drawings.

Figure 6:
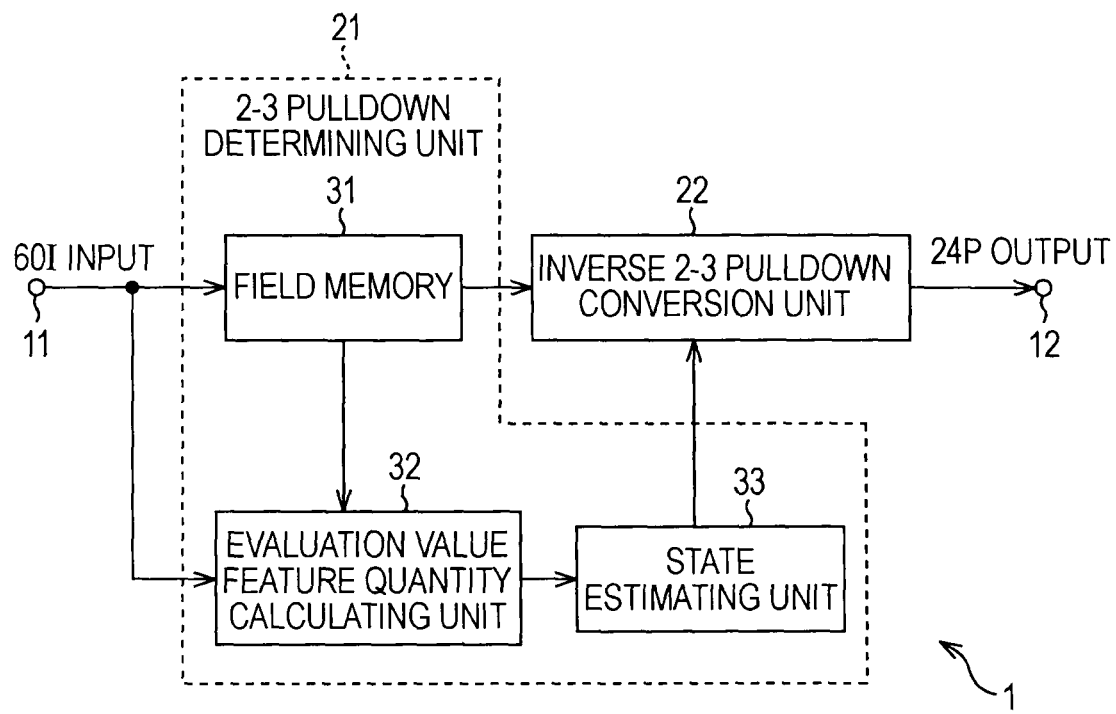
FIG. 6 is a block diagram illustrating a configuration example of a signal processing device to which the present invention has been applied.

FIG. 6 shows a configuration example of a signal processing device to which the present invention has been applied. This signal processing device 1 performs processing wherein 30 frame-per-second interlaced (i.e., 60 field-per-second) signals (60I signals) are input from an input terminal 11, determination is made regarding whether or not 2-3 pulldown has been performed, inverse 2-3 pulldown processing is performed according to the determination results, and 24 frame-per-second progressive signals (24P signals) are output to the output terminal 12.

2-3 pulldown conversion processing (hereafter also referred to simply as 2-3 pulldown) is processing for converting four frames of 24P signals before 2-3 pulldown into a set of two fields, a set of three fields, a set of two fields, and a set of three fields, of 60I signals (a total of ten fields), and repeating this as one sequence, thereby converting 24P signals into 60I signals. That is to say, if a repeated field where the same field is repeated (set of three fields) appears at a certain rate in 60I signals, we can know that this is a 2-3 pulldown sequence.

Also, inverse 2-3 pulldown conversion processing (hereafter also referred to simply as inverse 2-3 pulldown) is processing for estimating 24P signals before 2-3 pulldown from 60I signals, and converting into 24P signals. That is to say, inverse 2-3 pulldown processing is processing for thinning one field out of the set of three fields, so as to convert the interlaced signals into progressive signals.

The signal processing device 1 which is an example in FIG. 6 is configured of a 2-3 pd (pulldown) determining unit for determining whether or not 2-3 pulldown has been performed, and an inverse 2-3 pd (pulldown) conversion unit 22 for performing inverse 2-3 pulldown conversion processing depending on the determination results of the 2-3 pd determining unit 21, and detects 2-3 pulldown sequences with regard to 12 fields including one sequence (i.e., over 10 fields).

60I signals input from the input terminal are supplied to field memory 31 and an evaluation value feature quantity calculating unit 32 of the 2-3 pd determining unit 21, and supplied to the inverse 2-3 pulldown conversion unit 22 via the field memory 31.

Fields of 60I signals from the input terminal 11 are input to field memory 31 one field at a time, and at least three fields are accumulated for use by the evaluation value feature quantity calculating unit 32 to calculate difference evaluation values.

The 2-3 pd determining unit 21 is configured of the field memory 31, the evaluation value feature quantity calculating unit 32, and a state estimation unit 33. The evaluation value feature quantity calculating unit 32 calculates the difference evaluation values, threshold values, feature quantity, and so forth, used for 2-3 pulldown detection (determination) performed by the state estimation unit 33, using a field of 60I signals from the input terminal 11 and two fields earlier temporally than the field from the input terminal 11 accumulated in the field memory 31.

That is to say, the evaluation value feature quantity calculating unit 32 calculates the difference evaluation values using a field of 60I signals from the input terminal 11 and two fields earlier temporally than the field from the input terminal 11 accumulated in the field memory 31. The evaluation value feature quantity calculating unit 32 then calculates a threshold value based on the second-smallest value of the difference evaluation values of the 12 fields (i.e., over 10 fields), determines matching/non-matching between the 10 fields, i.e., whether or not there is movement between the fields (still/movement of between the fields), and obtains feature quantity indicating the position of still/movement between the 10 fields. Details of the evaluation value feature quantity calculating unit 32 will be described later with reference to FIG. 16.

The state estimation unit 33 determines whether or not the still positions over the 10 fields to be handled fits (falls under) the positions of the repeated fields which are the same fields repeated in the 2-3 pulldown sequence (i.e., still positions) made up of 12 fields (i.e., between 10 fields), using the difference evaluation value, threshold value, feature quantity, and so forth, calculated by the evaluation value feature quantity calculating unit 32.

2-3 pulldown patterns are patterns classified based on the position of repeated fields which are the same fields repeated in the 2-3 pulldown sequence (i.e., still positions) using 12 fields, and five patterns exist for each of whether the field input at that time is a top field or bottom field.

Also, these patterns have transition orders of transition for each field input. Accordingly, in the event that the 2-3 pulldown sequence is correct, each pattern makes transition to the next pattern in that transition order each time a field is input.

In the event that the state estimation unit 33 determines that the still positions in the 10 fields to be handled fit the still positions in any one of the 2-3 pulldown patterns, determination is made regarding whether or not the 2-3 pulldown pattern has repeated a predetermined state transition (i.e., the above-described transition in transition order) a predetermined number of times or more. In other words, determination is made at the state estimation unit 33 regarding whether or not the pattern which has been input this time and determined to fit has been making transition in the above-described pattern transition order from the pattern which the 12 fields from a predetermined number of times earlier have been determined to fit.

In the event that determination is made that the 2-3 pulldown pattern has repeated a predetermined state transition a predetermined number of times or more, the state estimation unit 33 sets the processing mode of the signal processing device 1 to mode 24, and supplies a mode signal indicating the mode 24 to the inverse 2-3 pd conversion unit 22.

On the other hand, in the event that determination is made that the still positions over the 10 fields to be handled do not fit the still positions of any of the 2-3 pulldown patterns, or in the event that determination is made that the predetermined state transition has not been repeated a predetermined number of times or more, the state estimation unit 33 sets the processing mode of the signal processing device 1 to mode 60, and supplies a mode signal indicating the mode 60 to the inverse 2-3 pd conversion unit 22. Details of the state estimation unit 33 will also be described later with reference to FIG. 16.

Upon receiving supply of a mode signal indicating mode 24 from the state estimation unit 33, the inverse 2-3 pd conversion unit 22 performs 2-3 pulldown conversion processing, and outputs 24P signals as the result of conversion to the output terminal 12. Also, in the event of receiving a mode signal indicating mode 60 from the state estimation unit 33, the inverse 2-3 pd conversion unit 22 stops (forbids) execution of the inverse 2-3 pulldown conversion processing.

Next, signal processing at the signal processing device 1 will be described in order. With the signal processing device 1, the sequence of 2-3 pulldown is determined by the 2-3 pd determining unit 21, and in accordance with the determination results thereof, inversion 2-3 pulldown conversion processing is performed by the inverse 2-3 pd conversion unit 22.

Note that detection of the 2-3 pulldown sequence by the 2-3 pd determining unit 21 generally is divided into two processes, which are still/movement determination (matching/non-matching determination) among the fields, and 2-3 pulldown pattern determination using the results thereof. Also, 2-3 pulldown pattern determination is further divided into two processes, which are determination of patterns, and of state transition thereof.

First, still/movement determination between fields with the evaluation value feature quantity calculating unit 32 will be described with reference to FIG. 7 through FIG. 9.

Figure 7:
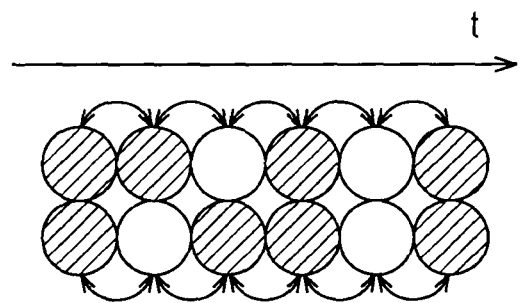
FIG. 7 is a diagram illustrating a configuration example of 12 fields of 60I signals.

With the example in FIG. 7, the circles represent the fields of 60I signals, with 12 fields shown in the input order along the passing of time t (upper: top fields, lower: bottom fields). Also, of the 12 fields, in order to differentiate between the fields in the case of two fields being generated from one frame (hereafter referred to as set of two fields) and the fields in the case of three fields being generated from one frame (hereafter referred to as set of three fields), sets of three fields are shown hatched.

That is to say, a set of three fields, set of three fields, a set of two fields, a set of three fields, a set of two fields, and a set of three fields have been input in order as the top fields.

A set of three fields, set of two fields, a set of three fields, a set of three fields, a set of two fields, and a set of three fields have been input in order as the top fields. Note that actually, the top fields and bottom fields are alternately repeatedly input.

In still/movement determination between fields, processing of these 12 fields is handled. In this case, ten inter-field difference evaluation values are obtained among the bottom fields, in the same way as with the top fields.

Figure 8:
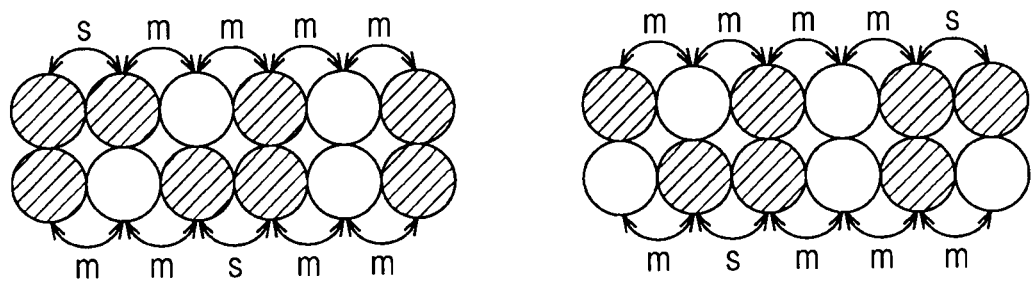
FIG. 8 is a diagram illustrating a configuration example of 12 fields including a correct 2-3 pulldown sequence.

FIG. 8 is a diagram illustrating two examples of 12 fields including a proper 2-3 pulldown sequence.

At the 12 fields at the example to the left side, the top fields are configured of, from the left, a set of three fields, set of three fields, a set of two fields, a set of three fields, a set of two fields, and a set of three fields. Also, the bottom fields are configured of, from the left, a set of three fields, set of two fields, a set of three fields, a set of three fields, a set of two fields, and a set of three fields.

At the 12 fields at the example to the right side, the top fields are configured of, from the left, a set of three fields, set of two fields, a set of three fields, a set of two fields, a set of three fields, and a set of three fields. Also, the bottom fields are configured of, from the left, a set of two fields, set of three fields, a set of three fields, a set of two fields, a set of three fields, and a set of two fields.

Accordingly, in the event that still/movement determination is made of the 12 fields in the pattern at the left side, of the top fields, between continuous sets of three fields (i.e., between the first and second fields from the left) is determined to be still (s), and between the other fields is determined to be moving (m); and of the bottom fields, between continuous sets of three fields (i.e., between the third and fourth fields from the left) is determined to be still (s), and between the other fields is determined to be moving (m).

In the same way, in the event that still/movement determination is made of the 12 fields in the pattern at the right side, of the top fields, between continuous sets of three fields (i.e., between the fifth and sixth fields from the left) is determined to be still (s), and between the other fields is determined to be moving (m); and of the bottom fields, between continuous sets of three fields (i.e., between the second and third fields from the left) is determined to be still (s), and between the other fields is determined to be moving (m).

Thus, in the event that a correct 2-3 pulldown sequence is included in 12 fields, there should be just two difference evaluation values of the ten difference evaluation values which are determined to be still (s) (i.e., difference evaluation values at positions where sets of three fields continue). Accordingly, the evaluation value feature quantity calculating unit 32 obtains the "second smallest value" from the ten difference evaluation values that have been obtained, and takes this as the threshold value for inter-field still/movement determination in the 12 fields.

Figure 9:
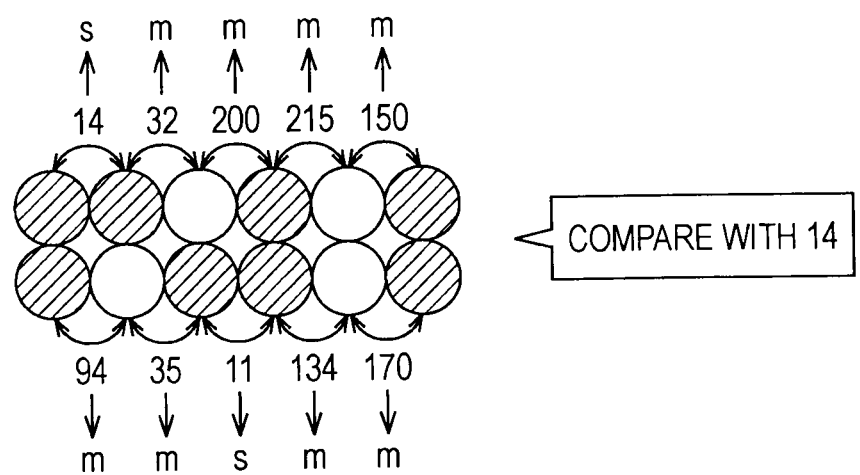
FIG. 9 is a diagram for describing still/movement determination of 12 fields.

For example, in the example in FIG. 9, the top fields are configured of, from the left, a set of three fields, set of three fields, a set of two fields, a set of three fields, a set of two fields, and a set of three fields. Also, the bottom fields are configured of, from the left, a set of three fields, set of two fields, a set of three fields, a set of three fields, a set of two fields, and a set of three fields.

Further, at the top fields in the example in FIG. 9, the difference evaluation value obtained between the first and second fields from the left is 14, the difference evaluation value obtained between the second and third fields from the left is 32, the difference evaluation value obtained between the third and fourth fields from the left is 200, the difference evaluation value obtained between the fourth and fifth fields from the left is 215, and the difference evaluation value obtained between the fifth and sixth fields from the left is 150.

At the bottom fields, the difference evaluation value obtained between the first and second fields from the left is 94, the difference evaluation value obtained between the second and third fields from the left is 35, the difference evaluation value obtained between the third and fourth fields from the left is 11, the difference evaluation value obtained between the fourth and fifth fields from the left is 134, and the difference evaluation value obtained between the fifth and sixth fields from the left is 170.

In this case, the second smallest value is the difference evaluation value 14 which is obtained between the first and second fields from the left in the top fields, so the evaluation value feature quantity calculating unit 32 takes this 14 as the threshold value for inter-field still/movement determination in the 12 fields in FIG. 9. The evaluation value feature quantity calculating unit 32 then compares the ten difference evaluation values already obtained with this threshold value "14", and in the event that the difference evaluation values between the frames are equal to or lower than the threshold value, determination is made that between the frames is still (matching), and in the event that the difference evaluation values between the frames are equal to or lower than the threshold value, determination is made that between the frames has movement (no match between the frames).

Accordingly, in the top fields in the example in FIG. 9, the difference evaluation value between the first and second fields from the left is 14 so this is determined to be still (s), the difference evaluation value between the second and third fields from the left is 32 so this is determined to have movement (m), the difference evaluation value between the third and fourth fields from the left is 200 so this is determined to have movement (m), the difference evaluation value between the fourth and fifth fields from the left is 215 so this is determined to have movement (m), and the difference evaluation value between the fifth and sixth fields from the left is 150 so this is determined to have movement (m).

Also, in the bottom fields in the example in FIG. 9, the difference evaluation value between the first and second fields from the left is 94 so this is determined to have movement (m), the difference evaluation value between the second and third fields from the left is 35 so this is determined to have movement (m), the difference evaluation value between the third and fourth fields from the left is 11 so this is determined to be still (s), the difference evaluation value between the fourth and fifth fields from the left is 134 so this is determined to have movement (m), and the difference evaluation value between the fifth and sixth fields from the left is 170 so this is determined to have movement (m).

That is to say, by performing still/movement determination using the second smallest value of the difference evaluation values of the 12 fields as a threshold value, between fields where sets of three fields are consecutive in the top fields (i.e., between the first and second fields from the left) is determined to be still (s) in a precise manner, and between fields where sets of three fields are consecutive in the bottom fields (i.e., between the third and fourth fields from the left) is determined to be still (s) in a precise manner.

As described above, with the evaluation value feature quantity calculating unit 32, a threshold value unique to the 12 fields is obtained and used. That is to say, even if the input 60I signals are signals with nature (having any sort of difference evaluation values), a unique threshold value obtained from the signals is used, so still/movement determination between fields (matching/non-matching) can be performed.

Figure 10:
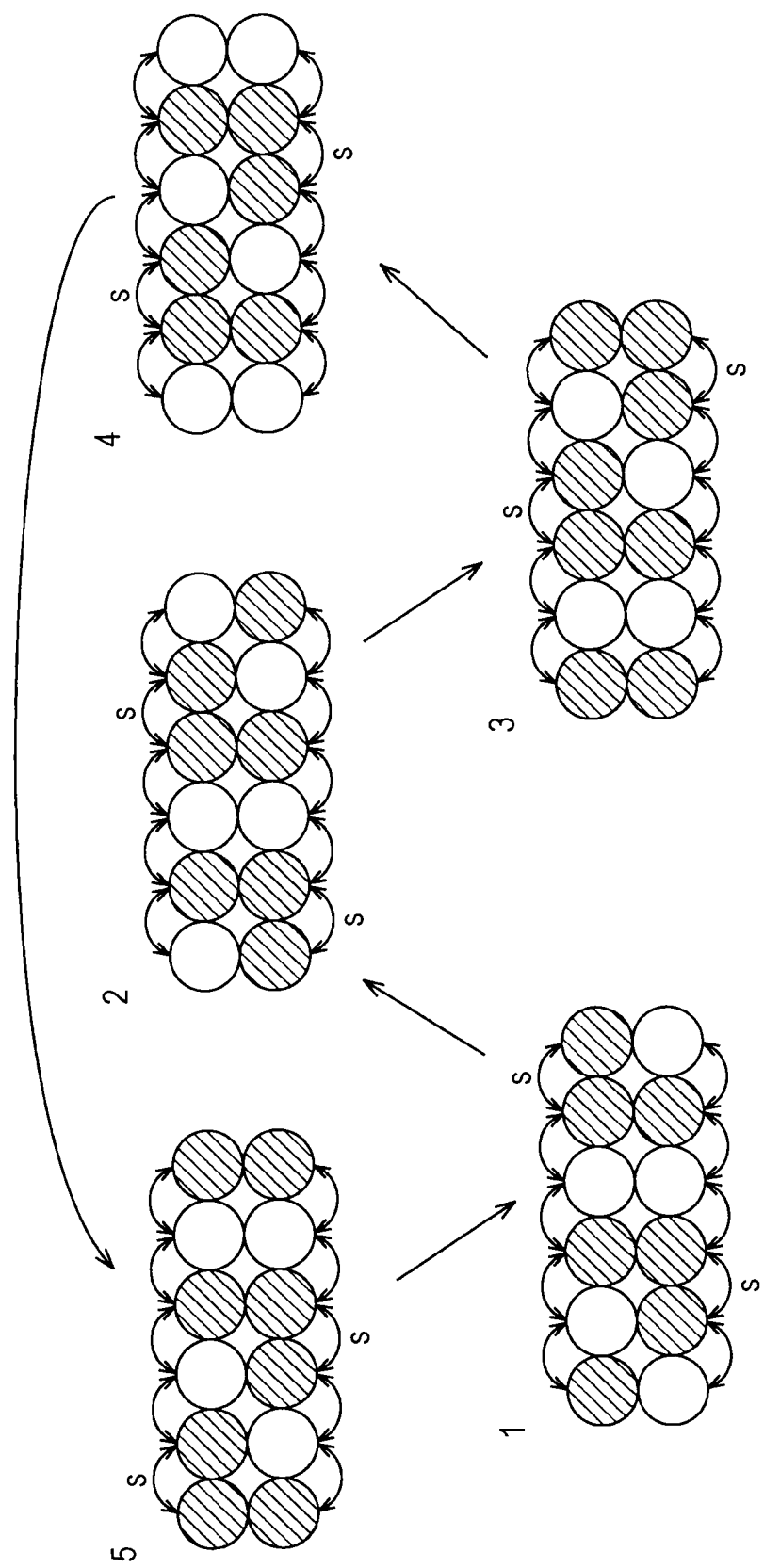
FIG. 10 is a diagram illustrating an example of 2-3 pulldown pattern in a case of increments of frames.

Next, description will be made regarding 2-3 pulldown pattern determination by the state estimation unit 33. When considered in increments of frames, there are five patterns of 12 fields including a correct 2-3 pulldown sequence (hereafter also referred to simply as 2-3 pulldown pattern), as shown in FIG. 10. That is to say, representing 2-3 pulldown using 12 fields, patterns are classified into the five following patterns based on the still positions.

FIG. 10 illustrates an example of 2-3 pulldown patterns in increments of frames. Note that the arrows between the patterns in the example in FIG. 10 indicate that the state makes transition from the pattern at the starting end of the arrow to the ending end of the arrow in the case of a correct 2-3 pulldown sequence. That is to say, the arrows shown in FIG. 10 indicate the patterns in order of passage of time.

Also, in the example in FIG. 10, positions between frames indicated by "s" means positions where between frames has been determined to be still. That is to say, between frames with no "s" is a position "m" (with movement).

Giving description from the upper left in the drawing in order of the arrows between the patterns, The pattern 5 is a pattern wherein the top fields are configured of, from the left, a set of three fields, set of three fields, a set of two fields, a set of three fields, a set of two fields, and a set of three fields, and the bottom fields are configured of, from the left, a set of three fields, set of two fields, a set of three fields, a set of three fields, a set of two fields, and a set of three fields. That is to say, pattern 5 is a pattern wherein the still positions are between the first and second fields from the left in the top fields, and between the third and fourth fields from the left in the bottom fields.

The pattern 1 is a pattern wherein the top fields are configured of, from the left, a set of three fields, set of two fields, a set of three fields, a set of two fields, a set of three fields, and a set of three fields, and the bottom fields are configured of, from the left, a set of two fields, set of three fields, a set of three fields, a set of two fields, a set of three fields, and a set of two fields. That is to say, the pattern 1 is a pattern wherein the still positions are between the fifth and sixth fields from the left in the top fields, and between the second and third fields from the left in the bottom fields.

The pattern 2 is a pattern wherein the top fields are configured of, from the left, a set of two fields, set of three fields, a set of two fields, a set of three fields, a set of three fields, and a set of two fields, and the bottom fields are configured of, from the left, a set of three fields, a set of three fields, a set of two fields, a set of three fields, a set of two fields, and a set of three fields. That is to say, the pattern 2 is a pattern wherein the still positions are between the fourth and fifth fields from the left in the top fields, and between the first and second fields from the left in the bottom fields.

The pattern 3 is a pattern wherein the top fields are configured of, from the left, a set of three fields, set of two fields, a set of three fields, a set of three fields, a set of two fields, and a set of three fields, and the bottom fields are configured of, from the left, a set of three fields, set of two fields, a set of three fields, a set of two fields, a set of three fields, and a set of three fields. That is to say, the pattern 3 is a pattern wherein the still positions are between the third and fourth fields from the left in the top fields, and between the fifth and sixth fields from the left in the bottom fields.

The pattern 4 is a pattern wherein the top fields are configured of, from the left, a set of two fields, set of three fields, a set of three fields, a set of two fields, a set of three fields, and a set of two fields, and the bottom fields are configured of, from the left, a set of two fields, set of three fields, a set of two fields, a set of three fields, a set of three fields, and a set of two fields. That is to say, the pattern 4 is a pattern wherein the still positions are between the second and third fields from the left in the top fields, and between the fourth and fifth fields from the left in the bottom fields.

In the case of a correct 2-3 pulldown sequence, these five patterns further repeat state transition in ascending order of the numbers (except that pattern 5 transitions to pattern 1) for each field input, as indicated by the arrows between the patterns.

Figure 11:
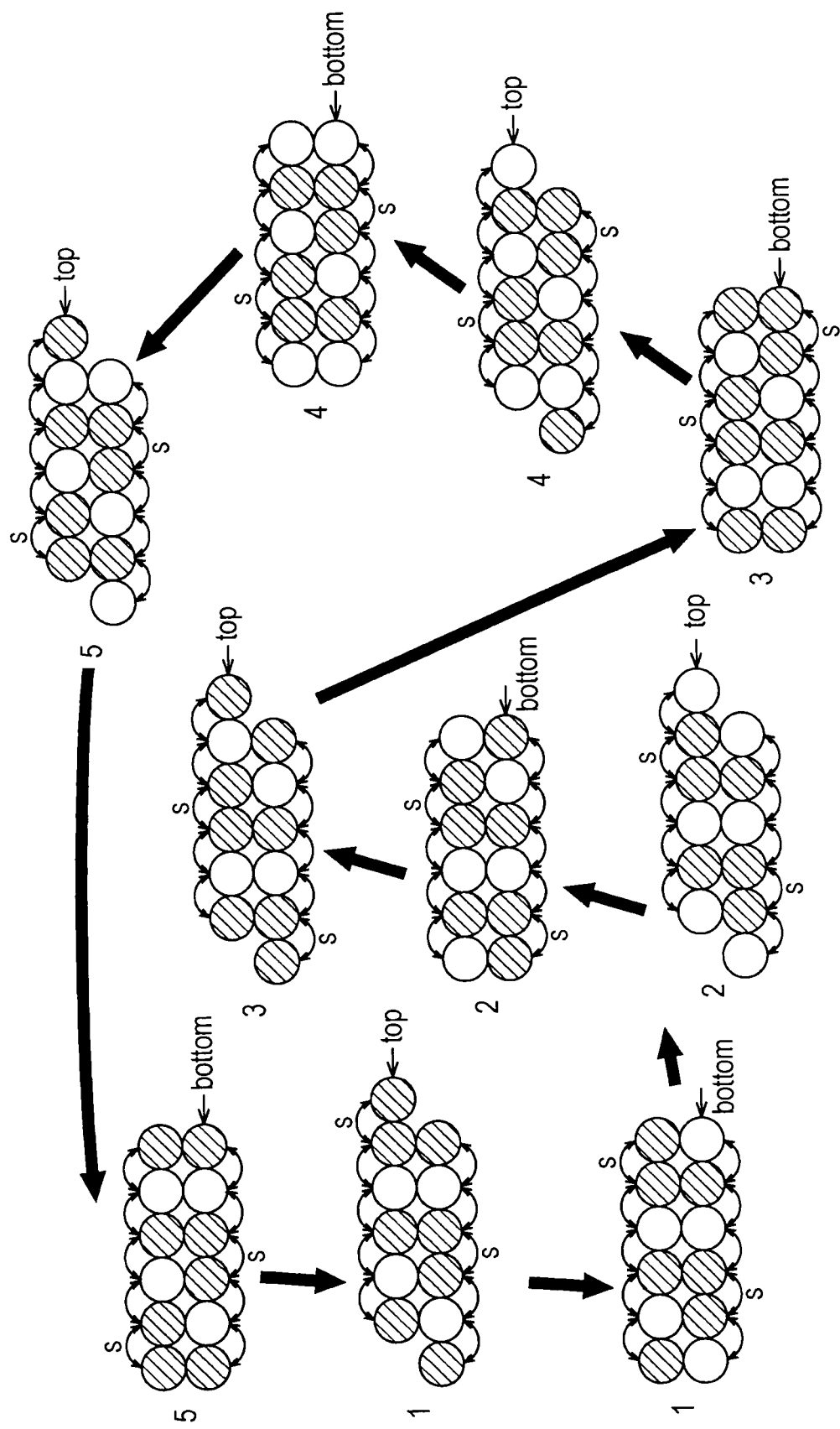
FIG. 11 is a diagram illustrating an example of 2-3 pulldown pattern in a case of increments of fields.

Note that the state estimation unit 33 handles fields, so ten patterns actually exist, as shown in FIG. 11.

FIG. 11 illustrates an example of 2-3 pulldown patterns in increments of fields. In the example in FIG. 11, the arrows bottom at the right side of the patterns indicates that a bottom field has been input, and the arrows top at the right side of the patterns indicates that a top field has been input. Also, the arrows between the patterns indicate that the state makes transition from the pattern at the starting end of the arrow to the ending end of the arrow in the case of a correct 2-3 pulldown sequence, in the same way as with the example in FIG. 10.

The 2-3 pulldown patterns in the case of increments of frames shown in FIG. 10 have patterns wherein the input field is a top field, and patterns wherein the input field is a bottom field, when considered in increments of fields. Note that the patterns in increments of frames in FIG. 10 represent patterns wherein the input field is a bottom field.

Accordingly, giving description from the upper left in the drawing in order of the arrows between the patterns, the pattern 5 in the event that the input field is a bottom field is a pattern wherein the top fields are configured of, from the left, a set of three fields, set of three fields, a set of two fields, a set of three fields, a set of two fields, and a set of three fields, and the bottom fields are configured of, from the left, a set of three fields, set of two fields, a set of three fields, a set of three fields, a set of two fields, and a set of three fields, in the same way as with the pattern 5 in increments of frames in FIG. 10. That is to say, the pattern 5 when the input field is a bottom field is a pattern wherein the still positions are between the first and second fields from the left in the top fields, and between the third and fourth fields from the left in the bottom fields.

The pattern 1 in the event that the input field is a top field is a pattern wherein the top fields are configured of, from the left, a set of three fields, set of two fields, a set of three fields, a set of two fields, a set of three fields, and a set of three fields, and the bottom fields are configured of, from the left, a set of three fields, set of two fields, a set of three fields, a set of three fields, a set of two fields, and a set of three fields. That is to say, the pattern 1 in the event that the input field is a top field is a pattern wherein the still positions are between the fifth and sixth fields from the left in the top fields, and between the third and fourth fields from the left in the bottom fields.

The pattern 1 in the event that the input field is a bottom field is a pattern wherein the top fields are configured of, from the left, a set of three fields, set of two fields, a set of three fields, a set of two fields, a set of three fields, and a set of three fields, and the bottom fields are configured of, from the left, a set of two fields, set of three fields, a set of three fields, a set of two fields, a set of three fields, and a set of two fields, in the same way as with the pattern 1 in increments of frames in FIG. 10. That is to say, the pattern 1 in the event that the input field is a bottom field is a pattern wherein the still positions are between the fifth and sixth fields from the left in the top fields, and between the second and third fields from the left in the bottom fields.

The pattern 2 in the event that the input field is a top field is a pattern wherein the top fields are configured of, from the left, a set of two fields, set of three fields, a set of two fields, a set of three fields, a set of three fields, and a set of two fields, and the bottom fields are configured of, from the left, a set of two fields, set of three fields, a set of three fields, a set of two fields, a set of three fields, and a set of two fields. That is to say, the pattern 2 in the event that the input field is a top field is a pattern wherein the still positions are between the fourth and fifth fields from the left in the top fields, and between the second and third fields from the left in the bottom fields.

The pattern 2 in the event that the input field is a bottom field is a pattern wherein the top fields are configured of, from the left, a set of two fields, set of three fields, a set of two fields, a set of three fields, a set of three fields, and a set of two fields, and the bottom fields are configured of, from the left, a set of three fields, set of three fields, a set of two fields, a set of three fields, a set of two fields, and a set of three fields, in the same way as with the pattern 2 in increments of frames in FIG. 10. That is to say, the pattern 2 in the event that the input field is a bottom field is a pattern wherein the still positions are between the fourth and fifth fields from the left in the top fields, and between the first and second fields from the left in the bottom fields.

The pattern 3 in the event that the input field is a top field is a pattern wherein the top fields are configured of, from the left, a set of three fields, set of two fields, a set of three fields, a set of three fields, a set of two fields, and a set of three fields, and the bottom fields are configured of, from the left, a set of three fields, set of three fields, a set of two fields, a set of three fields, a set of two fields, and a set of three fields. That is to say, the pattern 3 in the event that the input field is a top field is a pattern wherein the still positions are between the third and fourth fields from the left in the top fields, and between the first and second fields from the left in the bottom fields.

The pattern 3 in the event that the input field is a bottom field is a pattern wherein the top fields are configured of, from the left, a set of three fields, set of two fields, a set of three fields, a set of three fields, a set of two fields, and a set of three fields, and the bottom fields are configured of, from the left, a set of three fields, set of two fields, a set of three fields, a set of two fields, a set of three fields, and a set of three fields, in the same way as with the pattern 3 in increments of frames in FIG. 10. That is to say, the pattern 3 in the event that the input field is a bottom field is a pattern wherein the still positions are between the third and fourth fields from the left in the top fields, and between the fifth and sixth fields from the left in the bottom fields.

The pattern 4 in the event that the input field is a top field is a pattern wherein the top fields are configured of, from the left, a set of two fields, set of three fields, a set of three fields, a set of two fields, a set of three fields, and a set of two fields, and the bottom fields are configured of, from the left, a set of three fields, set of two fields, a set of three fields, a set of two fields, a set of three fields, and a set of three fields. That is to say, the pattern 4 in the event that the input field is a top field is a pattern wherein the still positions are between the second and third fields from the left in the top fields, and between the fifth and sixth fields from the left in the bottom fields.

The pattern 4 in the event that the input field is a bottom field is a pattern wherein the top fields are configured of, from the left, a set of two fields, set of three fields, a set of three fields, a set of two fields, a set of three fields, and a set of two fields, and the bottom fields are configured of, from the left, a set of two fields, set of three fields, a set of two fields, a set of three fields, a set of three fields, and a set of two fields, in the same way as with the pattern 4 in increments of frames in FIG. 10. That is to say, the pattern 4 in the event that the input field is a bottom field is a pattern wherein the still positions are between the second and third fields from the left in the top fields, and between the fourth and fifth fields from the left in the bottom fields.

The pattern 5 in the event that the input field is a top field is a pattern wherein the top fields are configured of, from the left, a set of three fields, set of three fields, a set of two fields, a set of three fields, a set of two fields, and a set of three fields, and the bottom fields are configured of, from the left, a set of two fields, set of three fields, a set of two fields, a set of three fields, a set of three fields, and a set of two fields. That is to say, the pattern 5 in the event that the input field is a top field is a pattern wherein the still positions are between the first and second fields from the left in the top fields, and between the fourth and fifth fields from the left in the bottom fields.

In this way, 2-3 pulldown patterns are configured of a total of ten patterns of five patterns each of the input (top field and bottom field), and in the case of a correct 2-3 pulldown sequence, the ten patterns further repeat state transition in ascending order of numbers each time a field is input, and alternating between top fields and bottom fields (except that pattern 5 transitions to pattern 1), as indicated by the arrows between the patterns.

Accordingly, the state estimation unit 33 determines which of the still positions of the above-described ten patterns (five patterns each for top field and bottom field) the still positions of the 12 fields fit (fall under), based on feature quantity indicating the still positions in the 12 fields (i.e., between 10 fields) obtained as a result of the evaluation value feature quantity calculating unit 32 performing still/movement determination, as 2-3 pulldown pattern determination. Note that in the event that none of the still positions of any of the patterns fit, a pattern 0 is assigned.

Figure 12:
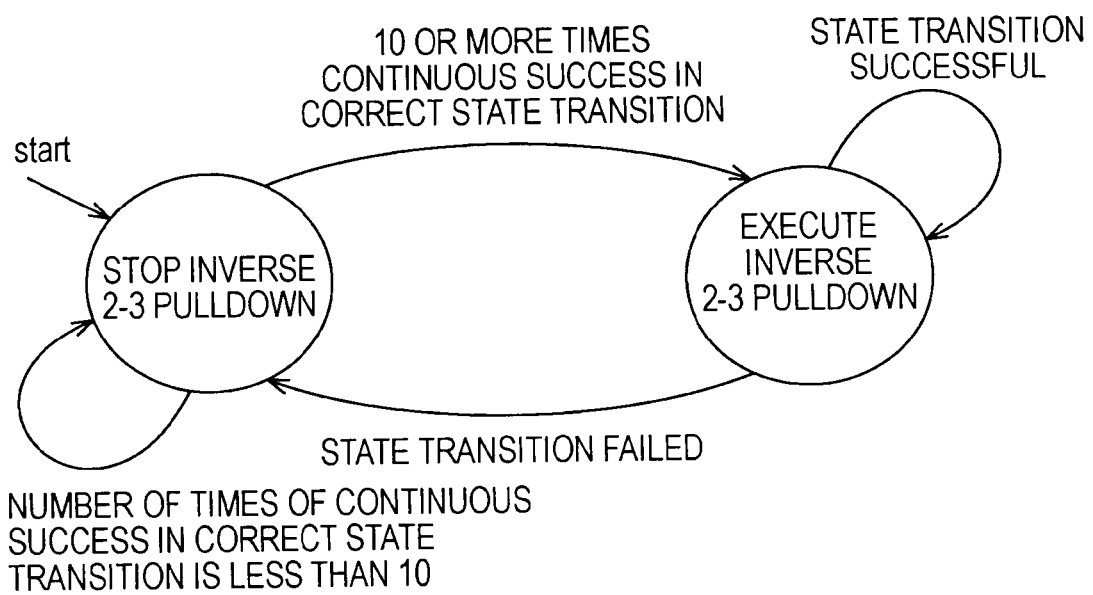
FIG. 12 is a diagram for describing state transition of stopping and execution of inverse 2-3 pulldown.

Also, the state estimation unit 33 determines whether or not state transition of the 2-3 pulldown patterns has been performed correctly, in accordance with the results of the 2-3 pulldown pattern determination, thereby controlling execution or stopping of inverse 2-3 pulldown conversion processing at the inverse 2-3 pd conversion unit 22, as shown in FIG. 12.

In the example shown in FIG. 12, the two states of a stopped state of inverse 2-3 pulldown (pd) and an execution state of inverse 2-3 pulldown (pd) are shown, with arrows illustrating state transition thereof.

That is, upon signal processing being started at the signal processing device 1, first, the state of inverse 2-3 pulldown (processing) is a stopped state, as indicated by the arrow start. In the event that the state transition unit 33 detects a 2-3 pulldown pattern, and determination is made that a correct 2-3 pulldown state transition is consecutively performed a predetermined number of times (e.g., 10 times) or more, as indicated by the arrow in FIG. 11, the inverse 2-3 pulldown state transitions from the stopped state to an execution state, with the inverse 2-3 pd conversion unit 22 starting execution of inverse 2-3 pulldown (processing), as described later with reference to FIG. 13.

On the other hand, even in the event that the state transition unit 33 detects a 2-3 pulldown pattern, if the consecutive number of times of successful correct 2-3 pulldown state transition is less than 10 times, inverse 2-3 pulldown state remains in the stopped state.

Even if the 2-3 pulldown state transitions to the execution state, if the transition unit 33 fails in state transition of correct 2-3 pulldown, the state of the inverse 2-3 pulldown promptly returns to the stopped state. Specifically, in the event that the pattern of the 2-3 pulldown is 1, subsequently transitioning to pattern 2 is a successful state transition, but transitioning to anything other than pattern 2 is a failed state transition.

Also, even after transition of the inverse 2-3 pulldown state to the execution state, in the event that the state transition unit 33 succeeds in state transition of correct 2-3 pulldown, the execution of the inverse 2-3 pulldown (processing) at the inverse 2-3 pd conversion unit 22 continues.

The greater the predetermined number of times for determining the number of consecutive successes of state transition, the fewer erroneous determinations are made in the inverse 2-3 pulldown processing, and stability increases, but conversely, there may be cases where it is difficult to perform inverse 2-3 pulldown processing at all, so it is thought that around 10 times is desirable. Note that threshold values used for determination of the number of consecutive successes is not restricted to 10, and a number of times between 6 to 30 may be used according to the usage and situation.

Figure 13:
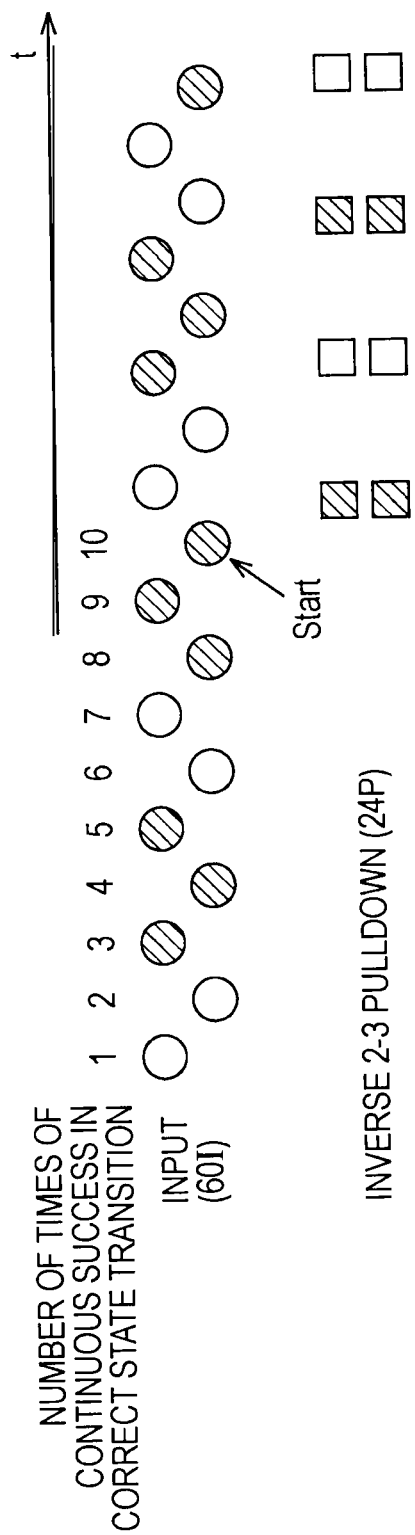
FIG. 13 is a diagram for describing the timing for starting execution of inverse 2-3 pulldown.

FIG. 13 is a diagram for describing the timing of starting execution of inverse 2-3 pulldown.

With the example in FIG. 13, the circles represent the fields of input 60I signals along the passing of time t (upper: top fields, lower: bottom fields). Also, sets of three fields are shown hatched with the example in FIG. 13 as well, to differentiate between sets of two fields and sets of three fields from 2-3 pulldown.

Also, the two squares arrayed vertically represent the frames converted into 24P signals by inverse 2-3 pulldown. Also, the numbers assigned to the fields indicate the number of consecutive successes of state transition of 2-3 pulldown at the time of that field being input.

That is to say, in the example in FIG. 13, at the time of the first top field from the left in the drawing (set of two fields) being input from the input terminal 11, the number of times of consecutive success of state transition of 2-3 pulldown is 1 time, at the time of the next (second from the left) bottom field (set of two fields) being input, the number of times of consecutive success of state transition of 2-3 pulldown is 2 times, at the time of the next (third from the left) top field (set of three fields) being input, the number of times of consecutive success of state transition of 2-3 pulldown is 3 times, at the time of the next (fourth from the left) bottom field (set of three fields) being input, the number of times of consecutive success of state transition of 2-3 pulldown is 4 times, and at the time of the next (fifth from the left) top field (set of three fields) being input, the number of times of consecutive success of state transition of 2-3 pulldown is 5 times.

Further, at the time of the next (sixth from the left) bottom field (set of two fields) being input following the top field at which the number of times of consecutive success of state transition of 2-3 pulldown has become 5 times, the number of times of consecutive success of state transition of 2-3 pulldown is 6 times, at the time of the next (seventh from the left) top field (set of two fields) being input, the number of times of consecutive success of state transition of 2-3 pulldown is 7 times, at the time of the next (eighth from the left) bottom field (set of three fields) being input, the number of times of consecutive success of state transition of 2-3 pulldown is 8 times, at the time of the next (ninth from the left) top field (set of three fields) being input, the number of times of consecutive success of state transition of 2-3 pulldown is 9 times, and at the time of the next (tenth from the left) bottom field (set of three fields) being input, the number of times of consecutive success of state transition of 2-3 pulldown is 10 times.

Subsequently, further input from the input terminal 11 are the next (11th from the left) top field (set of two fields), the next (12th from the left) bottom field (set of two fields), the next (13th from the left) top field (set of three fields), the next (14th from the left) bottom field (set of three fields), the next (15th from the left) top field (set of three fields), the next (16th from the left) bottom field (set of two fields), the next (17th from the left) top field (set of two fields), and the next (18th from the left) bottom field (set of three fields).

Accordingly, only upon the tenth bottom field from the left in the drawing (set of three fields) being input and the number of times of consecutive success of state transition of 2-3 pulldown going to 10, i.e., only upon the pattern following the order of the arrows for the 2-3 pulldown pattern shown in FIG. 11 from input of the first top field to the tenth bottom field being consecutively detected in the order of the arrows (in order of passage of time), is inverse 2-3 pulldown processing started from the field which the arrow designated start indicates.

Accordingly, two fields of the set of three fields from the eight through tenth from the left are converted into the 24 P signal frame the first from the left in the drawing, the two fields of the eleventh and twelfth from the left are converted into the 24 P signal frame the second from the left in the drawing, two fields of the set of three fields from the thirteenth through fifteenth from the left are converted into the 24 P signal frame the third from the left in the drawing, and the two fields of the sixteenth and seventeenth from the left are converted into the 24 P signal frame the fourth from the left in the drawing.

As described above, rather than inverse 2-3 pulldown being performed as soon as a 2-3 pulldown pattern is detected, inverse 2-3 pulldown is started after a 2-3 pulldown pattern is detected, the state transition of the pattern continues, and determination is made that this is stable (that is, after the pattern following the temporal order in FIG. 11 for a predetermined amount of time or longer), whereby the quality of the generated signals can be improved.

Note that the number of times of consecutive successes may be 0 or 1. An arrangement may be made in this case wherein inverse 2-3 pulldown is started simply upon detection of the pattern, or state transition even just one time.

Also, the example shown in FIG. 13 illustrates an example wherein one frame is generated from a set of three fields and one frame is generated from a set of two fields. In this way, an arrangement may be made wherein the frame structure of the 60I signals is preserved as much as possible when performing inverse 2-3 pulldown, in accordance with the determination results of 2-3 pulldown state transition.

This can suppress situations wherein, with DVD (Digital Versatile Disk) and the like, subtitles and the like inserted at time (timing) unrelated to the 2-3 pulldown sequence are subjected to inverse 2-3 pulldown without holding the frame structure of 60I signals, resulting in a frame being generated from different fields, which is stripped out in lines.

Figure 14:
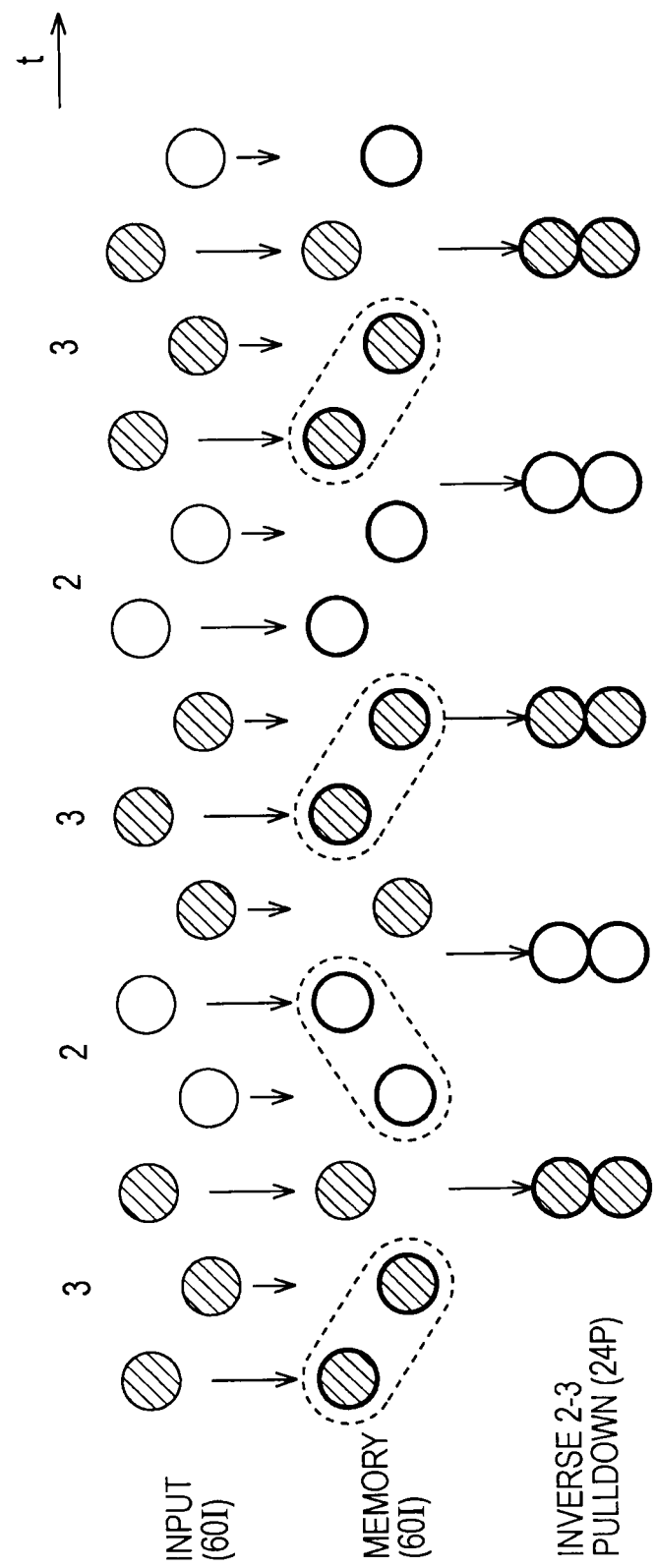
FIG. 14 is a diagram for describing the timing for generating frames in inverse 2-3 pulldown.

FIG. 14 is a diagram for describing the timing of generating frames in inverse 2-3 pulldown.

In the example shown in FIG. 14, at the first tier from the top, the circles represent the fields of 60I signals input from the input terminal 11 along the passing of time t (upper: top fields, lower: bottom fields). Also, sets of three fields are shown hatched with the example in FIG. 14 as well, to differentiate between sets of two fields and sets of three fields from 2-3 pulldown.

Shown at the second tier from the top are the fields of 60I signals input from the input terminal 11 and accumulated in the field memory 31. The fields surrounded by dotted lines in the field memory 31 illustrate two fields which are used for generating 24P signals, and the fields not surrounded by the dotted lines illustrate fields thinned out by this processing.

The circles vertically arrayed at the third tier from the top represent 24P signal frames generated as a result of inverse 2-3 pulldown being executed using the fields surrounded by the dotted lines.

To give description in order along the passage of time t, with the example shown in FIG. 14, first, of the set of three fields input from the input terminal and stored in the field memory 31, a 24P signal frame is generated at the timing at which the final field of the set of three fields is input, of the two fields of the set of three fields which are earlier time-wise (top field and bottom field). That is to say, the last top field of the set of three fields is thinned out.

Next, upon the set of two fields (bottom field and top field) being input and stored in the field memory 31, a 24P signal frame is generated of the set of two fields at the timing at which the final field of the set of two fields is input, and before the next field is input.

Subsequently, upon the set of three fields (bottom field, top field, bottom field) being input and stored in the field memory 31, a 24P signal frame is generated at the timing at which the final field of the set of three fields is input, of the two fields of the set of three fields which are earlier time-wise (top field and bottom field). That is to say, the first bottom field of the set of three fields is thinned out.

Next, upon the set of two fields (top field and bottom field) being input and stored in the field memory 31, a 24P signal frame is generated of the set of two fields at the timing at which the final field of the set of two fields is input, and before the next field is input.

Subsequently, upon the set of three fields (top field, bottom field, top field) being input and stored in the field memory 31, a 24P signal frame is generated at the timing at which the final field of the set of three fields is input, of the two fields of the set of three fields which are earlier time-wise (top field and bottom field). That is to say, the last top field of the set of three fields is thinned out.

Thus, one frame of 24P signals is generated for each of the set of three fields and set of two fields from 2-3 pulldown. At this time, the temporal phase (timing) for outputting the 24P signal (frame) can be stipulated to be performed at the last field of the sets of three fields and of two fields.

Accordingly, control for holding the phase relation of each of the signals is simplified in a case of structuring a signal processing system using 24P signals following inverse 2-3 pulldown, which will be described in detail from FIG. 39 on.

Next, the signal processing using the signal processing device 1 in FIG. 6 will be described with reference to the flowchart in FIG. 15.

First, an unshown operating input unit is operated by the user operating the signal processing device 1, and the values of the initial settings of the respective units of the signal processing device 1. Upon inputting a signal corresponding to the operation of the user from the operating input unit, the respective units of the signal processing device 1 perform initial settings in step S11. Following the initial settings in step S11, the processing is started.

In step S12, the input terminal 11 inputs one field from an unshown previous stage, and supplies this to the field memory 31 and evaluation value feature quantity calculating unit 32. The one field supplied from the field memory 31 is supplied to the inverse 2-3 pd conversion unit 22.

Upon the one field being input from the input terminal 11, in step S13 the evaluation value feature quantity calculating unit 32 executes evaluation value feature quantity calculation processing. That is to say, the evaluation value feature quantity calculating unit 32 uses the field of the 60I signal from the input terminal 11, and the field which is positioned temporally two fields earlier than the field input from the input terminal 11, which is stored in the field memory 31, to calculate a difference evaluation value, a threshold value, feature quantity, and so forth which are employed for detection (determination) of the sequence of 2-3 pulldown performed by the state estimation unit 33.

Specifically, the evaluation value feature quantity calculating unit 32 calculates a difference value evaluation value using the field of the 60I signal from the input terminal 11, and the field which is positioned temporally two fields earlier than the field input from the input terminal 11, which is stored in the field memory 31, as described with reference to FIG. 9, and calculates a threshold value based on the 2nd minimum value of the difference evaluation values of 12 fields (i.e., between 10 fields).

Subsequently, the evaluation value feature quantity calculating unit 32 determines matching/non-matching between the 10 fields, i.e., whether or not there is a movement between fields (stillness/movement between fields) based on the difference evaluation values between the 10 fields and the calculated threshold value, and obtains feature quantity indicating the still position between 10 fields. The details of the evaluation value feature quantity calculation processing will be described later with reference to the flowchart in FIG. 29.

Upon the difference evaluation values, threshold value, feature quantity, and so forth being obtained by the evaluation value feature quantity calculating unit 32, in step S14 the state estimation unit 33 executes state estimation processing. That is to say, the state estimation unit 33 determines whether or not the still/movement positions between 10 fields to be processed fit one of the 2-3 pulldown patterns shown in FIG. 11.

Also, in the event that determination is made that the still/movement positions between 10 fields fit any pattern of the 2-3 pulldown patterns, as described above with reference to FIG. 12, the state estimation unit 33 further determines regarding whether or not the 2-3 pulldown pattern thereof has repeated a predetermined state transition a certain number of times or more. That is to say, here, determination is made whether or not a transition has continued in the transition order of the above-described patterns, from the pattern at which the 12 fields a certain number of times earlier regarding which determination was made to fit, to the pattern input this time and determined to fit.

Note that in the event that determination is made that the 2-3 pulldown pattern thereof has repeated a predetermined state transition a certain number of times or more, the state estimation unit 33 sets the processing mode of the signal processing device 1 to the mode 24, and supplies a mode signal indicating the mode 24 to the inverse 2-3 pulldown conversion unit 22.

Also, in the event that determination is made that the still position between 10 fields to be processed does not fit any pattern of the 2-3 pulldown patterns, or in the event that determination is made that a predetermined state transition has not been repeated a certain number of times (e.g., 10 times) or more, the state estimation unit 33 sets the processing mode of the signal processing device 1 to the mode 60, and supplies a mode signal indicating the mode 60 to the inverse 2-3 pulldown conversion unit 22. The details of this state estimation processing will be described later with reference to the flowchart in FIG. 33.

In step S15, in response to the mode signal supplied from the state estimation unit 33, the inverse 2-3 pulldown conversion unit 22 performs inverse 2-3 pulldown conversion processing using the fields from the field memory 31.

That is to say, in the event that the mode signal indicates the mode 60 (i.e., the processing mode is the mode 60), as described above with reference to FIG. 13, the inverse 2-3 pulldown conversion unit 22 starts the inverse 2-3 pulldown conversion processing, thins out one field of a set of three fields, generates a 24P signal with the above-mentioned timing (phase), and outputs the generated 24P signal to the output terminal 12. Note that in the event that the mode signal indicates the mode 24 (i.e., the processing mode is the mode 24), the inverse 2-3 pulldown conversion unit 22 stops the inverse 2-3 pulldown conversion processing.

In step S16, the evaluation value feature quantity calculating unit 32 determines regarding whether or not the processing for all of the fields has been completed. When no field is input from the input terminal 11, the evaluation value feature quantity calculating unit 32 determines that the processing for all of the fields has been completed, and the signal processing is ended.

On the other hand, in the event that determination is made in step S16 that the processing for all of the fields has not been completed, the processing returns to step S12, and the subsequent processing is repeated.

As described above, an arrangement has been made wherein a still position between fields is obtained using the 12 fields of a 60I signal, the 2-3 pulldown pattern is determined, and further, a 2-3 pulldown state transition is determined, so even with a 60I signal of which the nature is not known, the 2-3 pulldown sequence can be detected in a precise manner.

Also, an arrangement has been made wherein in the event of obtaining a still position between fields of 12 fields, still/movement determination is made with the unique threshold values of the 12 fields, whereby the precision for obtaining a still position between fields of the 12 fields is improved.

Further, an arrangement has been made wherein only in the event that a 2-3 pulldown state transition succeeds a certain number of times or more, inverse 2-3 pulldown is performed, whereby the inverse 2-3 pulldown processing can be performed in a stable state.

Next, the evaluation value feature quantity calculating unit 32 and state estimation unit 33, which are shown in FIG. 6, will be described further in detail.

Figure 16:
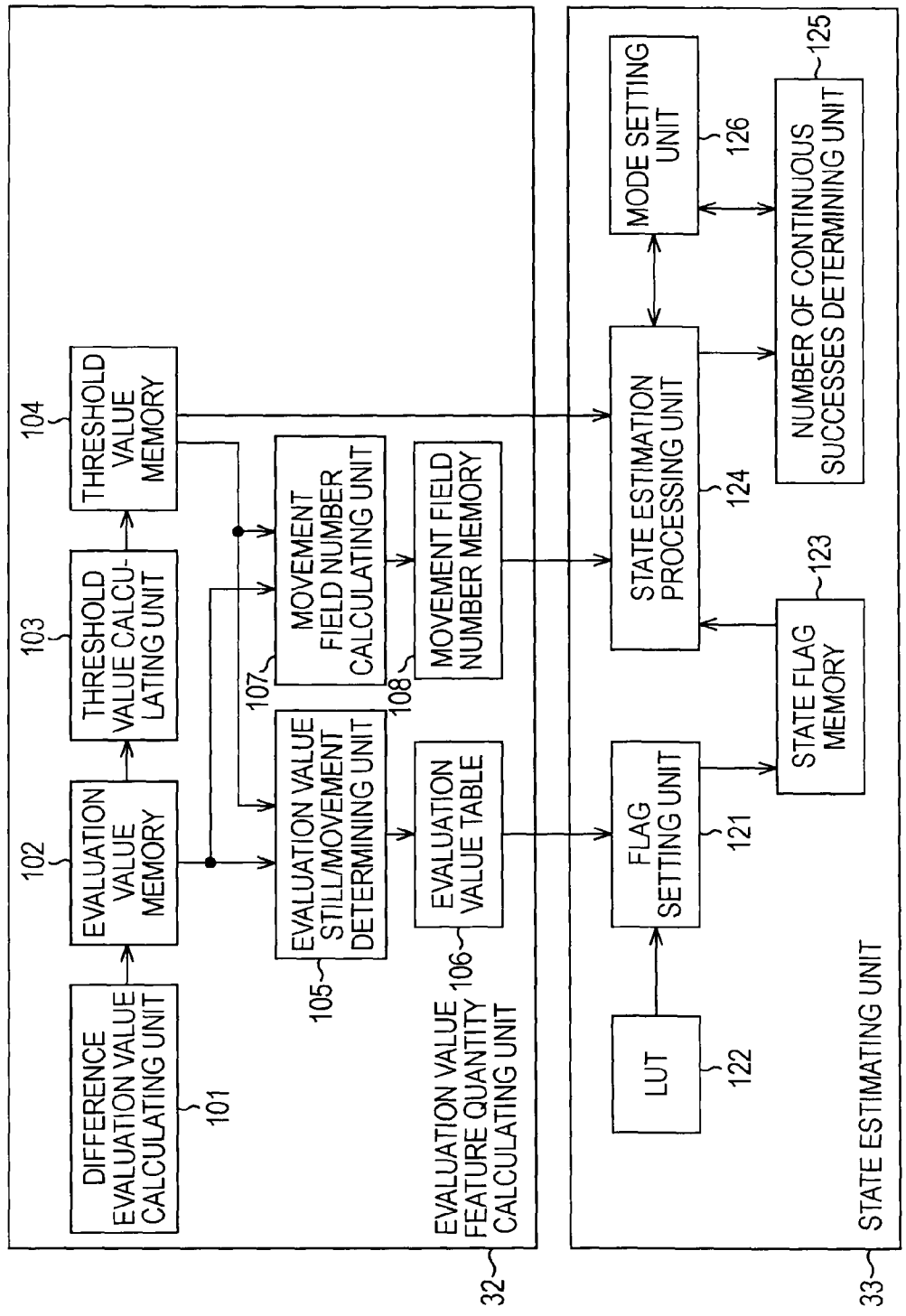
FIG. 16 is a block diagram illustrating a configuration example of the evaluation value feature quantity calculating unit and state estimating unit in FIG. 6.

FIG. 16 is a block diagram illustrating a configuration example of the evaluation value feature quantity calculating unit 32 and state estimation unit 33.

With the example in FIG. 16, the evaluation value feature quantity calculating unit 32 is configured of a difference evaluation value calculating unit 101, evaluation value memory 102, a threshold value calculating unit 103, threshold value memory 104, an evaluation value still/movement determining unit 105, an evaluation value table 106, a movement field number calculating unit 107, and movement field number memory 108.

Also, the state estimation unit 33 is configured of a flag setting unit 121, an LUT (Look Up Table) 122, state flag memory 123, a state estimation processing unit 124, a number of consecutive successes determining unit 125, and a mode setting unit 126.

The difference evaluation value calculating unit 101 uses a field n of the 60I signal from the input terminal 11, and a field n−2 which is positioned temporally two fields earlier than the field n from the input terminal 11, which is stored in the field memory 31, to obtain the difference value between the fields n and n−2, and stores this in the evaluation value memory 102.

For example, the difference evaluation value calculating unit 101 obtains the maximum value of the pixel difference absolute values of the same phase between the fields n and n−2, and takes this as the difference evaluation value between the fields n and n−2, or obtains the sum of the pixel difference absolute values of the same phase between the fields n and n−2, and takes this as the difference evaluation value between the fields n and n−2.

The evaluation value memory 102 is made up of an FIFO (First-In-First-Out), and always stores 10 difference evaluation values equivalent to the latest 12 fields, i.e., among 10 fields.

The threshold value calculating unit 103 obtains the 2nd minimum value of the difference evaluation values stored in the evaluation value memory 102, adds a predetermined value thereto to calculate a threshold value min2 for still/movement determination, and stores the calculated threshold value min2 in the threshold value memory 104.

The threshold value memory 104 always stores the threshold value min2 calculated with the difference evaluation values of the latest 12 fields.

The evaluation value still/movement determining unit 105 compares the difference evaluation values between 10 fields stored in the evaluation value memory 102 and the threshold value min2 stored in the threshold value memory 104, and performs still/movement determination (matching/non-matching determination) between 10 fields to generate an evaluation value table 106 serving as feature quantity indicating a still/movement position between the 10 fields.

That is to say, the difference evaluation values between 10 fields stored in the evaluation value memory 104 and the threshold value min 2 stored in the threshold value memory 104 are compared, and between fields of which the difference evaluation value is equal to or smaller than the threshold value min2 is determined to be still, and 1 is written in the evaluation value table 106. Also, between fields of which the difference evaluation value is greater than the threshold value min2 is determined to be movement, and 0 is written in the evaluation value table 106.

The evaluation value table 106 is configured of the value (1) indicating stillness or the value (0) indicating movement being written therein, of which the number is equivalent to between 10 fields of 12 fields.

The movement field number calculating unit 107 compares the difference evaluation values between the 10 fields stored in the evaluation value memory 102 and the threshold value min2 stored in the threshold value memory 104, counts how many difference evaluation values which are equal to or greater than the threshold value min2 exist, and stores the value thereof to the movement field number memory 108 as the number of movement fields (Movefield).

That is to say, the number of fields (Movefield) is feature quantity representing how many fields include movement (other than stillness).

The movement field number memory 108 stores the number of movement fields (Movefield) obtained between the 10 fields of the 12 fields.

The flag setting unit 121 refers to the 2-3 pulldown patterns (states) which the LUT 122 indicates to determine regarding whether or not the values of the evaluation value table 106 fit still positions of the 2-3 pulldown patterns which the LUT 122 indicates, and of the 2-3 pulldown patterns according to the state flags (sflag), and sets to 1 to all of the state flags corresponding to the patterns of which the still positions have been determined to fit.

The LUT 122 is a table indicating the still positions of all of the 2-3 pulldown patterns by each input field. The state flag memory 123 stores a state flag (sflag) made up of a flag indicating the states of the five 2-3 pulldown patterns.

The state estimation processing unit 124 refers to input fields (Top/Bottom), the previous 2-3 pulldown states (patterns), the processing mode which the mode setting unit 126 sets, each state of the state flag (sflag) of the state flag memory 123, the number of movement fields (Movefield) of the movement field number memory 108, and the threshold value mint of the threshold memory 104 to estimate the 2-3 pulldown patters (states) of 12 fields to be input.

In the event that the 2-3 pulldown patters (states) of 12 fields to be input are estimated, the state estimation processing unit 124 increments the number of consecutive successes of a state transition (peace) by one. Also, in the event of failing to estimate the 2-3 pulldown patters (states), the state estimation processing unit 124 resets the number of consecutive successes of a state transition (peace) to zero, and also refers to the state flag (sflag) of the state flag memory 123 to set an emergency state (emergency_state). Note that in this case, in the event that the processing mode is the mode 24, and further, the state estimation processing unit 124 causes the mode setting unit 126 to change the processing mode which is set by the mode setting unit 126 to the mode 60.

In the event that the processing mode is the mode 60, the number of consecutive successes determining unit 125 determines regarding whether or not the number of consecutive successes of a state transition (peace) which the state estimation processing unit 124 counts has reached a certain number of times (e.g., 10 times) or more, and in the event that determination is made that the number of consecutive successes of a state transition (peace) has reached a certain number of times (e.g., 10 times) or more, the state estimation processing unit 124 causes the mode setting unit 126 to change the processing mode which is set by the mode setting unit 126 to the mode 24.

The mode setting unit 126 sets the processing mode of the signal processing device 1 to the mode 24 or mode 60 in accordance with the control from the state estimation processing unit 124 or number of consecutive successes determining unit 125, and supplies the set processing mode to the inverse 2-3 pulldown conversion processing unit 22.

Next, description will be made specifically regarding the difference evaluation value calculation processing of the difference evaluation value calculating unit 101 with reference to FIG. 17 through FIG. 21.

Figure 17:
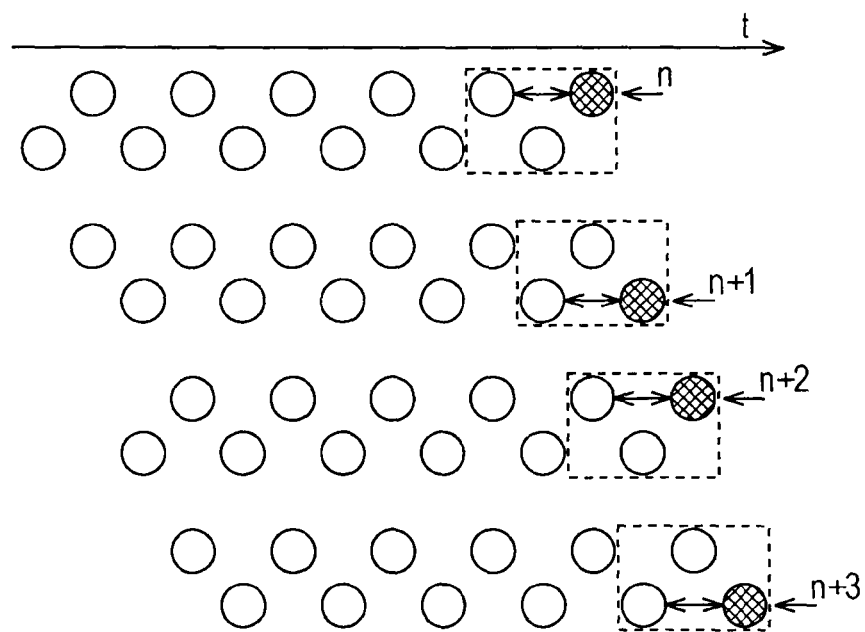
FIG. 17 is a diagram for describing fields necessary for difference evaluation calculation processing.

With the example in FIG. 17, circles indicate fields, wherein 12 fields to be input along time t and stored in the field memory 31 (top: top fields, bottom: bottom fields) are shown for each point-in-time (n, n+1, n+2, and n+3). Respective arrows denoted with n, n+1, n+2, and n+3 illustrate that the circles (fields) indicated by the respective arrows are input at the point-in-time n, n+1, n+2, and n+3, respectively.

That is to say, at the point-in-time n, while the field indicated by the arrow n is written in the field memory 31, a difference evaluation value is calculated by the difference evaluation value calculating unit 101 using the field indicated by the arrow n (top field), and the field (input at the point-in-time n−2) which is temporally positioned two fields earlier than the field indicated by the arrow n (top field), and the calculated difference evaluation value is stored in the evaluation value memory 102.

At the point-in-time n+1, while the field indicated by the arrow n+1 is written in the field memory 31, a difference evaluation value is calculated by the difference evaluation value calculating unit 101 using the field indicated by the arrow n+1 (bottom field), and the field (input at the point-in-time n−1) which is temporally positioned two fields earlier than the field indicated by the arrow n+1 (bottom field), and the calculated difference evaluation value is stored in the evaluation value memory 102.

At the point-in-time n+2, while the field indicated by the arrow n+2 is written in the field memory 31, a difference evaluation value is calculated by the difference evaluation value calculating unit 101 using the field indicated by the arrow n+2 (top field), and the field (input at the point-in-time n) which is temporally positioned two fields earlier than the field indicated by the arrow n+2 (top field), and the calculated difference evaluation value is stored in the evaluation value memory 102.

At the point-in-time n+3, while the field indicated by the arrow n+3 is written in the field memory 31, a difference evaluation value is calculated by the difference evaluation value calculating unit 101 using the field indicated by the arrow n+2 (bottom field), and the field (input at the point-in-time n+1) which is temporally positioned two fields earlier than the field indicated by the arrow n+2 (bottom field), and the calculated difference evaluation value is stored in the evaluation value memory 102.

As described above, in the event of detecting 2-3 pulldown, the 10 evaluation values between fields calculated from 12 fields are employed, but three fields surrounded with a dotted line are required for the difference evaluation value calculating unit 101 calculating a difference evaluation value. That is to say, there is a need to store 10 difference evaluation values in the evaluation value memory 102, so the field memory 31 needs to hold not 12 fields but 3 fields.

Figure 18:
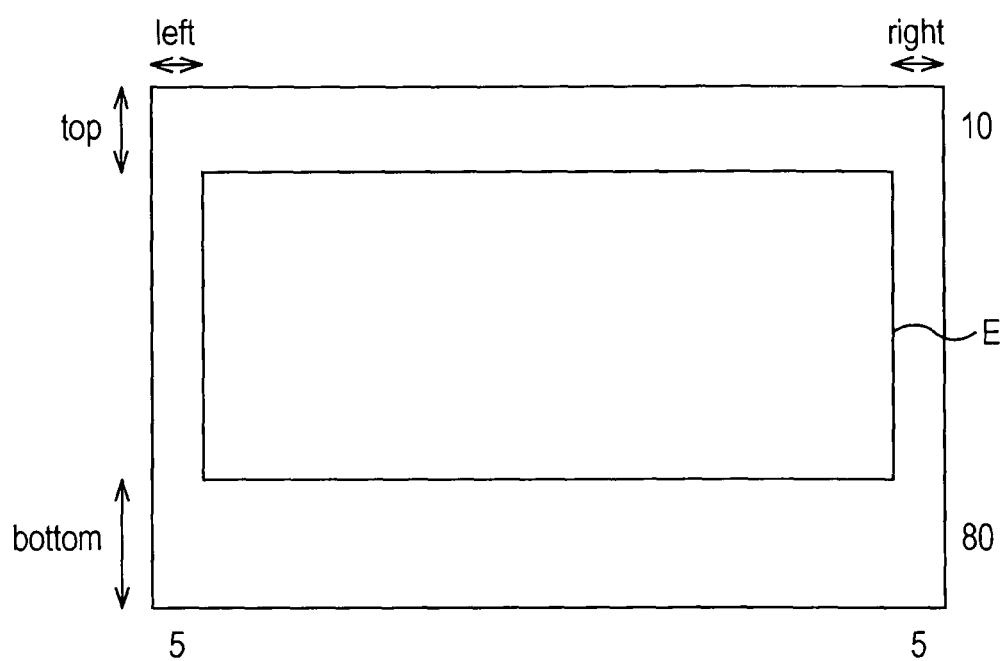
FIG. 18 is a diagram illustrating a configuration example of a region to be subjected to the difference evaluation calculation processing.

With the example in FIG. 18, the pixels of one field (720× 240) of a SD-size 60I signal are illustrated. In this case, all of the pixels of the one field may be set as a region for evaluation value calculation, but let us say that a region E which is the one field from which vertical and horizontal ranges are removed to some extent is taken as a region for computation.

In this case, at the top portion of the one field, 10 pixels are excluded, and at the bottom portion, 80 pixels are excluded, at left and right portions, 5 pixels each are excluded, and consequently, the region E other than those is taken as a region for computation.

Thus, influence such as a caption or the like in DVD can be prevented.

Note that as for pixels to be excluded, the number of pixels to be excluded is not restricted to the above-mentioned number of pixels, at the top and bottom portions any number of pixels can be set as excluded pixels as long as 0 through 240 pixels, and at left and right portions any number of pixels can be set as excluded pixels as long as 0 through 360 pixels.

FIG. 19 is a diagram for describing the absolute value of a difference for each pixel between fields.

With the example in FIG. 19, the histogram of the absolute of a difference of a still portion including little movement between fields, and the histogram of the absolute value of a difference of a movement portion including movement between fields are illustrated.

The horizontal axes of the histograms represent the absolute value of a difference for each pixel between fields, and the vertical axes thereof represent frequency (the number of pixels including the absolute value of a difference thereof). Upon comparing the histograms of the still portion and movement portion, at the still portion the absolute value of a difference for each pixel between fields with the maximum value which has no great difference as compared with the minimum value (0), which is frequently the minimum (0).

On the other hand, at the movement portion the absolute value of a difference for each pixel between fields with the maximum value which has a great difference as compared with the minimum value (0), which has various values therebetween.

Thus, with the absolute value of a difference for each pixel between fields, the maximum values differ between the still portion and movement portion, and the frequencies thereof also differ between the still portion and movement portion. Accordingly, for example, as shown in FIG. 20, the maximum value of the absolute values of pixel differences of the same phase between a field n and a field n−2 is obtained, and this is employed as the difference evaluation value between fields.

Figure 20:
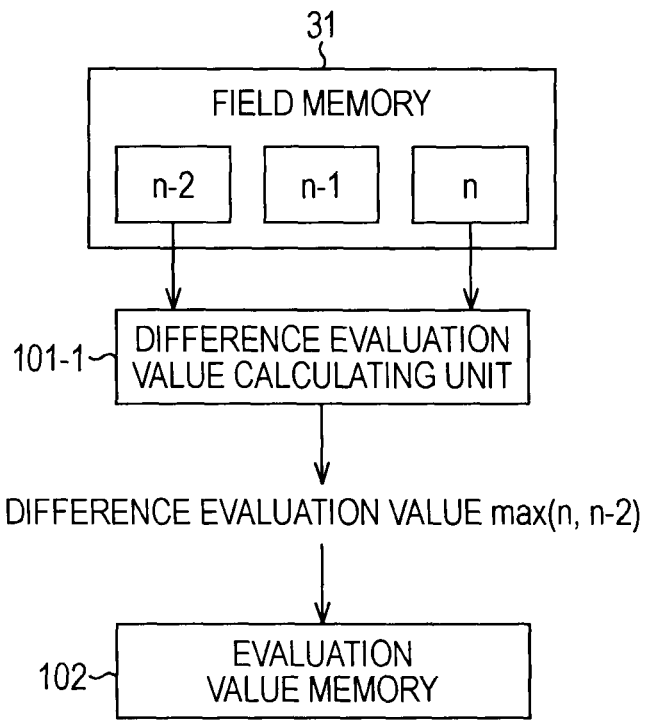
FIG. 20 is a diagram for describing an example of difference evaluation calculation processing.

With the example in FIG. 20, the field memory 31 stores the field n, field n−1, and field n−2, and a difference evaluation value calculating unit 101-1 calculates the absolute value of a difference between a pixel within the computation range of the field n (region E of FIG. 18), and a pixel of the same phase of the field n−2, and stores the maximum absolute value of a difference of the absolute values of differences of all the pixels within the region E in the evaluation value memory 102 as a difference evaluation value max(n, n−2).

Figure 21:
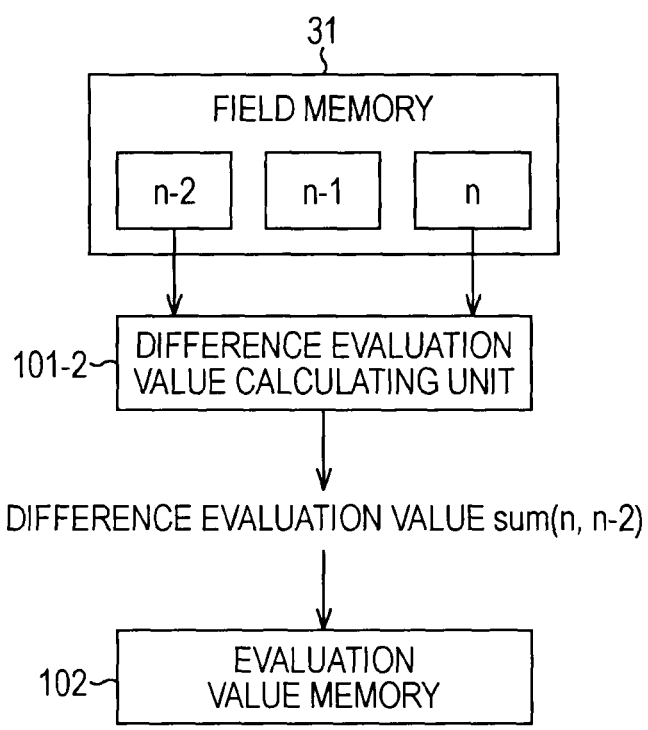
FIG. 21 is a diagram for describing another example of difference evaluation calculation processing.

Alternatively, as shown in FIG. 21, an arrangement may be made wherein the sum of the absolute values of differences of pixels of the same phase between the field n and field n−2 is obtained, and this is employed as a difference evaluation value between fields.

With the example in FIG. 21, the field memory 31 stores the field n, field n−1, and field n−2, and a difference evaluation value calculating unit 101-2 calculates the absolute value of a difference between a pixel within the computation range of the field n (region E of FIG. 18), and a pixel of the same phase of the field n−2, obtains the sum of the absolute values of difference of all the pixels within the region E, and stores this in the evaluation value memory 102 as a difference evaluation value sum(n, n−2).

Note that a calculation example of a difference evaluation value is not restricted to the examples in FIG. 20 and FIG. 21, additionally, for example, an arrangement can be made wherein the average value of the absolute values of pixel differences of the same phase between the field n and field n−2 is obtained, and this is employed as a difference evaluation value between fields, and further, a plurality of the above-mentioned difference evaluation values are calculated, 2-3 pulldown is detected, and ultimately, those are determined in an integrated manner.

In this case, a case wherein all of the detection results of respective 2-3 pulldown employing the respective difference evaluation values are identical may be a final result, or a case wherein any one pair of the detection results of 2-3 pulldown are identical may be a final result.

Figure 22:
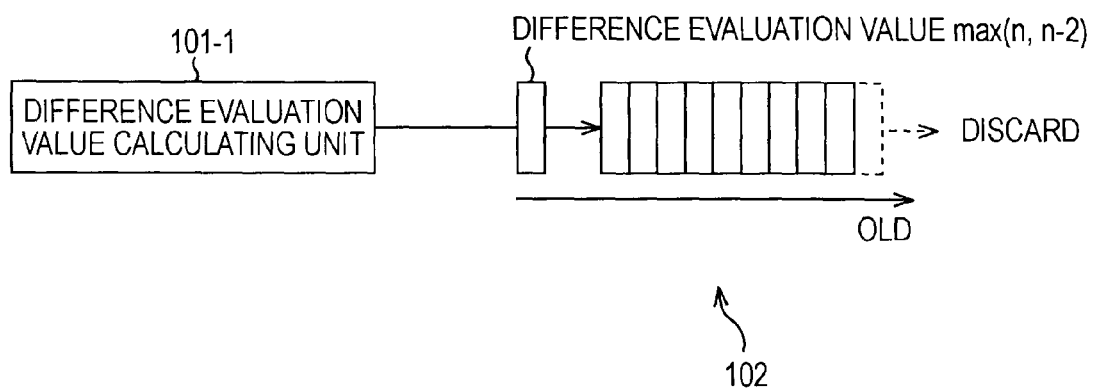
FIG. 22 is a diagram for describing the configuration of evaluation value memory shown in FIG. 16.

FIG. 22 is a diagram for describing the configuration of the evaluation value memory 102 in FIG. 16.

Ten difference evaluation values calculated by the difference evaluation value calculating unit 101 in an FIFO manner are stored in the evaluation value memory 102.

That is to say, in the case of the example in FIG. 22, the latest calculated difference evaluation value max(n, n−2) is stored in the evaluation value memory 102 from the difference evaluation value calculating unit 101-2. Note that at this time, the temporally oldest difference evaluation value in the evaluation value memory 102 is discarded.

Next, the calculation processing of a threshold value for still/movement determination by the threshold value calculating unit 103 will be described with reference to FIG. 23. Note that squares illustrated within the evaluation value memory 102 each represent ten difference evaluation values.

Figure 23:
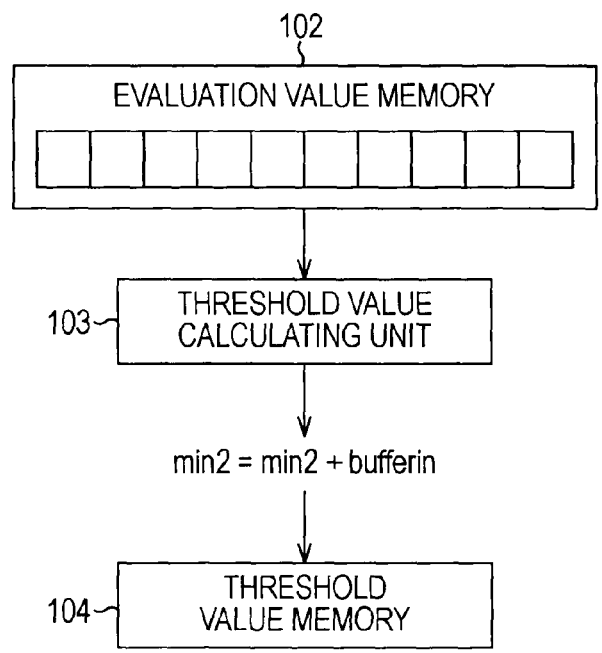
FIG. 23 is a diagram for describing calculation processing of a threshold value for still/movement determination.

With the example in FIG. 23, ten difference evaluation values are stored in the evaluation value memory 102. The threshold value calculating unit 103 sorts the difference evaluation values in ascending order, obtains the 2nd minimum value, and takes this as a threshold value min2. For example, in the event that the evaluation values are 10, 10, 30, 40, and so on (i.e., in the case of the two minimum evaluation values), the minimum evaluation value "10" is taken as the threshold value min2.

Subsequently, the threshold value calculating unit 103 adds a predetermined value (bufferin) to the threshold value, and stores the value to which the predetermined value is added in the threshold value memory 104 as the threshold value min2 (=min2+bufferin).

This predetermined value (bufferin) is a value to be added to prevent erroneous determination due to noise of an analog route and so forth, and as for the predetermined value (bufferin), any value of 0 through 20 is employed.

Next, description will be made again with reference to FIG. 24 regarding a still position of the 2-3 pulldown patterns in 12 fields described above with reference to FIG. 11. Note that the details of the patterns have been described with reference to FIG. 1, so the description thereof would be redundant and accordingly will be omitted.

With the example in FIG. 24, 12 fields (top: top fields, bottom: bottom fields) employed for determination of the 2-3 pulldown pattern are illustrated with squares and circles for each pattern number, circles represent that the fields thereof are set of three fields of 2-3 pulldown, and squares represent that the fields thereof are set of two fields of 2-3 pulldown.

Also, a number denoted with each field represents an input order, which represents that the smaller the number is, the more recent the field is input. That is to say, the field denoted with a number 0 is a field now input. Further, with the example in FIG. 24, "s" or "m" is denoted with between frames, between frames (i.e., between a set of three fields) denoted with "s" is a position to be determined to be still, and between frames (i.e., between a set of three fields and a set of two fields) denoted with "m" is a position to be determined to include movement.

Description will be made in order from the top in the drawing. The still position in the case of a pattern number 5B (i.e., the pattern is 5, and the field now input is a bottom field) is between the 9th field and 11th field in input order (i.e., 9th between fields), and between the 4th field and 6th field in input order (i.e., 4th between fields).

That is to say, in the case of the configuration of 12 fields being the pattern number 5B, the 1st or 2nd minimum evaluation value is stored in the 4th and 9th of the evaluation value memory 102, so the value of 1 indicating stillness is written in the 4th and 9th positions of the evaluation value table 103.

The still position in the case of a pattern number 1T (i.e., the pattern is 1, and the field now input is a top field) is between the 0th field and 2nd field in input order (i.e., 0th between fields), and between the 5th field and 7th field in input order (i.e., 5th between fields).

That is to say, in the case of the configuration of 12 fields being the pattern number 1T, the 1st or 2nd minimum evaluation value is stored in the 0th and 5th of the evaluation value memory 102, so the value of 1 indicating stillness is written in the 0th and 5th positions of the evaluation value table 103.

Note that in the case of the pattern number 1T, the top field is input, and the set of three fields are gathered, and accordingly the case of the pattern number 1T is taken as one of inverse 2-3 pulldown starting conditions.

The still position in the case of a pattern number 1B (i.e., the pattern is 1, and the field now input is a bottom field) is between the 1st field and 3rd field in input order (i.e., 1st between fields), and between the 6th field and 8th field in input order (i.e., 6th between fields).

That is to say, in the case of the configuration of 12 fields being the pattern number 1B, the 1st or 2nd minimum evaluation value is stored in the 1st and 6th of the evaluation value memory 102, so the value of 1 indicating stillness is written in the 1st and 6th positions of the evaluation value table 103.

The still position in the case of a pattern number 2T (i.e., the pattern is 2, and the field now input is a top field) is between the 2nd field and 4th field in input order (i.e., 2nd between fields), and between the 7th field and 9th field in input order (i.e., 7th between fields).

That is to say, in the case of the configuration of 12 fields being the pattern number 2T, the 1st or 2nd minimum evaluation value is stored in the 2nd and 7th of the evaluation value memory 102, so the value of 1 indicating stillness is written in the 2nd and 7th positions of the evaluation value table 103.

Note that in the case of the pattern number 2T, the top field is input, and the set of two fields are gathered, and accordingly the case of the pattern number 2T is taken as one of inverse 2-3 pulldown starting conditions.

The still position in the case of a pattern number 2B (i.e., the pattern is 2, and the field now input is a bottom field) is between the 3rd field and 5th field in input order (i.e., 3rd between fields), and between the 8th field and 10th field in input order (i.e., 8th between fields).

That is to say, in the case of the configuration of 12 fields being the pattern number 2B, the 1st or 2nd minimum evaluation value is stored in the 3rd and 8th of the evaluation value memory 102, so the value of 1 indicating stillness is written in the 3rd and 8th positions of the evaluation value table 103.

The still position in the case of a pattern number 3T (i.e., the pattern is 3, and the field now input is a top field) is between the 4th field and 6th field in input order (i.e., 4th between fields), and between the 9th field and 11th field in input order (i.e., 9th between fields).

That is to say, in the case of the configuration of 12 fields being the pattern number 3T, the 1st or 2nd minimum evaluation value is stored in the 4th and 9th of the evaluation value memory 102, so the value of 1 indicating stillness is written in the 4th and 9th positions of the evaluation value table 103.

The still position in the case of a pattern number 3B (i.e., the pattern is 3, and the field now input is a bottom field) is between the 5th field and 7th field in input order (i.e., 5th between fields), and between the 0th field and 2nd field in input order (i.e., 0th between fields).

That is to say, in the case of the configuration of 12 fields being the pattern number 3B, the 1st or 2nd minimum evaluation value is stored in the 5th and 0th of the evaluation value memory 102, so the value of 1 indicating stillness is written in the 5th and 0th positions of the evaluation value table 103.

Note that in the case of the pattern number 3B, the bottom field is input, and the set of three fields are gathered, and accordingly the case of the pattern number 3B is taken as one of inverse 2-3 pulldown starting conditions.

The still position in the case of a pattern number 4T (i.e., the pattern is 4, and the field now input is a top field) is between the 6th field and 8th field in input order (i.e., 6th between fields), and between the 1st field and 3rd field in input order (i.e., 1st between fields).

That is to say, in the case of the configuration of 12 fields being the pattern number 4T, the 1st or 2nd minimum evaluation value is stored in the 6th and 1st of the evaluation value memory 102, so the value of 1 indicating stillness is written in the 6th and 1st positions of the evaluation value table 103.

The still position in the case of a pattern number 4B (i.e., the pattern is 4, and the field now input is a bottom field) is between the 7th field and 9th field in input order (i.e., 7th between fields), and between the 2nd field and 4th field in input order (i.e., 4th between fields).

That is to say, in the case of the configuration of 12 fields being the pattern number 4B, the 1st or 2nd minimum evaluation value is stored in the 7th and 4th of the evaluation value memory 102, so the value of 1 indicating stillness is written in the 7th and 4th positions of the evaluation value table 103.

Note that in the case of the pattern number 4B, the bottom field is input, and the set of two fields are gathered, and accordingly the case of the pattern number 4B is taken as one of inverse 2-3 pulldown starting conditions.

The still position in the case of a pattern number 5T (i.e., the pattern is 5, and the field now input is a top field) is between the 8th field and 10th field in input order (i.e., 8th between fields), and between the 3rd field and 5th field in input order (i.e., 3rd between fields).

That is to say, in the case of the configuration of 12 fields being the pattern number 5T, the 1st or 2nd minimum evaluation value is stored in the 8th and 3rd of the evaluation value memory 102, so the value of 1 indicating stillness is written in the 8th and 3rd positions of the evaluation value table 103.

Note that those 2-3 pulldown patterns may be summarized in the LUT (Look Up Table) 122 shown in FIG. 25 depending on in what position of the evaluation value memory 102 a still position is stored.

With the LUT 122 in FIG. 25, at the left side 0(T) representing that the current field (i.e., the field now input) is a top field, and 1(B) representing that the current field is a bottom field are shown. Also, at the upper portion in order from the left side, states 1 through 5 which means the 2-3 pull down pattern numbers in FIG. 24 are shown.

That is to say, the LUT 122 shows that in the case of the current field being 0 (top field), if the state (2-3 pulldown pattern) is 1, the 0th and 5th values of the evaluation value table 106 are 1 indicating stillness, if the state (2-3 pulldown pattern) is 2, the 2nd and 7th values of the evaluation value table 106 are 1 indicating stillness, if the state (2-3 pulldown pattern) is 3, the 4th and 9th values of the evaluation value table 106 are 1 indicating stillness, if the state (2-3 pulldown pattern) is 4, the 6th and 1st values of the evaluation value table 106 are 1 indicating stillness, and if the state (2-3 pulldown pattern) is 5, the 8th and 3rd values of the evaluation value table 106 are 1 indicating stillness.

Also, the LUT 122 shows that in the case of the current field being 1 (bottom field), if the state (2-3 pulldown pattern) is 1, the 1st and 6th values of the evaluation value table 106 are 1 indicating stillness, if the state (2-3 pulldown pattern) is 2, the 3rd and 8th values of the evaluation value table 106 are 1 indicating stillness, if the state (2-3 pulldown pattern) is 3, the 5th and 0th values of the evaluation value table 106 are 1 indicating stillness, if the state (2-3 pulldown pattern) is 4, the 7th and 2nd values of the evaluation value table 106 are 1 indicating stillness, and if the state (2-3 pulldown pattern) is 5, the 9th and 4th values of the evaluation value table 106 are 1 indicating stillness.

Accordingly, an arrangement can be made wherein the flag setting unit 121 refers to this LUT 122, and in the case of the current field being a top field, of the values stored in the evaluation value table 106, if the 0th and 5th values are 1, determines that the state (2-3 pulldown pattern) is 1, sets 1 to the state 1 of the state flag (sflag) of the state flag memory 123, and of the values stored in the evaluation value table 106, if the 2nd and 7th values are 1, determines that the state (2-3 pulldown pattern) is 2, sets 1 to the state 2 of the state flag (sflag) of the state flag memory 123, and of the values stored in the evaluation value table 106, if the 4th and 9th values are 1, determines that the state (2-3 pulldown pattern) is 3, sets 1 to the state 3 of the state flag (sflag) of the state flag memory 123.

Also, an arrangement can be made wherein of the values stored in the evaluation value table 106, if the 6th and 1st values are 1, the flag setting unit 121 determines that the state (2-3 pulldown pattern) is 4, sets 1 to the state 4 of the state flag (sflag) of the state flag memory 123, and of the values stored in the evaluation value table 106, if the 8th and 3rd values are 1, determines that the state (2-3 pulldown pattern) is 5, sets 1 to the state 5 of the state flag (sflag) of the state flag memory 123.

Further, an arrangement can be made wherein the flag setting unit 121 refers to this LUT 122, and in the case of the current field being a bottom field, of the values stored in the evaluation value table 106, if the 1st and 6th values are 1, determines that the state (2-3 pulldown pattern) is 1, sets 1 to the state 1 of the state flag (sflag) of the state flag memory 123, and of the values stored in the evaluation value table 106, if the 3rd and 8th values are 1, determines that the state (2-3 pulldown pattern) is 2, sets 1 to the state 2 of the state flag (sflag) of the state flag memory 123, and of the values stored in the evaluation value table 106, if the 5th and 0th values are 1, determines that the state (2-3 pulldown pattern) is 3, sets 1 to the state 3 of the state flag (sflag) of the state flag memory 123.

Also, an arrangement can be made wherein of the values stored in the evaluation value table 106, if the 7th and 2nd values are 1, the flag setting unit 121 determines that the state (2-3 pulldown pattern) is 4, sets 1 to the state 4 of the state flag (sflag) of the state flag memory 123, and of the values stored in the evaluation value table 106, if the 9th and 4th values are 1, determines that the state (2-3 pulldown pattern) is 5, sets 1 to the state 5 of the state flag (sflag) of the state flag memory 123.

Next, the setting method of the state flag will be described specifically with reference to FIG. 26 and FIG. 27.

Figure 26:
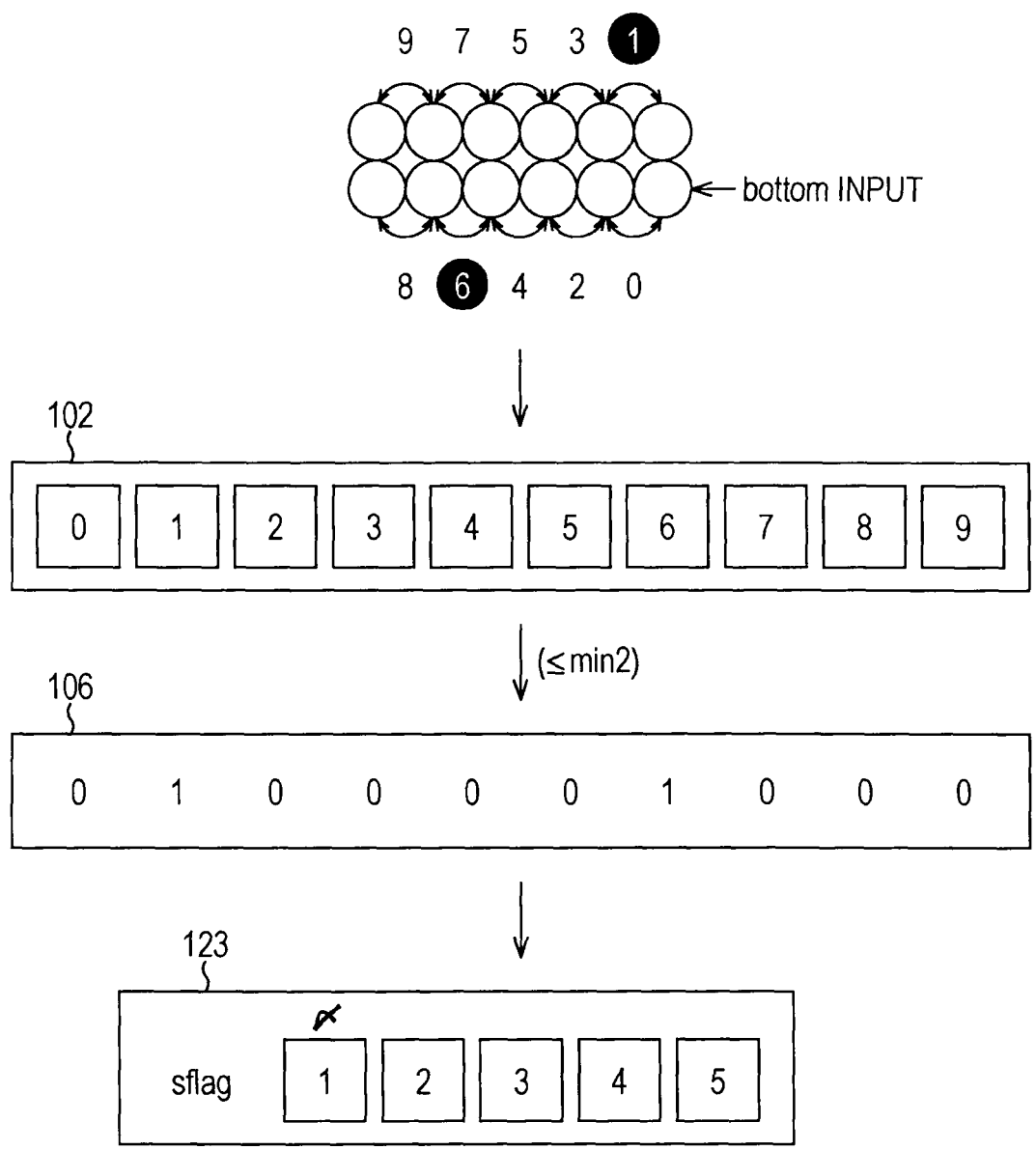
FIG. 26 is a diagram for describing a specific state flag setting method.

The example shown in FIG. 26 illustrates 12 fields in the case of a bottom field being input now. Numbers are denoted between 10 fields of the 12 fields, and these numbers represent orders wherein difference evaluation values are calculated between fields in descending order. That is to say, the greater the number is, the former a difference evaluation value is calculated temporally. Further, numbers within black dots represent that the evaluation value thereof is equal to or smaller than the threshold value min2.

Also, the difference evaluation value between each of fields is stored in the evaluation value memory 102 in order wherein the difference evaluation values were calculated (i.e., descending order of number), the 0th through 9th values are written in the evaluation value table 106, which corresponds to each of the difference evaluation values of the evaluation value memory 102.

In the case of the example in FIG. 26, still/movement determination is made by the evaluation value still/movement determining unit 105 that the difference evaluation value between fields to which 1 and 6 are denoted is equal to or smaller than the threshold value min2, and 1 is written in the positions corresponding to the 1st and 6th evaluation values of the evaluation value memory 102.

That is to say, in this case, upon a bottom field being input now, and 1 is written in the 1st and 6th of the evaluation value table 106, so the flag setting unit 121 refers to the LUT 122 to determine that the current state is the state 1, and 1 is set to the flag of the state 1 of the state flag (sflag).

Figure 27:
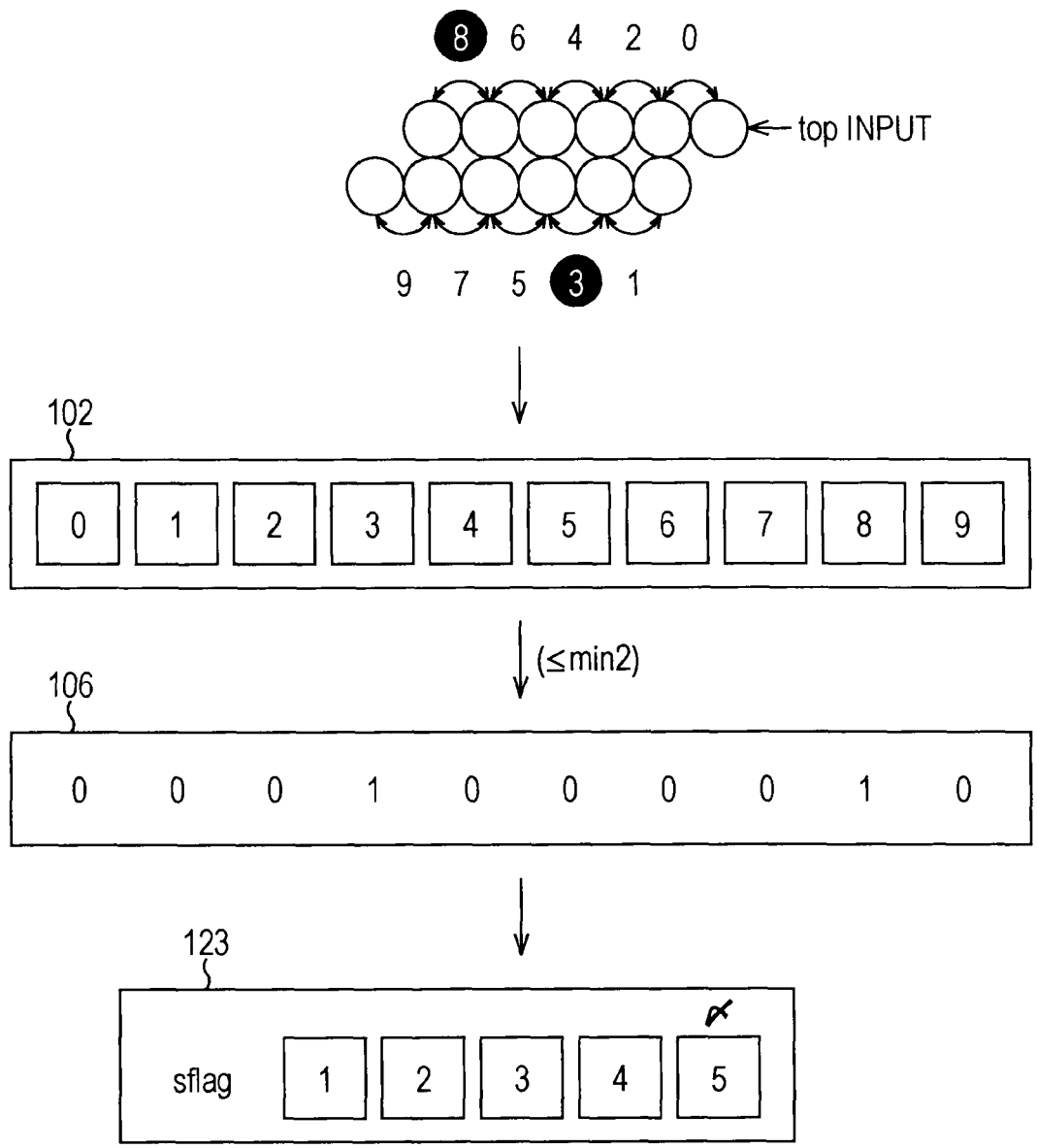
FIG. 27 is a diagram for describing a specific state flag setting method.

The example shown in FIG. 27 illustrates 12 fields in the case of a top field being input now.

In the case of the example in FIG. 27, still/movement determination is made by the evaluation value still/movement determining unit 105 that the difference evaluation value between fields to which 8 and 3 are denoted is equal to or smaller than the threshold value mint, and 1 is written in the positions corresponding to the 8th and 3rd evaluation values of the evaluation value memory 102.

That is to say, in this case, upon a bottom field being input now, and 1 is written in the 8th and 3rd of the evaluation value table 106, so the flag setting unit 121 refers to the LUT 122 to determine that the current state is the state 5, and 1 is set to the flag of the state 5 of the state flag (sflag).

Note that according to the still/movement determination, the number of difference evaluation values which are determined to be equal to or smaller than the threshold value min2, and the number of ones to be written in the evaluation value table is not restricted to two. For example, in the case of little movement, the number of difference evaluation values which are determined to be equal to or smaller than the threshold value min2 is sometimes two or more, two ones or more are sometimes written in the evaluation value table.

In this case, the flag setting unit 121 refers to the LUT 122 to set 1 to the flags of all the states to which the state flag (sflag) is applied.

Next, description will be made regarding the calculation of the number of movement fields by the movement field number calculating unit 107 with reference to FIG. 28.

Figure 28:
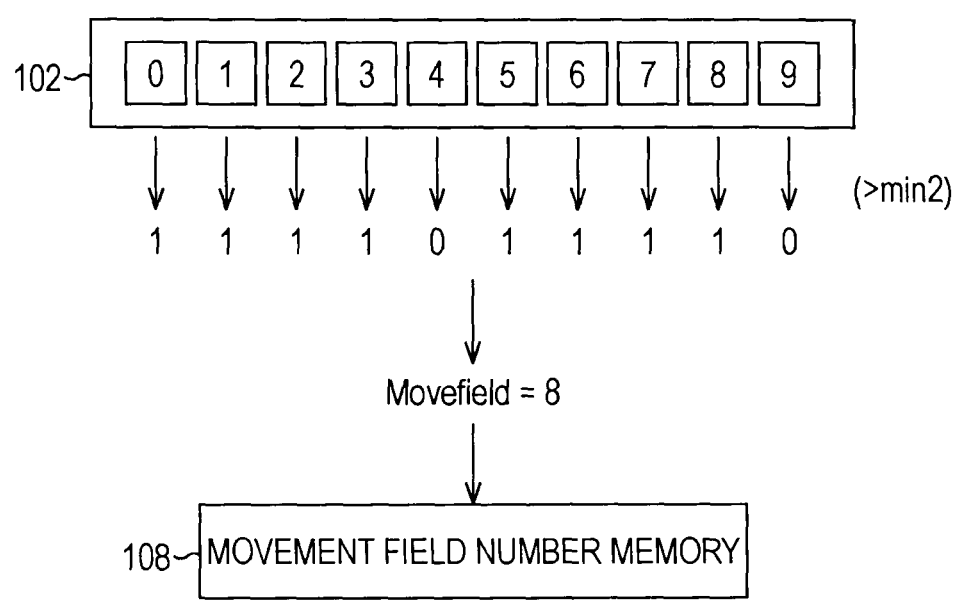
FIG. 28 is a diagram for describing calculation processing of the number of movement fields.

The example shown in FIG. 28 illustrates a case wherein the difference evaluation value between each of fields is stored in the evaluation value memory 102 in order wherein the difference evaluation values were calculated (i.e., descending order of number), and the 4th and 9th difference evaluation values to be stored in the evaluation value memory 102 are, for example, smaller than the threshold value min2.

Of the evaluation value memory 102, the movement field number calculating unit 107 counts the counter built therein by only the number of difference evaluation values which are greater than the threshold value min2. In the case of the example shown in FIG. 28, determination is made that the 0th through 3rd, and 5th through 8th difference evaluation values are greater than the threshold value min2, so the counter is incremented by 8. Accordingly, the movement field number calculating unit 107 stores 8 indicated by the counter in the movement field number memory 108 as the number of movement fields (Movefield).

That is to say, the number of movement fields is feature quantity indicating that the greater the number is, the more 12 fields include movement, and on the other hand, the smaller the number is, the more an image is still.

Next, the evaluation value feature quantity calculation processing of the evaluation value feature quantity calculating unit 32 will be described with reference to the flowchart in FIG. 29. Note that this evaluation value feature quantity calculation processing corresponds to the processing in step S13 in FIG. 15.

Figure 15:
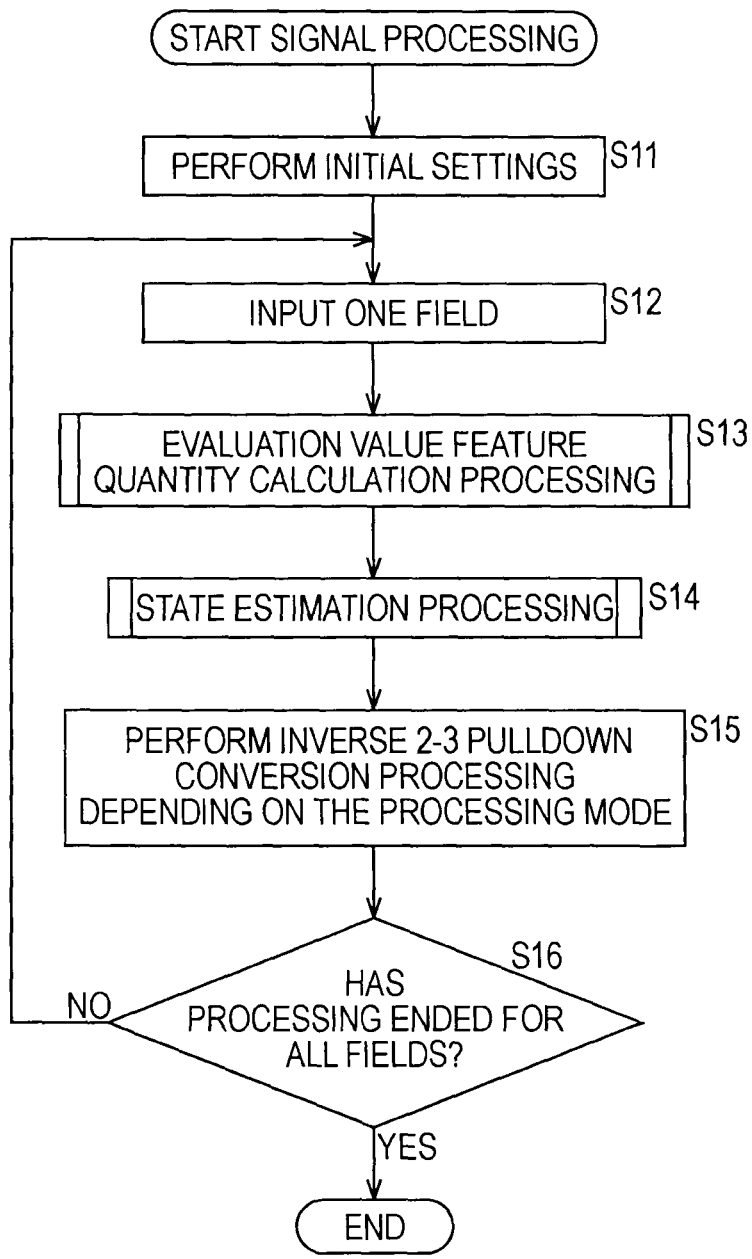
FIG. 15 is a flowchart for describing signal processing with the signal processing device 1 in FIG. 6.

In step S12 in FIG. 15, one field n is input from the input terminal 11. In step S51, the difference evaluation value calculating unit 101 uses the field n of the 60I signal from the input terminal 11, and a field n−2 which is positioned temporally two fields earlier than the field n input from the input terminal 11, which is stored in the field memory 31, to execute the difference evaluation value calculation processing between the fields n and n−2. The details of this difference evaluation value calculation processing will be described later with reference to the flowchart in FIG. 30.

Upon the difference evaluation value between the fields n and n−2 being calculated by the difference evaluation value calculation processing in step S12, the difference evaluation value calculating unit 101 stores this in the evaluation value memory 102.

Figure 29:
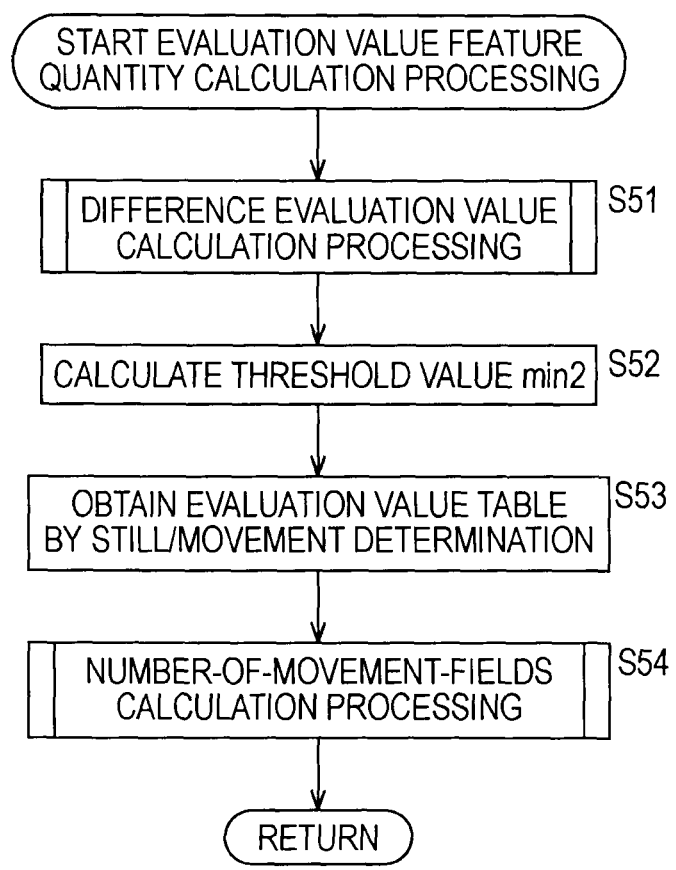
FIG. 29 is a flowchart for describing the evaluation value feature quantity calculation processing in step S13 of FIG. 15.

Here, the processing in step S52 and thereafter is executed as to 12 fields (i.e., between 10 fields), so at the time of starting actual processing, the processing in step S12 in FIG. 15 and in step S51 in FIG. 29 is repeatedly continued until the 12th field is input, and 10 difference evaluation values are stored in the evaluation value memory 102.

Upon 10 difference evaluation values being stored in the evaluation value memory 102, in step S52 the evaluation value still/movement determining unit 105 obtains the 2nd minimum value of the difference evaluation values stored in the evaluation value memory 102, adds a predetermined value thereto to calculate the threshold value min2 for still/movement determination, and stores the calculated threshold value min2 in the threshold value memory 104.

Upon the threshold value min2 for still/movement determination being stored in the threshold value memory 104, in step S53 the evaluation value still/movement determining unit 105 obtains the evaluation value table 106 by still/movement determination. That is to say, the evaluation value still/movement determining unit 105 compares the difference evaluation values between 10 fields stored in the evaluation value memory 102 and the threshold value min2 stored in the threshold value memory 104 to perform still/movement determination (matching/non-matching determination) between the 10 fields.

The evaluation value still/movement determining unit 105 determines between fields of which the difference evaluation value is equal to or smaller than the threshold value min2 to be still, and writes 1 in the evaluation value table 106, and on the other hand, determines between fields of which the difference evaluation value is greater than the threshold value min2 to include movement, and writes 0 in the evaluation value table 106, and generates the evaluation value table 106 serving as feature quantity indicating still/movement positions between the 10 fields.

In step S54, the movement field number calculating unit 107 uses the difference evaluation values between 10 fields stored in the evaluation value memory 102 and the threshold value min2 stored in the threshold value memory 104 to execute the number-of-moving-fields calculation processing. The details of this number-of-moving-fields calculation processing will be described later with reference to the flowchart in FIG. 32.

According to the number-of-moving-fields calculation processing in step S54, the number of movement fields (Movefield) serving as feature quantity representing how many fields of 12 fields include movement is calculated, and this is stored in the movement field number memory 108. Thus, the evaluation value feature quantity calculation processing is ended, and the processing returns to step S13 in FIG. 15, and proceeds to step S14.

Next, the difference evaluation value calculation processing in step S51 in FIG. 29 will be described with reference to the flowchart in FIG. 30. Note that in FIG. 30, description will be made regarding an example of the processing of the difference evaluation value calculating unit 101-1 for calculating the difference evaluation value max described above with reference to FIG. 20.

In step S71, the difference evaluation value calculating unit 101-1 sets the max to an initial value 0, and in step S72 substitutes the next pixel of the field n for A, and substitutes the next pixel of the field n−2 for B.

The pixels of the fields n and n−2 are selected in raster scan order from the upper left pixel of the region E in FIG. 18, and are substituted for A and B, respectively.

In step S73, the difference evaluation value calculating unit 101-1 determines regarding whether or not the absolute value of the difference between A and B is greater than the max, and in the event that determination is made that the absolute value of the difference between A and B is greater than the max, in step S74 replaces the max with the absolute value of the difference between A and B determined to be greater than the max.

In the event that determination is made in step S73 that the absolute value of the difference between A and B is equal to or smaller than the max, the processing skips step S74, and proceeds to step S75.

In step S75, the difference evaluation value calculating unit 101-1 determines regarding whether or not the processing for all the pixels within the region E of the field has been completed, and in the event of determining that the processing for all the pixels within the region E of the field has been completed, in step S76 stores the max in the evaluation value memory 102 as a difference evaluation value max(n, n−2).

In the event that determination is made in step S75 that the processing for all the pixels within the region E of the field has not been completed, the processing returns to step S72, and the subsequent processing is repeated.

Next, the difference evaluation value calculation processing in step S51 in FIG. 29 will be described with reference to the flowchart in FIG. 31. That is to say, the processing in FIG. 31 is another example of FIG. 30, and in FIG. 31, description will be made regarding an example of the processing of the difference evaluation value calculating unit 101-2 for calculating the difference evaluation value sum described above with reference to FIG. 21.

In step S91, the difference evaluation value calculating unit 101-2 sets the sum to an initial value 0, and in step S92 substitutes the next pixel of the field n for A, and substitutes the next pixel of the field n−2 for B.

Note that in this case as well, the pixels of the fields n and n−2 are selected in raster scan order from the upper left pixel of the region E in FIG. 18, and are substituted for A and B, respectively.

In step S93, the difference evaluation value calculating unit 101-1 adds the absolute value of the difference between A and B to the sum, and in step S94 determines regarding whether or not the processing for all the pixels within the region E of the field has been completed.

In the event of determining in step S94 that the processing for all the pixels within the region E of the field has been completed, in step S95 the difference evaluation value calculating unit 101-1 stores the sum in the evaluation value memory 102 as a difference evaluation value sum(n, n−2).

In the event that determination is made in step S94 that the processing for all the pixels within the region E of the field has not been completed, the processing returns to step S92, and the subsequent processing is repeated.

Next, the number-of-moving-fields calculation processing in step S54 in FIG. 29 will be described with reference to the flowchart in FIG. 32.

As described above with reference to FIG. 28, 10 difference evaluation values are stored in the evaluation value memory 102.

In step S111, the movement field number calculating unit 107 sets the Movefield to an initial value 0, and in step S112 substitutes the next difference evaluation value of the difference evaluation values stored in the evaluation value memory 102 for X. Note that the difference evaluation values in the evaluation value memory 102 may be substituted in ascending order from the 0th difference evaluation value, or may be substituted in descending order from the 9th difference evaluation value.

In step S113, the movement field number calculating unit 107 determines regarding whether or not X is greater than the threshold value min2, and in the event of determining that X is greater than the threshold value min2, in step S114 counts the Movefield.

In the event that determination is made in step S113 that X is equal to or smaller than the threshold value min2, the processing skips step S114 and proceeds to step S115.

In step S115, the movement field number calculating unit 107 determines regarding whether or not the processing for 10 difference evaluation values has been completed, and in the event of determining that the processing for 10 difference evaluation values has been completed, proceeds to step S116 to store the Movefield in the movement field number memory 108 as the number of movement fields.

In the event that determination is made in step S115 that the processing for 10 difference evaluation values has not been completed, the processing returns to step S112, and the subsequent processing is repeated.

Thus, difference evaluation values are calculated, and the difference evaluation values are employed to calculate the threshold value min2 and evaluation value table 106 employed for 2-3 pulldown determination, and the number of movement fields (Movefield).

Next, the state estimation processing in step S14 in FIG. 15 will be described with reference to the flowchart in FIG. 33.

In step S131, the flag setting unit 121 refers to the evaluation value table 106 and LUT 122 to set the state flag (sflag).

That is to say, the flag setting unit 121 refers to the 2-3 pulldown states (patterns) indicated by the LUT 122 in FIG. 25, refers to FIG. 26 and FIG. 27 as described above, determines regarding whether or not the values of the evaluation value table 106 fit the 2-3 pulldown states indicated by the LUT 122, and of all of the states of the state flag (sflag), sets 1 to the flags corresponding to all the states of the 2-3 pulldown states determined to be applied to set the state flag (sflag). Subsequently, the flag setting unit 121 stores the state flag thereof (sflag) in the state flag memory 123.

Note that in the event that the values of the evaluation value table 106 do not fit any of the 2-3 pulldown states indicated by the LUT 122, 1 is not set to the flag corresponding to any state of the state flag.

In step S132, the state estimation processing unit 124 determines regarding whether or not the current input field is a top field, and in the event of determining that the current input field is a top field, in step S133 sets a variable next to a variable state+1. Also, in the event of determining in step S132 that the current input field is a bottom field, in step S134 the state estimation processing unit 124 sets the variable next to the variable state.

Now, the variable next represents a state which should be transitioned next in the transition order of the above-described patterns described above with reference to FIG. 11, and the variable state represents the current state which estimated in the previous processing (i.e., previous current state).

That is to say, in the event that the input field is a top field, as shown in the state transition of the 2-3 pulldown patterns shown in FIG. 11, a transition is made from the previous state (e.g., pattern 1) to the next state (i.e., pattern 2). On the other hand, in the event that the input field is a bottom field, a transition is made to the same state (i.e., pattern 1) as the previous state (e.g., pattern 1).

Accordingly, in the event that the input field is a top field, the state next to be transitioned next is set to the previous current state (state+1), and in the event that the input field is a bottom field, the state next to be transitioned next is set to the same state as the previous current state (state).

Note that in step S133, in the event that the previous current state (state) is 5, the state next to be transitioned next is 1.

In step S135, the state estimation processing unit 124 determines regarding whether or not the processing mode of the signal processing device 1, which is set by the mode setting unit 126, is the mode 60. The mode 60 is a processing mode for the inverse 2-3 pulldown conversion unit 22 performing inverse 2-3 pulldown conversion, and the other mode other than the mode 60 (i.e., mode 24) is a processing mode for the inverse 2-3 pulldown conversion unit 22 performing no inverse 2-3 pulldown conversion.

In the event of determining in step S135 that the processing mode is the mode 60, in step S136 the state estimation processing unit 124 executes processing for mode 60. The details of this processing for mode 60 will be described later with reference to the flowchart in FIG. 34.

According to the processing for mode 60 in step S136, determination is made regarding whether or not the current state is to be transitioned to the next, and determination is made regarding whether or not the correct sequence of 2-3 pulldown continues. In the event that determination is made that the current state is to be transitioned to the next, and the correct sequence of 2-3 pulldown continues, the processing mode of the signal processing device 1 is changed to the mode 24, and a mode signal indicating the mode 24 is supplied to the inverse 2-3 pulldown conversion unit 22.

Thus, in step S15 in FIG. 15 described above, the inverse 2-3 pulldown conversion processing is started by the inverse 2-3 pulldown conversion unit 22.

Also, In the event that determination is made that the current state is not to be transitioned to the next, or determination is made that the correct 2-3 pulldown sequence does not continue, the processing mode of the signal processing unit 1 is kept in the mode 60, the state estimation processing is ended, and the processing returns to step S14 in FIG. 15 and proceeds to step S15.

On the other hand, in the event that determination is made in step S135 that the processing mode of the signal processing device 1 is the mode 24, in step S137 the state estimation processing unit 124 executes processing for mode 24. The details of this processing for mode 60 will be described later with reference to the flowchart in FIG. 36.

According to the processing for mode 24 in step S137, determination is made regarding whether or not the current state is to be transitioned to the next, and in the event that determination is made that the current state is not to be transitioned to the next, i.e., in the event that the correct sequence of 2-3 pulldown does not continue, the processing mode of the signal processing device 1 is switched to the mode 60, and a mode signal indicating the mode 60 is supplied to the inverse 2-3 pulldown conversion unit 22.

Thus, in step S15 in FIG. 15 described above, the inverse 2-3 pulldown conversion processing is stopped by the inverse 2-3 pulldown conversion unit 22.

On the other hand, in the event that determination is made that the current state is to be transitioned to the next, the processing mode of the signal processing device 1 is kept in the mode 24, the state estimation processing is ended, and the processing returns to step S14 in FIG. 15 and proceeds to step S15.

Next, the processing for mode 60 in step S136 in FIG. 33 will be described with reference to the flowchart in FIG. 34. Note that the example shown in FIG. 34 is processing in the event that the processing mode is the mode 60, i.e., in the event that the inverse 2-3 pulldown conversion processing is not executed by the inverse 2-3 pulldown conversion unit 22.

In step S151, the state estimation processing unit 124 determines regarding whether or not the previous current state (state) is 0. In the event that the previous current state is not 0 (i.e., any one of 1 through 5), the transition of 2-3 pulldown from the previous state continues in some cases, so in step S152 determination is made regarding whether or not sflag [next] holds, and also the number of movement fields (Movefield)≧threshold value th_mv60 is fulfilled (i.e., the number of movement fields (Movefield) is equal to or greater than the threshold value th_mv60).

That is to say, sflag[next] represents that with the state flag (sflag) of the state flag memory 123, the state next to be transitioned next is in a state in which the flag thereof is set to 1. Also, the threshold value th_mv60 which is compared with the number of movement fields (Movefield) is a threshold value for determining regarding whether or not the number of movement is sufficient, and is any value of 0 through 8, for example, setting the threshold value th_mv60 to 8 enables the inverse 2-3 pulldown processing to be started as far as a 60I signal including movement is input, and the start of the inverse 2-3 pulldown processing can be prevented when inputting a still 60I signal.

Accordingly, with the state flag (sflag) of the state flag memory 123, in the event that the state next to be transitioned next is in a state in which the flag thereof is set to 1, and the number of movement fields (Movefield) is determined to be equal to or greater than the threshold value th_mv60, in step S153 the state estimation processing unit 124 sets the state next to be transitioned next to the present current state (state), and the number of consecutive successes of a state transition (peace) is counted.

In step S154, the number of consecutive successes determining unit 125 determines regarding whether or not the number of consecutive successes of a state transition (peace) is a certain number of times (in this case, threshold value THp) or more. As described above with reference to FIG. 12, the threshold value THp is assumed to be any value of 6 through 30, and is preferably around 10.

Figure 33:
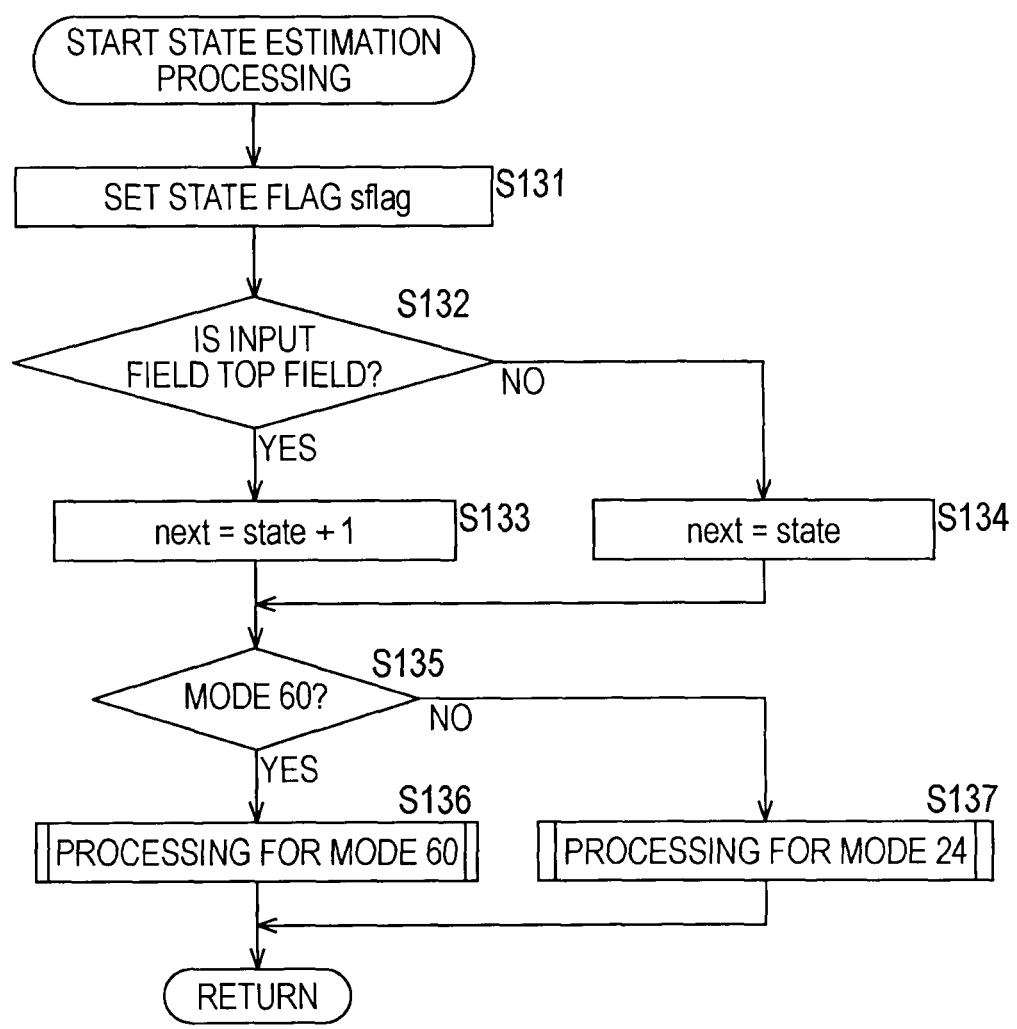
FIG. 33 is a flowchart for describing the state calculation processing in step S14 of FIG. 15.
Figure 34:
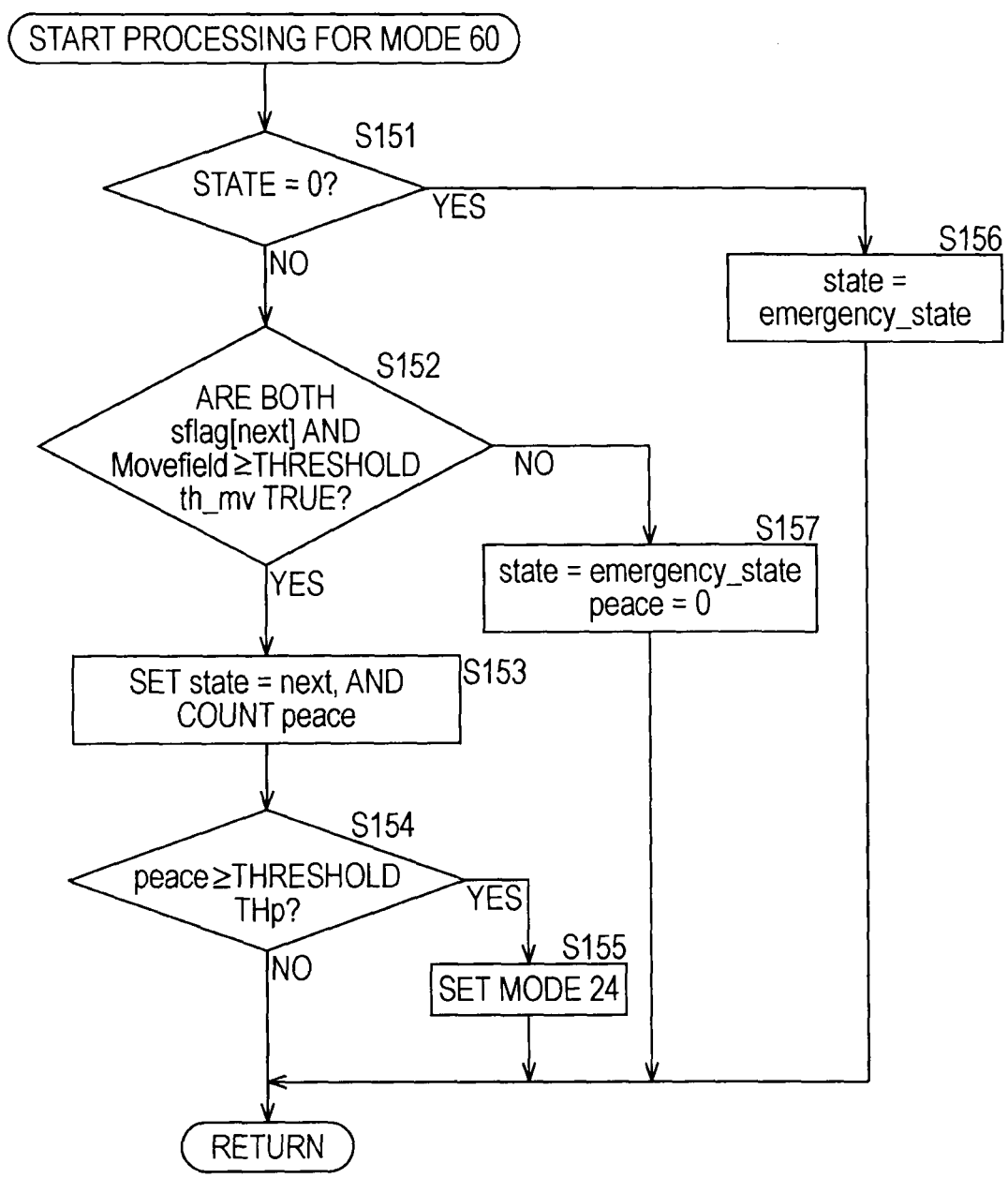
FIG. 34 is a flowchart for describing processing for mode 60 processing in step S136 of FIG. 33.

In the event that determination is made in step S154 that the number of consecutive successes of a state transition (peace) is smaller than the threshold value THp, the processing mode is kept in the mode 60, the processing for mode 60 is ended, and the processing returns to step S136 in FIG. 33.

Also, in the event that determination is made in step S154 that the number of consecutive successes of a state transition (peace) is smaller than the threshold value THp, in step S155 the mode setting unit 126 sets the processing mode of the signal processing device 1, and supplies a mode signal indicating the mode 24 to the inverse 2-3 pulldown conversion unit 22 under the control of the number of consecutive successes determining unit 125. Subsequently, the processing for mode 60 is ended, and the processing returns to step S136 in FIG. 33.

On the other hand, in the event that determination is made in step S151 that the previous current state (state) is 0, in step S156 the state estimation processing unit 124 sets an emergency state emergency_state to the present current state (state), and keeps the processing mode in the mode 60, the processing for mode 60 is ended, and the processing returns to step S136 in FIG. 33.

In the event that the previous current state is 0, the present current state cannot be estimated. Therefore, the emergency state emergency_state is obtained at the position where the state flag (sflag) of which the flag is set to 1, and in the event that the previous current state (state) is 0, the obtained emergency state emergency_state is set to the present current state.

For example, as shown in FIG. 35, the state flag (sflag) is scanned from the state 1, and the position where the last flag is set to 1 is obtained as the emergency state emergency_state.

With the state flag (sflag) at the top row, the flag is set to the state 1 alone. Accordingly, in this case, the emergency state emergency_state becomes the state 1 (emergency_state=1).

With the state flag (sflag) at the second row, the flag is set to the state 1 and state 3. Accordingly, in this case, the emergency state emergency_state becomes the state 3 which is the position of the last flag (emergency_state=3).

With the state flag (sflag) at the third row, no flag is set at all. Accordingly, in this case, the emergency state emergency_state becomes the state 0 (emergency_state=0).

Thus, as a tentative state in the case in which the present current state cannot be determined clearly, the emergency state emergency_state is obtained, and this is used, whereby the previous current state (state) is not determined to be 0 with the next processing in step S151. Thus, the timing for starting inverse 2-3 pulldown can be accelerated slightly.

Note that as a matter of course, in step S156, the state can be determined uniquely without employing the emergency state.

Now, description will be back to FIG. 34, and in the event that determination is made in step S152 that no flag is set to 1 in the state next to be transitioned next, or in the event that the number of movement fields (Movefield) is smaller than the threshold value th_mv60, in step S157 the state estimation processing unit 124 sets the emergency state emergency_state as the present current state (state), and further resets the number of consecutive successes of a state transition (peace) to zero, keeps the processing mode in the mode 60, the processing for mode 60 is ended, and the processing returns to step S136 in FIG. 33.

That is to say, in the event that determination is made that no flag is set to 1 in the state next to be transitioned next, estimation of the present current state cannot be performed well, and in the event that the number of movement fields is smaller than the threshold value th_mv60, the current portion to be processed is a still portion, multiple flags are probably set to 1 in the state flag (sflag), so the present current state cannot be determined clearly, and accordingly, the emergency state emergency_state is set to the present current state (state).

As described above, in the event that the processing mode is the mode 60, the present current state (state) can be estimated well along with the state next to be transitioned next, and only when the number of consecutive successes of a state transition (peace) is determined to be a certain number of times or more, the processing mode is switched to the processing mode 24.

Figure 36:
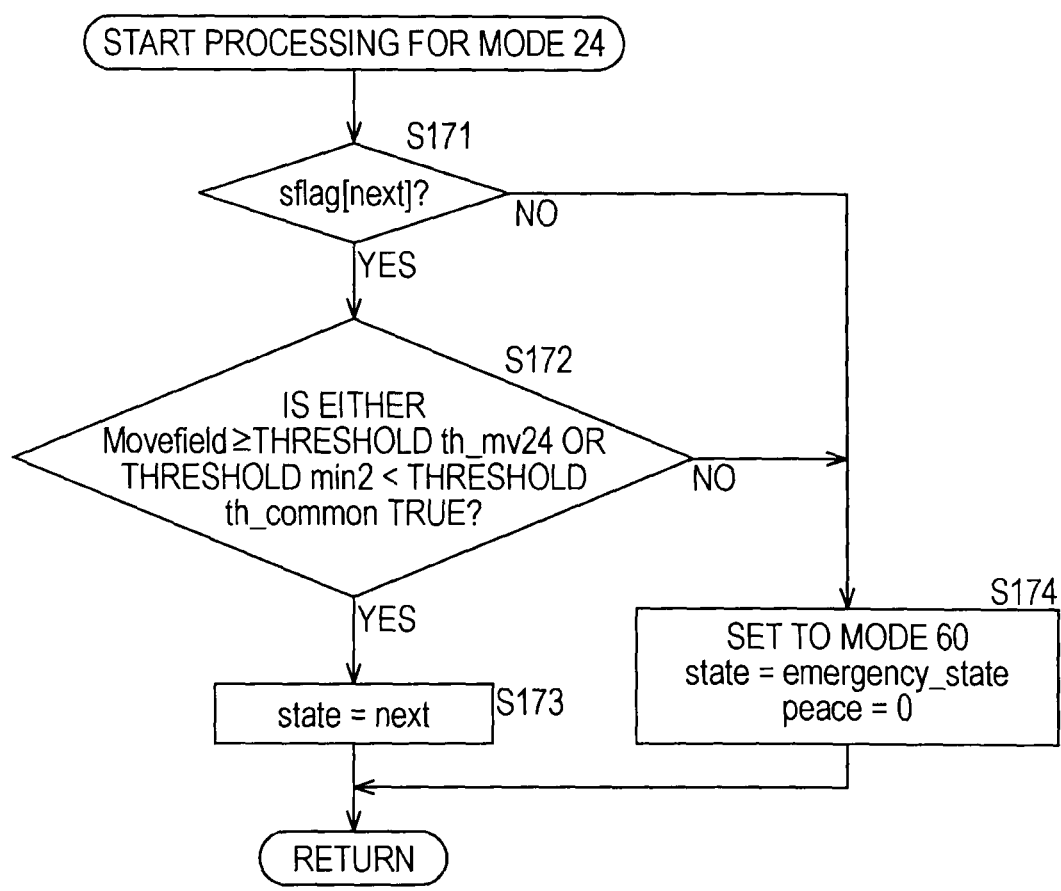
FIG. 36 is a flowchart for describing processing for mode 24 processing in step S137 of FIG. 33.

Next, the processing for mode 24 in step S137 in FIG. 33 will be described with reference to the flowchart in FIG. 36. Note that the example shown in FIG. 36 is processing in the case of the processing mode being the mode 24, i.e., in the case of the inverse 2-3 pulldown conversion unit 22 executing the inverse 2-3 pulldown conversion processing.

In step S171, the state estimation processing unit 124 determines regarding whether or not sflag[next] holds. That is to say, in the event that determination is made in step S171 that with the state flag (sflag) of the state flag memory 123, the flag is set to 1 in the state next to be transitioned next, in step S172 the state estimation processing unit 124 determines regarding whether or not the number of movement fields (Movefield) is equal to or greater than the threshold value th_mv24, or the threshold value min2 is smaller than a threshold value th_common.

Now, the threshold value th_mv24 which is compared with the number of movement fields (Movefield) is, in the same way as with the threshold value th_mv60, a threshold value for determining whether or not the number of movement is sufficient, and is any value of 0 through 8, and may be the same value as the threshold value th_mv60. Also, the threshold value th_common is a threshold value for determining regarding whether or not the threshold value min2 is within a commonsense range, and can be set to any value of 0 through 100, but is preferably set to any value of 40 through 60 for the sake of the measure against the authoring source of 60I signals.

Also, in order to handle a still portion, in the case of the processing mode being the mode 24, unlike that case of step S152 of the mode 60, even if the number of movement is not sufficient, as long as the threshold value min2 is equal to or smaller than the threshold value th_common, the processing mode is kept in the mode 24, and the 2-3 pulldown processing is executed.

Accordingly, in the event that determination is made in step S172 that the number of movement fields (Movefield) is equal to or greater than the threshold value th_mv24, or in the event that determination is made that the threshold value mint is smaller than the threshold value th_common, in step S173 the state estimation processing unit 124 sets the state next to be transitioned next as the present current state (state). That is to say, in this case, the processing mode is kept in the mode 24, the processing for mode 24 is ended, and the processing returns to step S137 in FIG. 33.

On the other hand, in the event that determination is made in step S171 that with the state flag (sflag) in the state flag memory 123, and no flag is set to 1 in the state next to be transitioned next, the transition of 2-3 pulldown does not continue, so this is taken as occurrence of an exception field (wrong input), and the processing proceeds to step S174.

Also, in the event that determination is made in step S172 that the number of movement fields (Movefield) is smaller than the threshold value th_mv24, and also the threshold value min2 is greater than the threshold value th_common, this means that the number of movement fields is not sufficient, and the threshold value min2 exceeds a commonsense range, so the processing proceeds to step S174.

In step S174, the state estimation processing unit 124 controls the mode setting unit 126 to set the processing mode of the signal processing device 1 to the mode 60, and supplies a mode signal indicating the mode 60 to the inverse 2-3 pulldown conversion unit 22, and also sets the emergency state emergency_state as the present current state (state), and further, resets the number of consecutive successes of a state transition (peace) to (zero). The processing for mode 24 is then ended, and the processing returns to step S137 in FIG. 33.

As described above, with the processing for mode 24, in the event that there is a possibility to deviate from the correct 2-3 pulldown sequence, even if the possibility thereof is low, the processing mode is immediately switched to the mode 60, and inverse 2-3 pulldown is stopped. Thus, inverse 2-3 pulldown is processed only when inverse 2-3 pulldown can be performed in a sure manner, whereby the precision of an image generated by inverse 2-3 pulldown improves.

Note that with the above description, as for a difference evaluation value, description has been made regarding the cases employing the maximum value of the absolute values of differences between the fields n and n−2, the sum of the absolute values of differences between the fields n and n−2, and the average value of the absolute values of differences between the fields n and n−2, but as described above, determination of 2-3 pulldown can also be performed using those multiple difference evaluation values.

Figure 37:
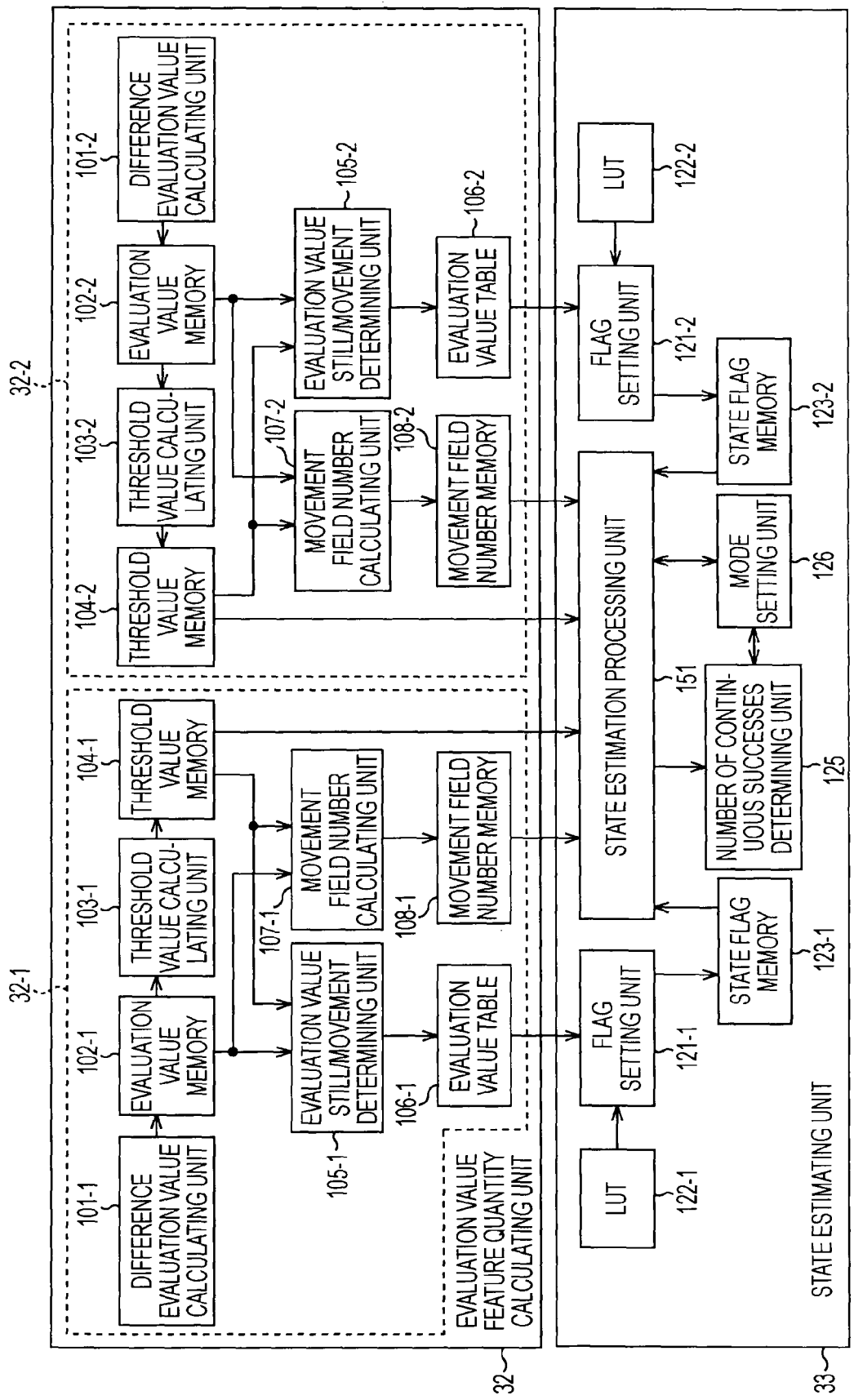
FIG. 37 is a block diagram illustrating another configuration example of the evaluation value feature quantity calculating unit and state estimating unit in FIG. 6.

FIG. 37 is a block diagram illustrating a configuration example of the evaluation value feature quantity calculating unit 32 and state estimation unit 33 in the case of performing 2-3 pulldown determination integrally using two types of difference evaluation values.

With the example shown in FIG. 37, the evaluation value feature quantity calculating unit 32 is configured of an evaluation value feature quantity calculating unit 32-1 employing the maximum value of the absolute values of differences between the fields n and n−2 as a difference evaluation value max, and an evaluation value feature quantity calculating unit 32-2 employing the sum of the absolute values of differences between the fields n and n−2 as a difference evaluation value sum.

The evaluation value feature quantity calculating unit 32-1 is configured of the difference evaluation value calculating unit 101-1 for causing the evaluation value memory 102-1 to store the maximum value of the absolute values of differences between the fields n and n−2 as a difference evaluation value max (FIG. 20), the evaluation value memory 102-1 for storing the difference evaluation value max, a threshold value calculating unit 103-1, threshold value memory 104-1, an evaluation value still/movement determining unit 105-1, an evaluation value table 106-1, a movement field number calculating unit 107-1, and movement field number memory 108-1, which are denoted with a branch number (−1), but each unit has basically the same configuration as that of each unit of the evaluation value feature quantity calculating unit 32 in FIG. 16.

The evaluation value feature quantity calculating unit 32-2 is configured of the difference evaluation value calculating unit 101-2 for causing evaluation value memory 102-2 to store the sum of the absolute values of differences between the fields n and n−2 as a difference evaluation value sum (FIG. 21), the evaluation value memory 102-2 for storing the difference evaluation value sum, a threshold value calculating unit 103-2, threshold value memory 104-2, an evaluation value still/movement determining unit 105-2, an evaluation value table 106-2, a movement field number calculating unit 107-2, and movement field number memory 108-2, which are denoted with a branch number (−2), but each unit has basically the same configuration as that of each unit of the evaluation value feature quantity calculating unit 32 in FIG. 16 except for the difference evaluation value unit 101-2.

Note that the difference evaluation value calculating unit 101-1 and difference evaluation value calculating unit 101-2 differ in the calculation method of a difference evaluation value, so the difference evaluation value max between 10 fields stored in the evaluation value memory 102-1, and the difference evaluation value sum between 10 fields stored in the evaluation value memory 102-2 take a different value.

Accordingly, threshold values, the number of movement fields, and the evaluation value tables which are calculated based on those also differ, so for convenience of description, a threshold value for still/movement determination, which is calculated by the threshold value calculating unit 103-1 with reference to the evaluation value memory 102-1 (difference evaluation value max) and stored in the threshold value memory 104-1, will be referred to as a threshold value min2-1, and a threshold value for still/movement determination, which is calculated by the threshold value calculating unit 103-2 with reference to the evaluation value memory 102-2 (difference evaluation value sum) and stored in the threshold value memory 104-2, will be referred to as a threshold value min2-2.

Also, the number of movement fields, which is calculated by the movement field number calculating unit 107-1 with reference to the evaluation value memory 102-1 (difference evaluation value max) and the threshold value min2-1, will be referred to as the number of movement fields (Movefield1), and the number of movement fields, which is calculated by the movement field number calculating unit 107-2 with reference to the evaluation value memory 102-2 (difference evaluation value sum) and the threshold value min2-2, will be referred to as the number of movement fields (Movefield2).

The state estimation unit 33 in FIG. 37 and state estimation unit 33 in FIG. 16 differ in that one set of flag setting unit 121, LUT 122, and state flag memory 123 are replaced with two sets of flag setting units 121-1 and 121-2, LUTs 122-1 and 122-2, and state flag memory 123-1 and 123-2, and the state estimation processing unit 124 is replaced with the state estimation processing unit 151, but have a commonality in the number of consecutive successes determining unit 125 and mode setting unit 126.

Note that though a branch number is also denoted to the flag setting units 121-1 and 121-2, LUTs 122-1 and 122-2, and state flag memory 123-1 and 123-2, which have basically the same configurations as those of the flag setting unit 121, LUT 122, and state flag memory 123 in FIG. 16. Also, the LUTs 122-1 and 122-2 can be configured so as to refer to one LUT 122.

Note however, for convenience of description, a state flag set with reference to the evaluation value table 106-1 generated based on the evaluation value memory 102-1 (difference evaluation value max), and stored in the state flag memory 123-1 will be referred to a state flag (sflag1), and a state flag set with reference to the evaluation value table 106-2 generated based on the evaluation value memory 102-2 (difference evaluation value sum), and stored in the state flag memory 123-2 will be referred to a state flag (sflag2).

The state estimation processing unit 151 in FIG. 37 refers to an input field (top/bottom), the previous 2-3 pulldown state (pattern), the processing mode set by the mode setting unit 126, each state of the state flag (sflag1) of the state flag memory 123-1, each state of the state flag (sflag2) of the state flag memory 123-2, the number of movement fields (Movefield1) of the movement field number memory 108-1, the number of movement fields (Movefield2) of the movement field number memory 108-2, the threshold value min2-1 of the threshold memory 104-1, the threshold value min2-2 of the threshold memory 104-2, and so forth to estimate the 2-3 pulldown pattern (state) as to 12 fields to be input.

That is to say, the state estimation processing unit 151 uses the two types of difference evaluation value (difference evaluation value max and difference evaluation value sum), and various types of feature quantity obtained from the two types of difference evaluation value to integrally estimate the 2-3 pulldown pattern (state) as to 12 fields to be input.

In the event of the 2-3 pulldown pattern (state) as to 12 fields to be input being estimated, the state estimation processing unit 151 increments the number of consecutive successes of a state transition (peace) by one. Also, in the event of failing to estimate the 2-3 pulldown pattern (state), the state estimation processing unit 124 resets the number of consecutive successes of a state transition (peace) to zero, and refers to at least one of each state flag (sflag1) of the state flag memory 123-1 and each state flag (sflag2) of the state flag memory 123-2 to the emergency state (emergency_state). Note that in this case, when the processing mode is the mode 24, the state estimation processing unit 124 further causes the mode setting unit 126 to switch the processing mode set by the mode setting unit 126 to the mode 60.

Figure 30:
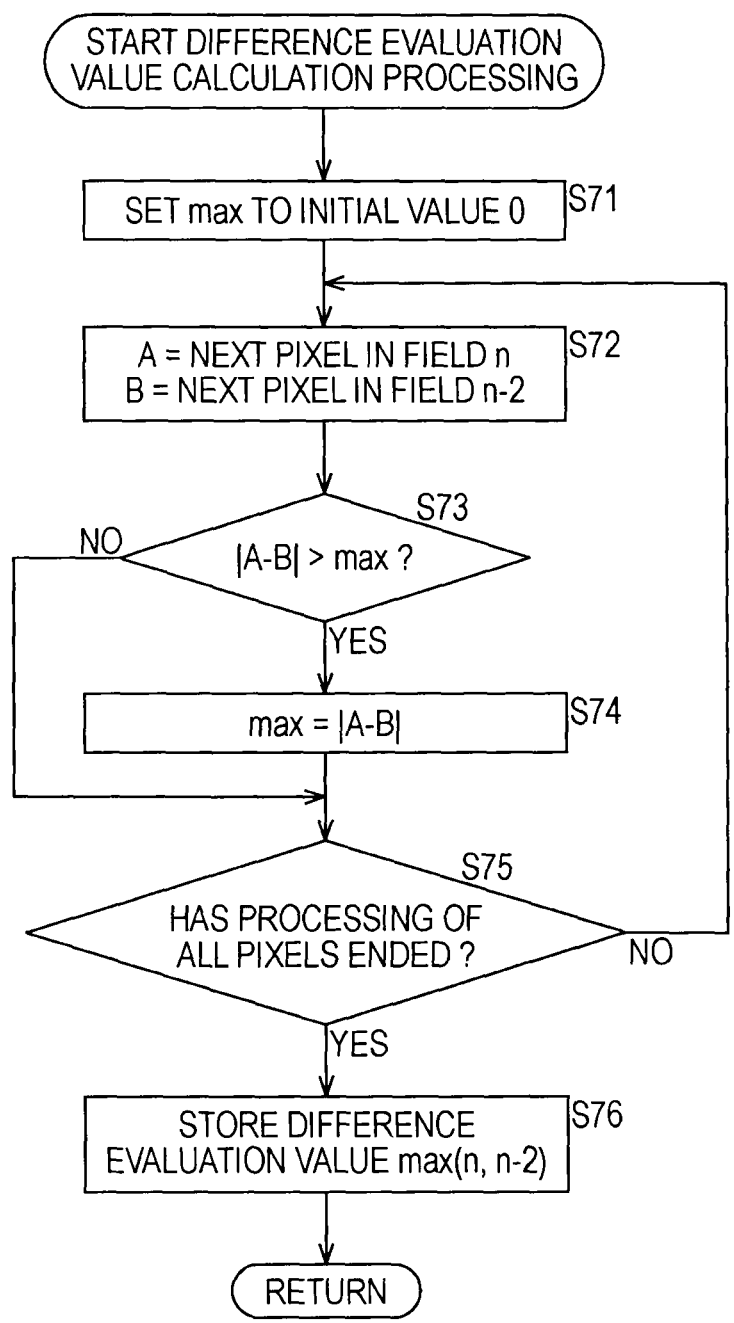
FIG. 30 is a flowchart for describing the difference evaluation value calculation processing in step S51 of FIG. 29.
Figure 31:
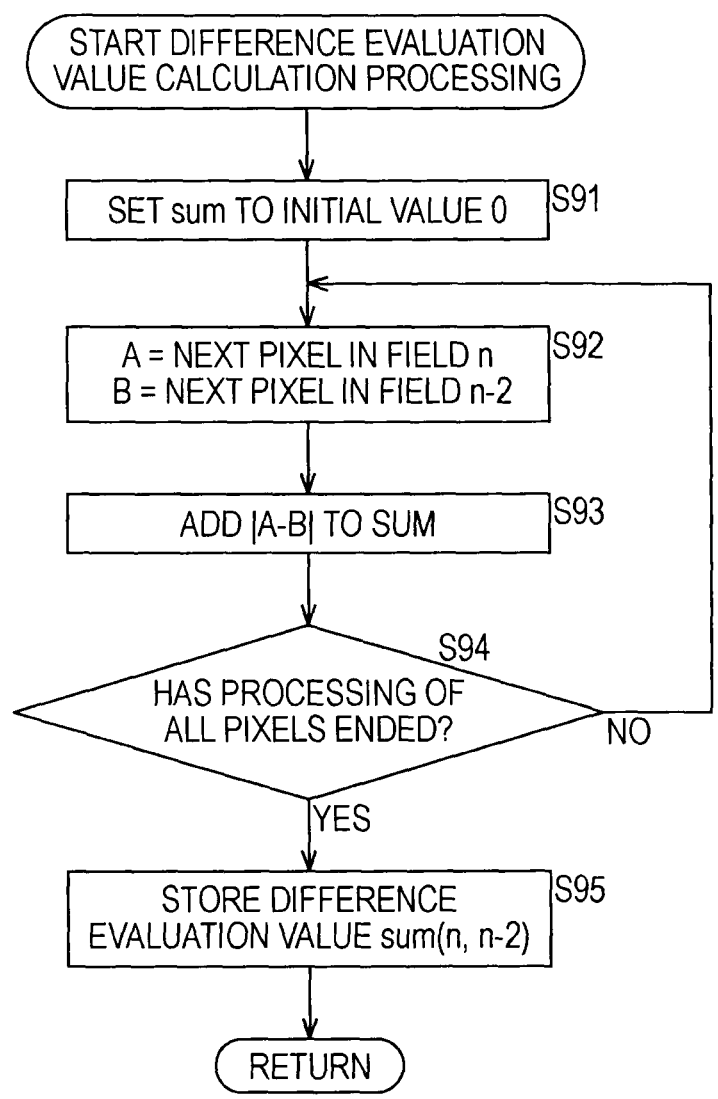
FIG. 31 is a flowchart for describing another example of the difference evaluation value calculation processing in step S51 of FIG. 29.
Figure 32:
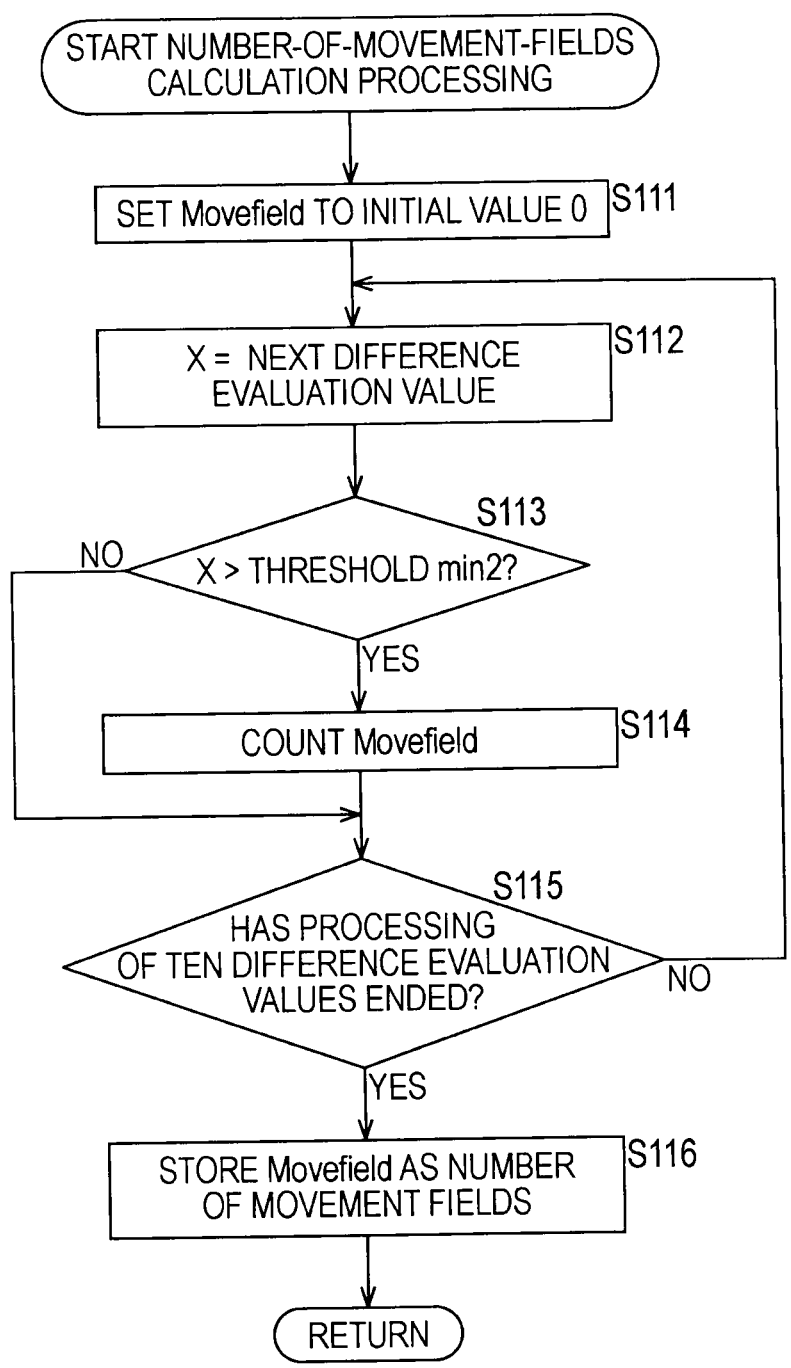
FIG. 32 is a flowchart for describing the number-of-moving-fields calculation processing in step S54 of FIG. 29.

Note that with the evaluation value feature quantity calculation processing performed by the evaluation value feature quantity calculating unit 32 in FIG. 37, the evaluation value feature quantity calculation processing described with reference to FIG. 29 wherein the difference evaluation value calculation processing in FIG. 30 is performed, and the evaluation value feature quantity calculation processing described with reference to FIG. 29 wherein the difference evaluation value calculation processing in FIG. 32 is performed are performed in parallel, which perform basically the same processing as the evaluation value feature quantity calculation processing described with reference to FIG. 29, so the description thereof would be redundant and accordingly will be omitted.

Also, with the sate estimation processing performed by the state estimation unit 33 in FIG. 37, the processing for mode 60 in step S136 and the processing for mode 24 in step S137 differ, but the other processing performs the same processing as the state estimation processing described above with reference to FIG. 33, so the description thereof would be redundant and accordingly will be omitted.

Figure 38:
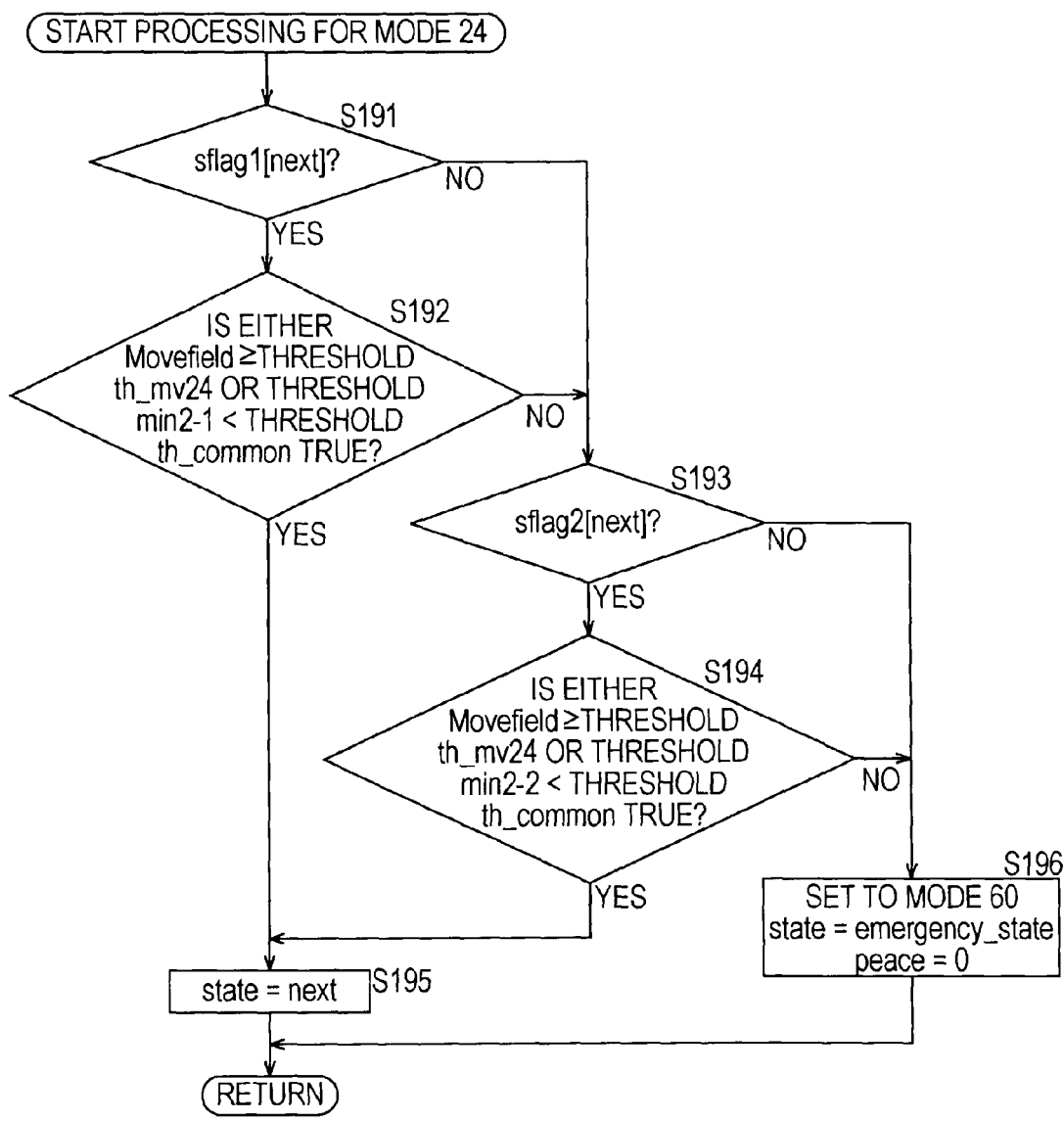
FIG. 38 is a flowchart for describing another example of processing for mode 24 in step S137 of FIG. 33.

Accordingly, with the sate estimation processing performed by the state estimation unit 33 in FIG. 37, of the processing which differs from FIG. 33, the processing for mode 24 in step S137 will be described with reference to the flowchart in FIG. 38. That is to say, FIG. 38 is another example of the processing for mode 24 in FIG. 36.

In step S191, the state estimation processing unit 151 first determines regarding whether or not sflag1[next] of the state flag memory 123-1 based on the difference evaluation value max holds.

In the event that determination is made in step S191 that the state flag (sflag1) of the state flag memory 123-1 is in a state in which the flag is set to 1 in the state next to be transitioned next, in step S192 the state estimation processing unit 151 determines regarding whether the number of movement fields (Movefield1) based on the difference evaluation value max is equal to or greater than the threshold value th_mv24, or the threshold value min2-1 based on the difference evaluation value max is smaller than the threshold value th_common.

In the event that determination is made in step S192 that the number of movement fields (Movefield1) based on the difference evaluation value max is equal to or greater than the threshold value th_mv24, or the threshold value min2-1 based on the difference evaluation value max is smaller than the threshold value th_common, the processing proceeds to step S195.

On the other hand, in the event that determination is made in step S191 that the state flag (sflag1) of the state flag memory 123-1 is not in a state in which the flag is set to 1 in the state next to be transitioned next, the processing proceeds to step S193.

Also, in the event that determination is made in step S192 that the number of movement fields (Movefield1) based on the difference evaluation value max is smaller than the threshold value th_mv24, and also the threshold value min2-1 based on the difference evaluation value max is greater than the threshold value th_common, the processing proceeds to step S193.

In step S193, the state estimation processing unit 151 next determines regarding whether or not sflag2[next] of the state flag memory 123-2 based on the difference evaluation value sum holds.

In the event that determination is made in step S191 that the state flag (sflag2) of the state flag memory 123-2 is in a state in which the flag is set to 1 in the state next to be transitioned next, in step S194 the state estimation processing unit 151 determines regarding whether the number of movement fields (Movefield2) based on the difference evaluation value sum is equal to or greater than the threshold value th_mv24, or the threshold value min2-2 based on the difference evaluation value sum is smaller than the threshold value th_common.

In the event that determination is made in step S194 that the number of movement fields (Movefield2) based on the difference evaluation value sum is equal to or greater than the threshold value th_mv24, or the threshold value min2-2 based on the difference evaluation value sum is smaller than the threshold value th_common, the processing proceeds to step S195.

In step S195, the state estimation processing unit 151 sets the state next to be transitioned next as the present current state (state). That is to say, in this case, the processing mode is kept in the mode 24, the processing for mode 24 is ended, and the processing returns to step S137 in FIG. 33.

On the other hand, in the event that determination is made in step S193 that the state flag (sflag2) of the state flag memory 123-2 based on the difference evaluation value sum is not in a state in which the flag is set to 1 in the state next to be transitioned next, the processing proceeds to step S196.

Also, in the event that determination is made in step S194 that the number of movement fields (Movefield2) based on the difference evaluation value sum is smaller than the threshold value th_mv24, and also the threshold value min2-2 based on the difference evaluation value sum is greater than the threshold value th_common, the processing proceeds to step S196.

In step S196, the state estimation processing unit 151 controls the mode setting unit 126 to set the processing mode of the signal processing device 1 to the mode 60, and supply a mode signal indicating the mode 60 to the inverse 2-3 pulldown conversion unit 22, and also sets the emergency state emergency_state as the present current state (state), and further resets the number of consecutive successes of a state transition (peace) to zero. The processing for mode 24 is then ended, and the processing returns to step S137 in FIG. 33.

Note that in this case, the emergency state may be set based on only the state flag (sflag1) in the state flag memory 123-1, may be set based on only the state flag (sflag2) in the state flag memory 123-2, or may be set in light of both of the state flag (sflag1) in the state flag memory 123-1, and the state flag (sflag2) in the state flag memory 123-2.

As described above, determination may be made integrally by employing multiple difference evaluation values of the difference evaluation value max and difference evaluation value sum. Note that with the example shown in FIG. 38, an arrangement is made wherein a high priority is put on the determination results based on the difference evaluation value max, and only in the case of a state transition failing with the determination results of both of the difference evaluation value max and difference evaluation value sum, inverse 2-3 pulldown is stopped, but an arrangement can be made wherein in the case of a state transition failing with the determination results of both of the difference evaluation value max and difference evaluation value sum, inverse 2-3 pulldown is stopped.

Also, though drawing and description will be omitted, with the processing for mode 60 in step S136 in FIG. 33 as well, like the processing for mode 24 which is an example in FIG. 38, determination can be made integrally by employing multiple difference evaluation values of the difference evaluation value max and difference evaluation value sum.

As described above, an arrangement has been made wherein stillness/movement between fields of 12 fields is determined with the threshold value for still/movement determination obtained according to the difference evaluation value between fields of 12 fields, a still position is obtained, and the 2-3 pulldown pattern is determined, whereby the determination precision of the 2-3 pulldown pattern can be improved, even if the nature of a 60I signal is unknown.

Also, only in the case of a state transition of the 2-3 pulldown pattern being achieved a certain number of times or more, the inverse 2-3 pulldown processing is permitted to be started, whereby the inverse 2-3 pulldown processing can be performed following 2-3 pulldown determination being stabilized, and accordingly, the quality of an image to be generated can be improved.

Further, an arrangement has been made wherein in the event that determination of the 2-3 pulldown pattern fails during the inverse 2-3 pulldown processing, the inverse 2-3 pulldown processing is immediately stopped, whereby the quality of an image to be generated can be improved.

Figure 39:
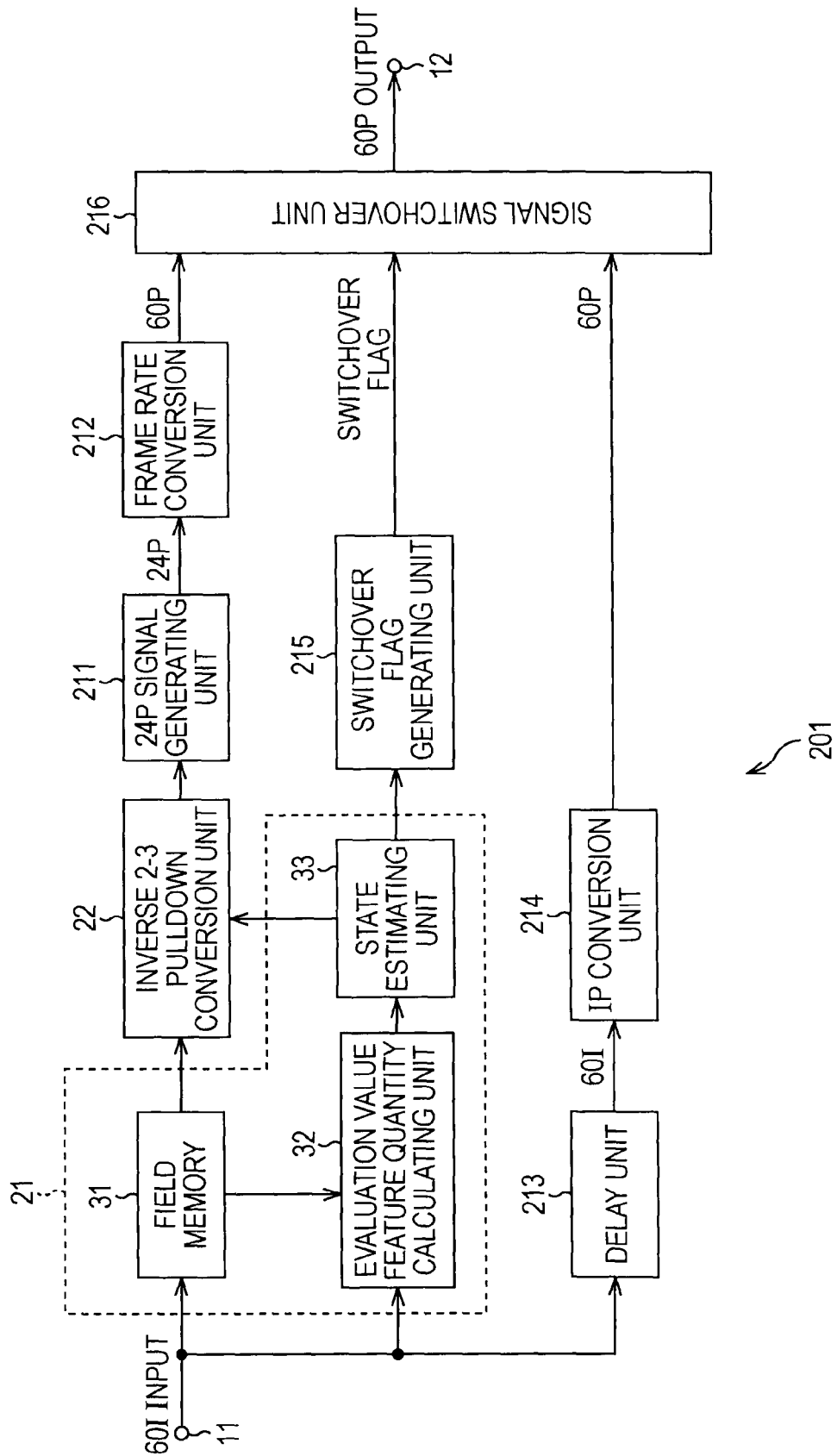
FIG. 39 is a block diagram illustrating another configuration example of a signal processing device to which the present invention has been applied.

FIG. 39 represents another configuration example of a signal processing device to which the present invention is applied. This signal processing device 201 inputs a 60I signal form the input terminal 11, determines regarding whether or not the 2-3 pulldown processing is being performed, switches a signal to be output to the output terminal 12 depending on the determination result thereof, and performs processing for outputting to the output terminal 12 either a 60P signal which is a result of subjecting a 24P signal which is a result of performing the inverse 2-3 pulldown conversion processing to frame rate conversion (hereafter, also referred to as a mainline-system signal), or a 60P signal which is a result of subjecting a 24P signal which is a result of performing the inverse 2-3 pulldown conversion processing to IP (Interlace, Progressive) conversion (hereafter, also referred to as a bypass-system signal).

Note that the signal processing device 201 in FIG. 39 is common to the signal processing device 1 in FIG. 6 in that the input terminal 11, output terminal 12, 2-3 pulldown determining unit 21, and inverse 2-3 pulldown conversion unit 22 are included therein, but differs from the signal processing device 1 in FIG. 6 in that a 24P (Progressive) signal generating unit 211, a frame rate conversion unit 212, a delay unit 213, an IP (Interlace, Progressive) conversion unit 214, a switchover flag generating unit 215, and a signal switchover unit 216 are added thereto.

The 60I signal input from the input terminal 11 is supplied to the field memory 31 of the 2-3 pulldown determining unit 21, and the evaluation value feature quantity calculating unit 32, and also supplied to the delay unit 213, and supplied to the inverse 2-3 pulldown conversion unit 22 via the field memory 31.

The 2-3 pulldown determining unit 21 is configured of the field memory 31, evaluation value feature quantity calculating unit 32, and state estimation unit 33, which have the same configurations as FIG. 6.

In the event of determining that the still positions between 10 fields to be processed are determined to fit the still positions of any pattern of the 2-3 pulldown patterns, the state estimation unit 33 determines regarding whether or not the 2-3 pulldown pattern determined to fit has repeated a predetermined state transition a certain number of times or more, and in the event that determination is made that the 2-3 pulldown pattern has repeated a predetermined state transition a certain number of times or more, sets the processing mode of the signal processing device 201 to the mode 24, and supplies a mode signal indicating the mode 24 to the inverse 2-3 pulldown conversion unit 22 and switchover flag generating unit 215.

On the other hand, in the event of determining that the still positions between 10 fields to be processed are determined not to fit the still positions of any pattern of the 2-3 pulldown patterns, or in the event of determining that the 2-3 pulldown pattern has not repeated a predetermined state transition a certain number of times or more, the state estimation unit 33 sets the processing mode of the signal processing device 201 to the mode 60, and supplies a mode signal indicating the mode 60 to the inverse 2-3 pulldown conversion unit 22 and switchover flag generating unit 215.

In the event that the mode signal indicating the mode 24 is supplied from the state estimation unit 33, the inverse 2-3 pulldown conversion unit 22 performs the inverse 2-3 pulldown conversion processing, and outputs a 24P signal to the 24P signal generating unit 211. Also, in the event that the mode signal indicating the mode 60 is supplied from the state estimation unit 33, the inverse 2-3 pulldown conversion unit 22 stops (inhibits) execution of the inverse 2-3 pulldown conversion processing.

The 24P signal generating unit 211 outputs the 24P signal from the inverse 2-3 pulldown conversion unit 22 to the frame rate conversion unit 212 without change. Note that the 24P signal generating unit 211 outputs a 24P signal equivalent to one frame to the frame rate conversion unit 212 as a dummy signal at the timing of end of processing by the inverse 2-3 pulldown conversion unit 22 (i.e., after input of the last 24P signal) as necessary.

Thus, at the time of signal switchover from the 60P signal from the IP conversion unit 214 (bypass-system signal) to the 60P signal from the frame rate conversion unit 212 (main-line-system signal) the phase of a frame is suppressed from being shifted.

In the event that the 24P signal is input from the 24P signal generating unit 211, the frame rate conversion unit 212 subjects the 24P signal which is 24 frames per second to frame rate conversion to a signal which is 60 frames per second, and outputs the converted 60P signal to the signal switchover unit 216.

The delay unit 213 adjusts the delay of the field supplied from the input terminal 11 as to the (main-line-system) processing by the inverse 2-3 pulldown conversion unit 22, 24P signal generating unit 211, and frame rate conversion unit 212, and the (bypass-system) processing by the IP conversion unit 214, and outputs this to the IP conversion unit 214.

The IP conversion unit 214 subjects the 60I signal input from the delay unit 213 to IP conversion, and outputs the converted 60P signal to the signal switchover unit 216.

In the event that the mode signal indicating the mode 24 is supplied from the state estimation unit 33, or in the event that the mode signal indicating the mode 60 is supplied from the state estimation unit 33, the switchover flag generating unit 215 generates a switchover flag according to the mode signal thereof, and supplies the generated switchover flag to the signal switchover unit 216. Note that in actuality, the mode signal is delayed and used in light of processing delay as to the main-line-system processing and bypass-system processing.

The signal switchover unit 216 switches the (main-line-system) 60P signal from the frame rate conversion unit 212 or the (bypass-system) 60P signal from the IP conversion unit 214 in accordance with the switchover flag supplied from the switchover flag generating unit 215, and output to the output terminal 12.

Next, description will be made specifically regarding the signal switchover of the signal processing device 201 with reference to FIG. 40 through FIG. 46. Note that description will be made below regarding a case wherein there is processing delay at each unit of the signal processing device 201 as an example for convenience of description, but basically the same processing can be performed even in the event that there is processing delay.

Figure 40:
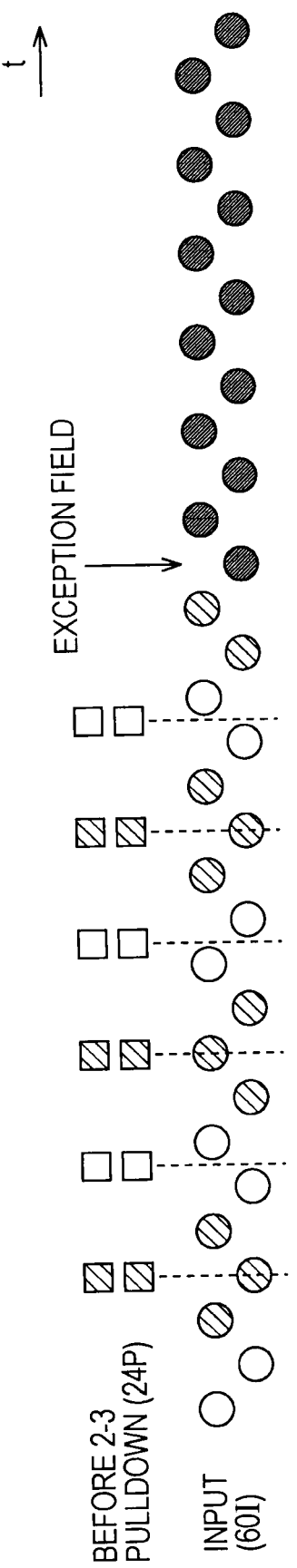
FIG. 40 is a diagram illustrating an example of 60I signals input to the signal processing device in FIG. 39.

FIG. 40 is a diagram illustrating an example of a 60I signal to be input to the signal processing device 201. With the example shown in FIG. 40, the arrow t represents the transition of time, circles represent the fields (top: top fields, bottom: bottom fields) of a 60I signal to be input (input (60I)), squares arrayed vertically above the circles represent the frames of a 24P signal before the 60I signal is subjected to the 2-3 pulldown processing (before 2-3 pulldown (24P)), and the dotted lines above the squares and circles indicates that the phases the frames and fields thereof are aligned.

Also, in order to distinguish between each set of two fields in the case of two fields to be generated from one frame, and each set of three fields in the case of three fields to be generated from one frame, rough hatching is applied to a set of three fields (circle) and a frame (square) for generating the set of three fields thereof. Further, circles to which fine hatching is applied, which are the 20th and on from the left, represent exception fields (i.e., fields not subjected to 2-3 pulldown).

That is to say, upon description being made in order of the transition of time from the left, the 1st frame from the left is subjected to 2-3 pulldown to generate a set of three fields of a 60I signal. At this time, the 2nd bottom field of a three-piece set of the 60I signal is generated such that the phase thereof and the corresponding frame of the 24P signal are aligned. The 2nd frame from the left is subjected to 2-3 pulldown to generate a set of two fields of the 60I signal. At this time, both of the set of two fields of the 60I signal are not generated such that the phase thereof and the phase of the corresponding frame of the 24P signal are aligned.

The 3rd frame from the left is subjected to 2-3 pulldown to generate a set of three fields of the 60I signal. At this time, the 2nd top field of the three-piece set of the 60I signal is generated such that the phase thereof and the corresponding frame of the 24P signal are aligned. The 4th frame from the left is subjected to 2-3 pulldown to generate a set of two fields of the 60I signal. At this time, both of the set of two fields of the 60I signal are not generated such that the phase thereof and the phase of the corresponding frame of the 24P signal are aligned.

The 5th frame from the left is subjected to 2-3 pulldown to generate a set of three fields of the 60I signal. At this time, the 2nd bottom field of the three-piece set of the 60I signal is generated such that the phase thereof and the corresponding frame of the 24P signal are aligned. The 6th frame from the left is subjected to 2-3 pulldown to generate a set of two fields of the 60I signal. At this time, both of the set of two fields of the 60I signal are not generated such that the phase thereof and the phase of the corresponding frame of the 24P signal are aligned.

That is to say, with the 60I signal so far, a set of three fields are subjected to 2-3 pulldown such that the phase thereof and the phase of the corresponding frame of the 24P signal are aligned, and with the 60I signal so far, 2-3 pulldown is detected.

Subsequently, with the 60I signal, an exception field, for example, such as a DVD material or the like is input, which is inserted after the 2nd field of the set of three fields of the 60I signal.

Accordingly, with the 60I signal in FIG. 40, the inverse 2-3 pulldown processing can be performed as to up to the 19th field from the left, but 2-3 pulldown is not detected form the 20th exception field and on from the left, so the inverse 2-3 pulldown processing cannot be performed.

Figure 41:
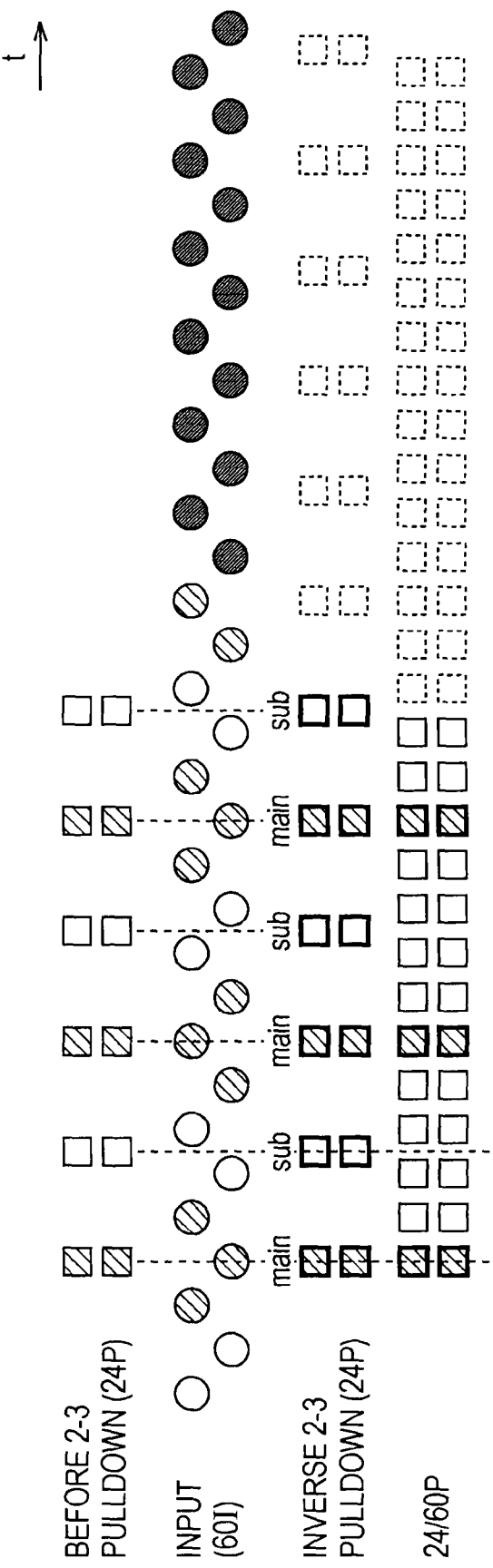
FIG. 41 is a diagram illustrating the phase relation between 24P signals and 60P signals in 24/60P conversion.

Now, let us say that the phase relation between a 24P signal and a 60P signal with the frame rate conversion for converting a 24P signal into a 60P signal will be stipulated such as shown in FIG. 41.

With the example shown in FIG. 41, of the 60I signal (input (60)) in FIG. 40, the frames of a 24P signal (inverse 2-3/24P) generated by fields from which 2-3 pulldown can be detected (other than exception fields) being subjected to 2-3 pulldown conversion, and the frames of a 60P signal (24/60P) which is a result of the 24P signal being subjected to frame rate conversion (24/60P conversion) are each represented with squares vertically arrayed. Note that hereafter, frame rate conversion will also be referred to 24/60P conversion as appropriate.

Of the 24P signal after inverse 2-3 pulldown, squares to which characters of "main" and hatching are denoted represent frames of which the phase is identical to the phase of the 60P signal after frame rate conversion (hereafter, also referred to as main frames), squares to which characters of "sub" represent frames of which the phase is not identical to the phase of the 60P signal after 24/60P conversion (hereafter, also referred to as sub frames).

Also, of the 60P signal after 24/60P conversion, squares to which hatching is denoted represent frames of which the phase is identical to the phase of the 24P signal after inverse 2-3 pulldown, and squares to which hatching is not denoted represent frames of which the phase is not identical to the phase of the 24P signal after inverse 2-3 pulldown.

Further, squares with a dotted line at the right side in the drawing represent that an exception field described with reference to FIG. 40 occurs, inverse 2-3 pulldown cannot be performed (i.e., a 24P signal is not generated), during that time 24/60P conversion cannot be performed, and accordingly, the frames of the 60P signal are not generated.

Here, with the example shown in FIG. 42, further, the frames of the 60P signal after IP conversion (60I/60P), which is a bypass system signal, are illustrated with circles vertically arrayed below the 60P signal after 24/60P conversion in FIG. 41 which is a main line system.

Also, a dotted line illustrated on the 4th frame from the left of the 60P signal shows that the phases of the frame of the 24P signal before 2-3 pulldown, the field of the 60I signal which is an input signal, the main frame of the 24P signal after inverse 2-3 pulldown, the frame of the 60P signal after 24/60P conversion, the frame of the 60P signal after IP conversion are aligned.

Figure 42:
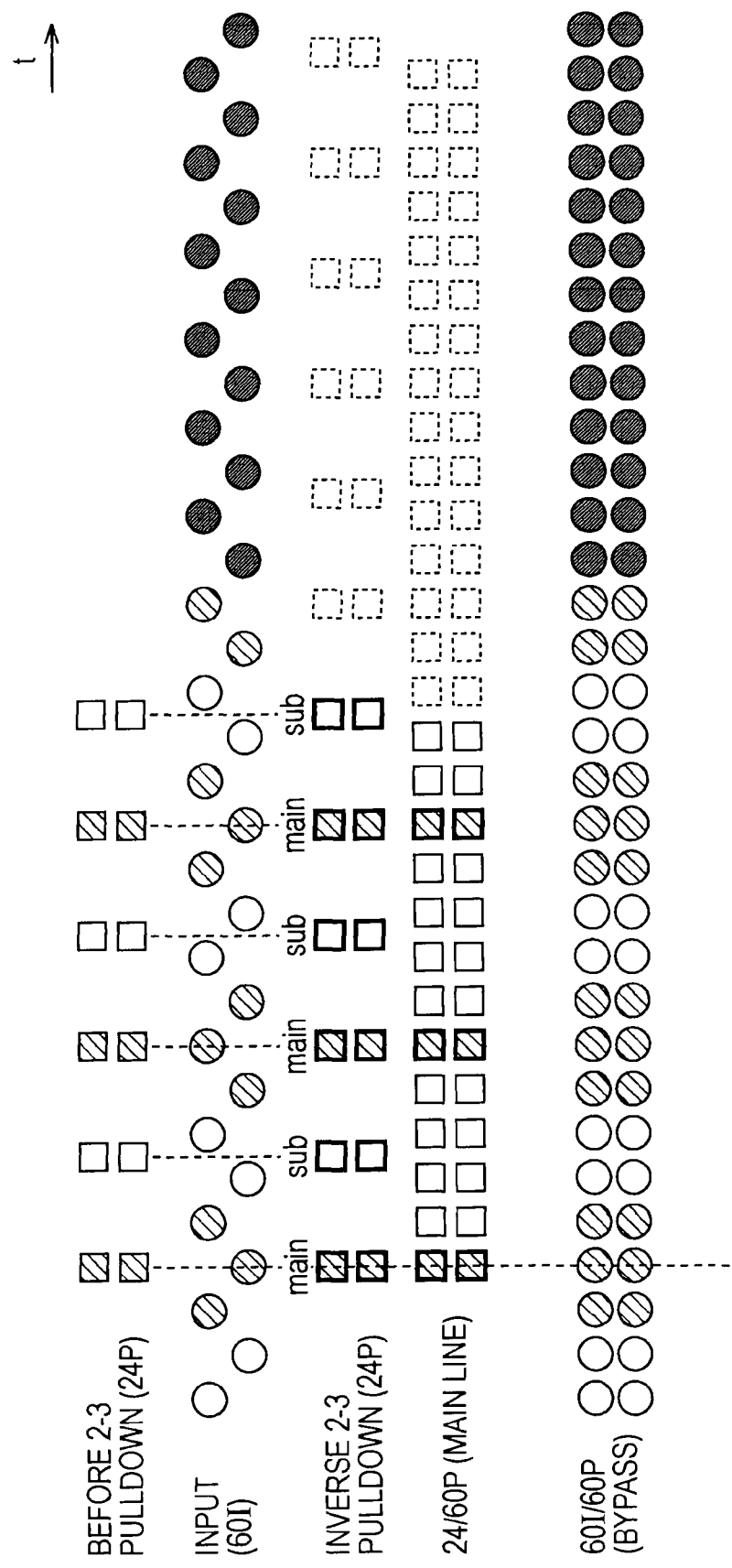
FIG. 42 is a diagram for describing 60P signals following the 24/60 conversion and 60P signals following IP conversion in FIG. 41.

In the case of the example shown in FIG. 42, with the 60P signal, another field is generated based on the field indicated with the same circle as the circle indicating the field from which 2-3 pulldown can be detected of the 60I signal to be input, thereby generating a frame made up of two fields which are a top field and a bottom field. Also, in case of the exception field of the 60I signal to be input as well, another field is generated based on the exception field, thereby generating a frame made up of two fields which are a top field and a bottom field.

That it to say, with IP conversion, when a 60P signal is input, even if a field thereof is an exception field, a 60P signal is output. Accordingly, as described above, in the event that the 60P signal after 24/60P conversion (main-line system signal) is not obtained, as shown in FIG. 43, the 60P signal after IP conversion which is a bypass system signal is arranged to be employed.

Figure 43:
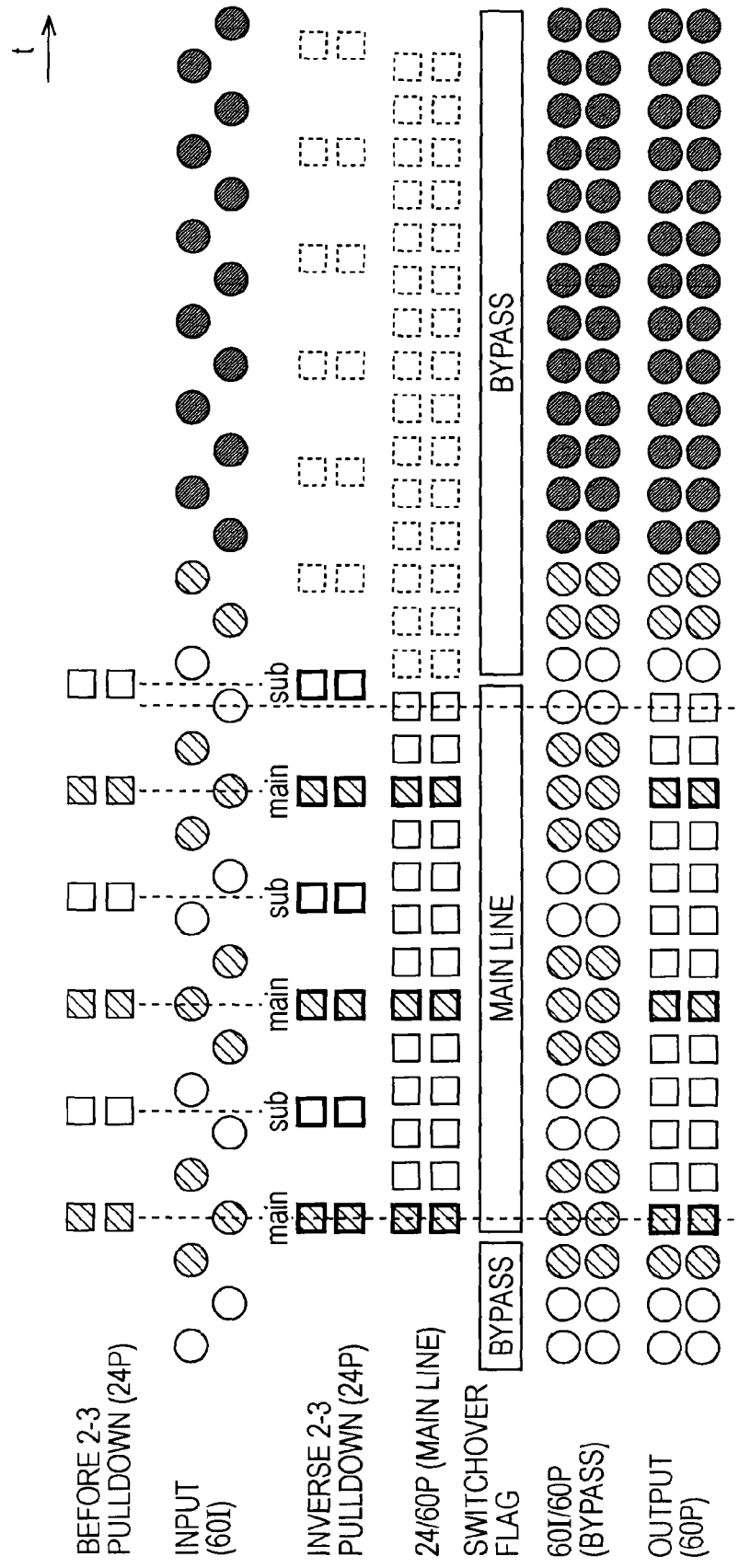
FIG. 43 is a diagram illustrating 60P signals output to an output terminal 12 from a signal switchover unit 216 in accordance with inverse 2-3 pulldown detection.

The example shown in FIG. 43 illustrates a switchover flag indicating a main-line or bypass system signal depending on regarding whether or not inverse 2-3 pulldown can be performed between the 60P signal after 24/60P conversion which is a main-line system signal and the 60P signal after IP conversion (60I/60P) which is a bypass system signal, and further illustrates the 60P signal to be output to the output terminal 12 from the signal switchover unit 216 below the 60P signal after IP conversion (60I/60P).

That is to say, while the 60I signal from which 2-3 pulldown detection can be performed is input to generate a 24P signal by inverse 2-3 pulldown, the signal switchover unit 216 outputs the 60P signal after 24/60P conversion which is a main-line system signal to the output terminal 12 in accordance with the switchover flag indicating a main-line system signal generated by the signal switchover unit 216. Conversely, while a 60I signal is input, which is an exception field from which 2-3 pulldown is not detected, and a 24P signal is not generated since inverse 2-3 pulldown cannot be performed, the signal switchover unit 216 outputs the 60P signal after IP conversion which is a bypass system signal to the output terminal 12 in accordance with the switchover flag indicating a bypass system signal generated by the signal switchover unit 216.

Also, as described above, with inverse 2-3 pulldown conversion, in the case of a set of three fields of 2-3 pulldown, a main frame to which "main" is denoted with the phase identical to the 60P signal after 24/60P conversion is output, and in the case of a set of two fields, a sub frame to which "sub" is denoted with the phase not identical to the 60P signal after 24/60P conversion is output.

Note that this is based on concept wherein with the 24P signal before 2-3 pulldown, the 1st frame from the left includes a phase such as shown in a dotted line above the 1st frame from the left, and thus, of the 24P signals with a two-piece set or three-piece set, fixing the phase to either of the 24P signals facilitates handling as compared with changing the type of the 24P signal depending on the case of being capable of 2-3 pulldown.

Figure 44:
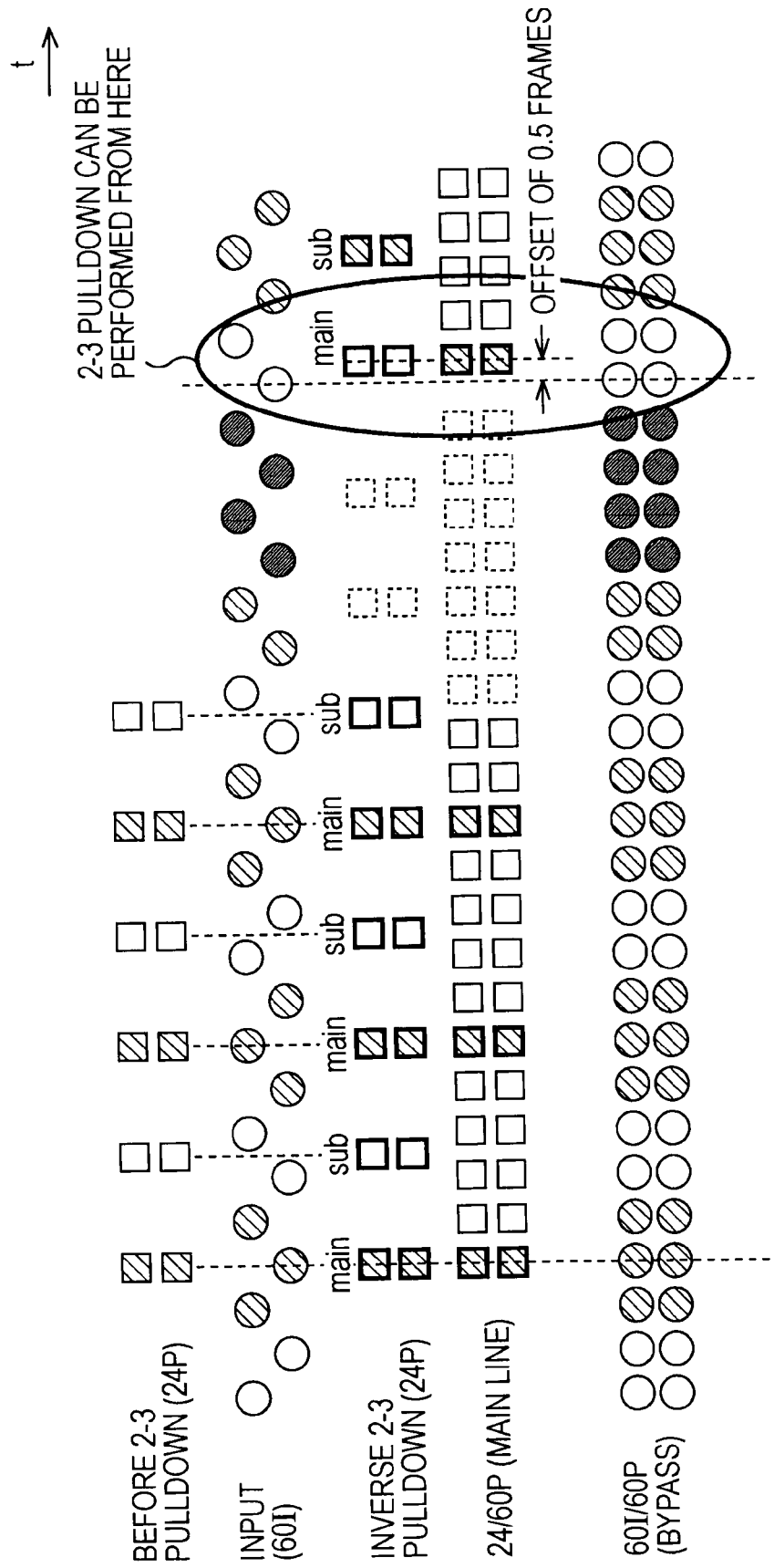
FIG. 44 is a diagram for describing phase offset in signal switchover.

Note however, in this case, as shown in a dotted line at the center in the drawing, upon inverse 2-3 pulldown being ended at a two-piece set of the 24P signal with the phase not identical to the 60P signal after 24/60P conversion (sub frame), as shown in FIG. 44, in the case of starting (restoring) inverse 2-3 pulldown with a two-piece set of the 24P signal next, phase shifting is caused between the main-line system signal and the bypass system signal.

With the example shown in FIG. 44, inverse 2-3 pulldown is ended at a two-piece set of the 24P signal with the phase not identical to the 60P signal after 24/60P conversion (sub frame) in FIG. 43, and after the bypass system signal is employed for a while, 2-3 pulldown is detected at the 60I signal at a position shown with the ellipse in the drawing, and a main frame of the 24P signal to which "main" is denoted, of which the phase needs to be identical to the 60P signal after 24/60P conversion, is generated from the set of two fields determined to be capable of inverse 2-3 pulldown.

That is to say, in the event of starting inverse 2-3 pulldown next after inverse 2-3 pulldown is ended at a two-piece set of the 24P signal with the phase not identical to the 60P signal after 24/60P conversion (sub frame), as for a processing order, the 24P signal with the phase identical to the 60P signal after 24/60P conversion (main frame) is generated. Note however, with the example shown in FIG. 44, determination is made that inverse 2-3 pulldown can be performed at a position of a set of two fields of the 60I signal, and consequently, the frame generated with the set of two fields becomes a main frame of which the phase needs to be identical to the 60P signal after 24/60P conversion.

Note however, when attempting to match the phase to the frame generated from the two-piece of fields, shifting of 0.5 frame is caused as to the phase of a frame of the 60P signal after IP conversion which is a bypass system signal.

Figure 45:
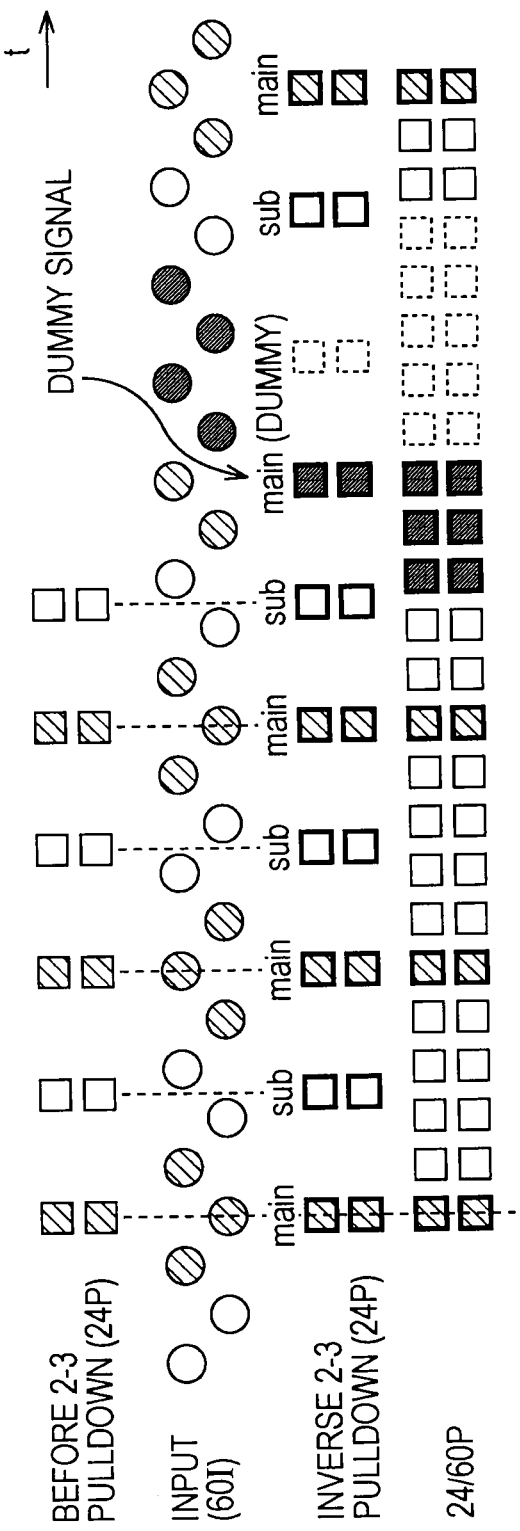
FIG. 45 is a diagram for describing dummy signals inserted corresponding to the phase offset in FIG. 44.

Accordingly, as shown in the example in FIG. 45, in the case wherein inverse 2-3 pulldown is ended at a two-piece set of the 24P signal with the phase not identical to the 60P signal after 24/60P conversion (sub frame), when inverse 2-3 pulldown cannot be performed, and a 24P signal is not generated, the 24P generating unit 211 is caused to output one frame of a 128-level 24P signal (main frame) as a dummy signal.

Figure 46:
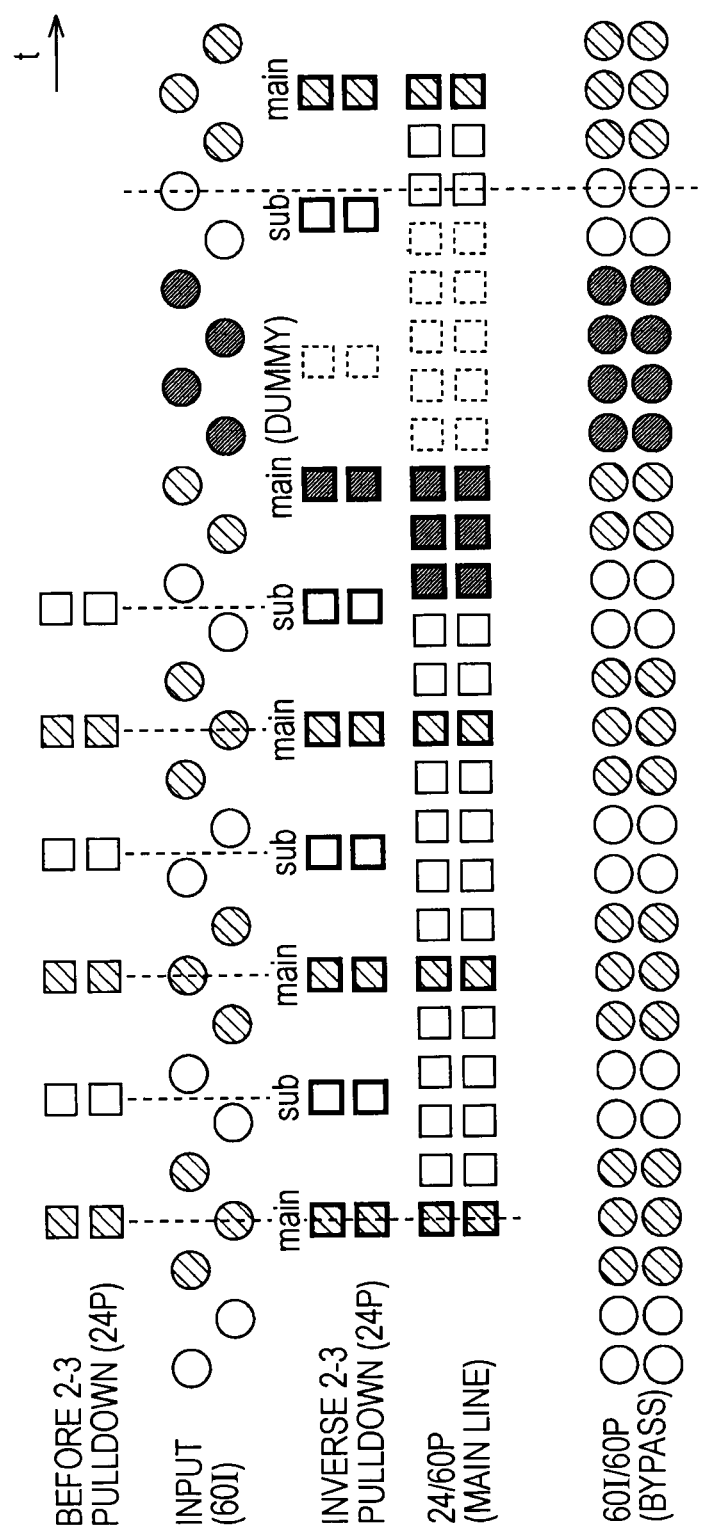
FIG. 46 is a diagram for describing signal switchover performed using the dummy signals in FIG. 45.

Thus, at the time of the next inverse 2-3 pulldown restoration, as shown in the example in FIG. 46, a frame generated from a set of two fields can be handled as a sub frame with the phase not identical to the 60P signal after 24/60P conversion.

With the example shown in FIG. 46, after inverse 2-3 pulldown is ended at a two-piece set of the 24P signal with the phase not identical to the 60P signal after 24/60P conversion (sub frame), one frame of the 24P signal (main frame) is immediately inserted as a dummy signal, thereafter a bypass system signal is employed for a while, and inverse 2-3 pulldown is started from the set of two fields of the 5th 60I signal from the right in the drawing to generate a 24P signal (sub frame).

Accordingly, there is no need to match the bypass system phase which a dotted line above the 4th field indicates, i.e., the phase of a frame of the 60P signal after IP conversion which is a bypass system signal, to a sub frame, and accordingly, the relation between the main frame signal and the sub frame signal can be kept.

Note that in order to simplify the above-mentioned arrangement, at the time of inverse 2-3 pulldown restoration, a restriction only at the time of a set of three fields may be provided. In this case, at the time of end of inverse 2-3 pulldown, there is a need to output a dummy 24P signal only when inverse 2-3 pulldown ends at a three-piece set.

As described above, processing appropriate for each signal to be input is performed, whereby processing advantage can be improved as the whole processing.

Figure 47:
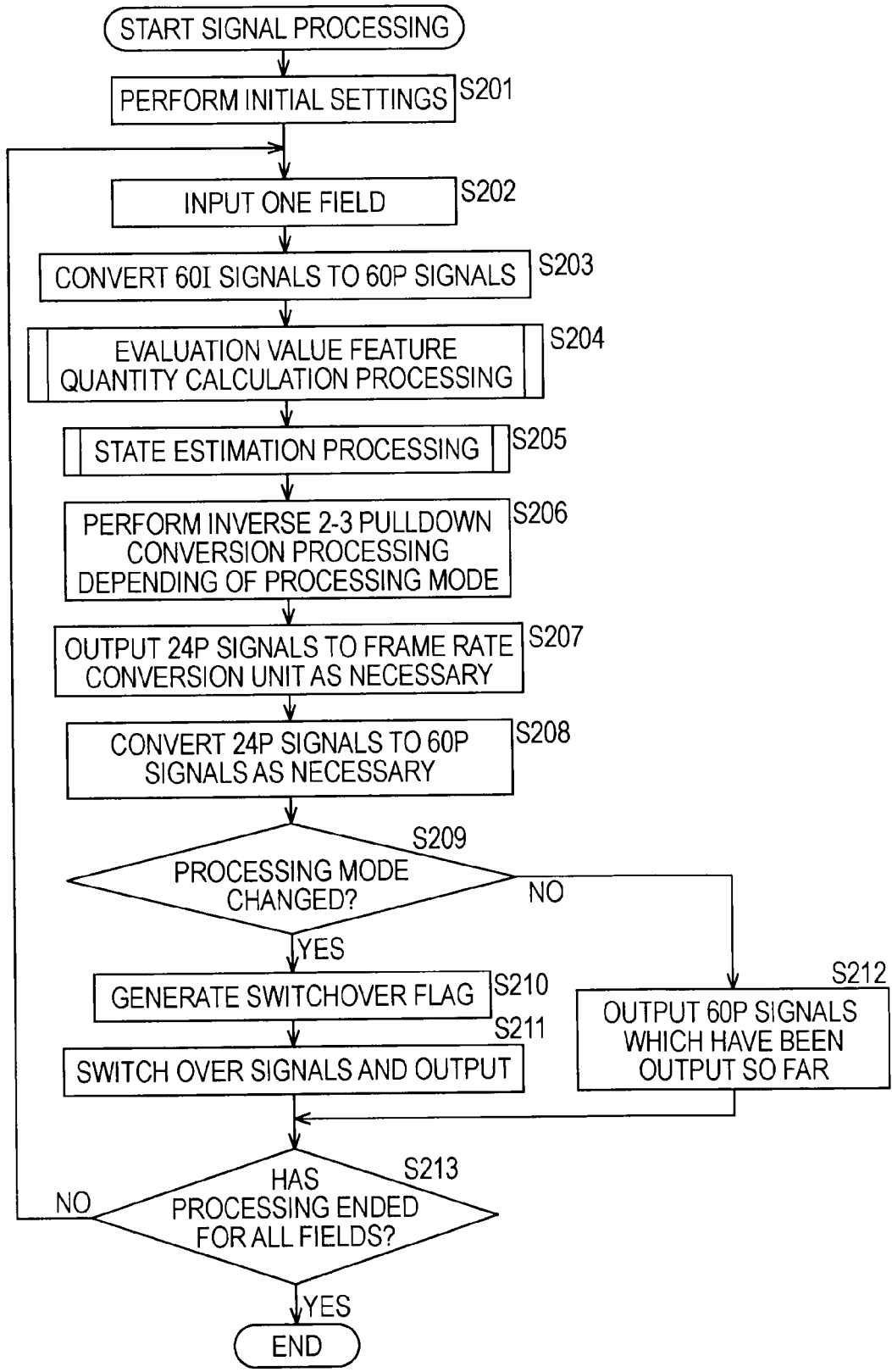
FIG. 47 is a flowchart for describing signal processing with the signal processing device in FIG. 39.

Next, the signal processing by the signal processing device 201 shown in FIG. 39 will be described with reference to the flowchart in FIG. 47.

First, an unshown operating input unit is operated by the user operating the signal processing device 201, and the initial setting values of the respective units of the signal processing device 201 are input. Upon a signal corresponding to a user operation being input from the operating input unit, in step S201 each unit of the signal processing unit 201 performs initial settings. Following the initial settings in step S201, the processing is started.

In step S202, the input terminal 11 inputs one field from an unshown previous stage, and supplies this to the field memory 31, evaluation value feature quantity calculating unit 32, and delay unit 213. The one field supplied from the field memory 31 is supplied to the inverse 2-3 pulldown conversion unit 22.

The delay unit 213 adjusts the delay of the field supplied from the input terminal 11 as to the (main-line-system) processing by the inverse 2-3 pulldown conversion unit 22, 24P signal generating unit 211, and frame rate conversion unit 212, and the (bypass-system) processing by the IP conversion unit 214, and outputs this to the IP conversion unit 214.

In step S203, the IP conversion unit 214 subjects the 60I signal input from the delay unit 213 to IP conversion, and outputs the converted 60P signal to the signal switchover unit 216.

Upon the one field being input from the input terminal 11, in step S204 the evaluation value feature quantity calculating unit 32 executes evaluation value feature quantity calculation processing. That is to say, the evaluation value feature quantity calculating unit 32 uses the field of the 60I signal from the input terminal 11, and the field which is positioned temporally two fields earlier than the field input from the input terminal 11, which is stored in the field memory 31, to calculate a difference evaluation value, a threshold value, feature quantity, and so forth which are employed for detection (determination) of the sequence of 2-3 pulldown performed by the state estimation unit 33.

Specifically, the evaluation value feature quantity calculating unit 32 calculates a difference value evaluation value using the field of the 60I signal from the input terminal 11, and the field which is positioned temporally two fields earlier than the field input from the input terminal 11, which is stored in the field memory 31, as described with reference to FIG. 9, and calculates a threshold value based on the 2nd minimum value of the difference evaluation values of 12 fields (i.e., between 10 fields).

Subsequently, the evaluation value feature quantity calculating unit 32 determines matching/non-matching between the 10 fields, i.e., whether or not there is movement between fields (still/movement between fields) based on the difference evaluation values between the 10 fields and the calculated threshold value, and obtains feature quantity indicating the still/movement position between 10 fields. Note that this evaluation value feature quantity calculation processing is basically the same processing as the evaluation value feature quantity calculation processing described above with reference to the flowchart in FIG. 29, so the detailed description thereof would be redundant and accordingly will be omitted.

Upon the difference evaluation values, threshold value, feature quantity, and so forth being obtained by the evaluation value feature quantity calculating unit 32, in step S205 the state estimation unit 33 executes the state estimation processing. That is to say, the state estimation unit 33 uses the difference evaluation values, threshold value, feature quantity, and so forth calculated by the evaluation value feature quantity calculating unit 32 to determine whether or not the still/movement positions between 10 fields to be processed fit one of the 2-3 pulldown patterns shown in FIG. 11. Also, in the event that determination is made that the still/movement positions between 10 fields fit any pattern of the 2-3 pulldown patterns, as described above with reference to FIG. 12, the state estimation unit 33 further determines regarding whether or not the 2-3 pulldown pattern thereof has repeated a predetermined state transition a certain number of times or more.

Note that in the event that determination is made that the 2-3 pulldown pattern thereof has repeated a predetermined state transition a certain number of times or more, the state estimation unit 33 sets the processing mode of the signal processing device 201 to the mode 24, and supplies a mode signal indicating the mode 24 to the inverse 2-3 pulldown conversion unit 22 and switchover flag generating unit 215.

Also, in the event that determination is made that the still/movement position between 10 fields to be processed does not fit any pattern of the 2-3 pulldown patterns, or in the event that determination is made that a predetermined state transition has not been repeated a certain number of times (e.g., 10 times) or more, the state estimation unit 33 sets the processing mode of the signal processing device 201 to the mode 60, and supplies a mode signal indicating the mode 60 to the inverse 2-3 pulldown conversion unit 22 and switchover flag generating unit 215. Note that this state estimation processing is basically the same processing as the state estimation processing described above with reference to the flowchart in FIG. 33, so the detailed description thereof would be redundant and accordingly will be omitted.

In step S206, the inverse 2-3 pulldown conversion unit 22 refers to the mode signal supplied from the state estimation unit 33, performs the inverse 2-3 pulldown processing depending on the processing mode of the signal processing device 201, and outputs the generated 24P signal to the 24P signal generating unit 211.

That is to say, when the processing mode is switched to the mode 60, the inverse 2-3 pulldown conversion unit 22 stops the inverse 2-3 pulldown processing, and when the processing mode is switched to the mode 24, starts the inverse 2-3 pulldown processing.

In step S207, in the event that a 24P signal is input from the inverse 2-3 pulldown conversion unit 22, the 24P signal generating unit 211 outputs the input 24P signal without change to the frame rate conversion unit 212. At this time, the 24P signal generating unit 211 outputs one frame of the 24P signal to the frame rate conversion unit 212 as necessary at the timing when the processing by the inverse 2-3 pulldown conversion unit 22 is ended.

In step S208, in the event that the 24P signal is input from the 24P signal generating unit 211, the frame rate conversion unit 212 subjects the 24P signal of 24 frames per second to frame rate conversion to a signal of 60 frames per second, and outputs the converted 60P signal to the signal switchover unit 216.

Note that the above-mentioned processing in step S206 through S208 is not executed, in the event that the state estimation unit 33 cannot detect 2-3 pulldown. That is to say, the processing thereof is executed or stopped in accordance with the mode signal from the state estimation unit 33.

In step S209, the switchover flag generating unit 215 determines regarding whether or not the processing mode is changed. The switchover flag generating unit 215 determines regarding whether or not the processing mode is changed by determining whether the processing mode which the mode signal supplied from the state estimation unit 33 indicates is changed from the mode 24 to the mode 60, or changed from the mode 60 to the mode 24.

In the event that determination is made in step S209 that the processing mode is changed, in step S210 the switchover flag generating unit 215 generates a switchover flag, and supplies the generated switchover flag to the signal switchover unit 216.

In step S211, the signal switchover unit 216 switches the 60P signal (of the main-line system) from the frame rate conversion unit 212, or the 60P signal (of the bypass system) from the IP conversion unit 214 depending on the switchover flag supplied from the switchover flag generating unit 215, and outputs to the output terminal 12.

In the event that determination is made in step S209 that the processing mode is not changed, the switchover flag generating unit 215 generates no switchover flag, so in step S212 the signal switchover unit 216 outputs the 60P signal which has been output so far to the output terminal 12.

As described above, an arrangement has been made wherein a still position between fields of 12 fields including one sequence of 2-3 pulldown of an 60I signal is obtained, the corresponding 2-3 pulldown pattern is determined, and further, 2-3 pulldown state transition determination is made, whereby the sequence of 2-3 pulldown can be detected in a precise manner even with a 60I signal of which the nature is unknown.

Also, the 60P signal after the inverse 2-3 processing and frame rate conversion, and the 60P signal after IP conversion are switched and output in accordance with the determination results of 2-3 pulldown, whereby an image with good quality can be obtained.

Note that the determination results of 2-3 pulldown are not restricted to the above examples, and rather can be employed for other signal processing. For example, signal processing can also be performed wherein a 24P signal obtained by subjecting a 60I signal to inverse 2-3 processing is encoded, and the encoded signal is sent or recorded.

Note that the signal processing device according to the present invention can be applied to a device capable of outputting a 60P signal, such as a playing device, recording/playing device, and recording device of a removable medium such as DVD or the like, or hard disk, a signal receiving device of television signals, a sending device, receiving device, and sending/receiving device of data, a personal computer, a personal digital assistance, and so forth.

The above-mentioned series of processing can be executed with not only hardware but also software. In the event of executing the series of processing using software, a program making up the software thereof is installed from a program recoding medium into a computer embedded in dedicated hardware, or a general-purpose personal computer or the like which can execute various types of functions by installing various types of programs, for example.

Figure 48:
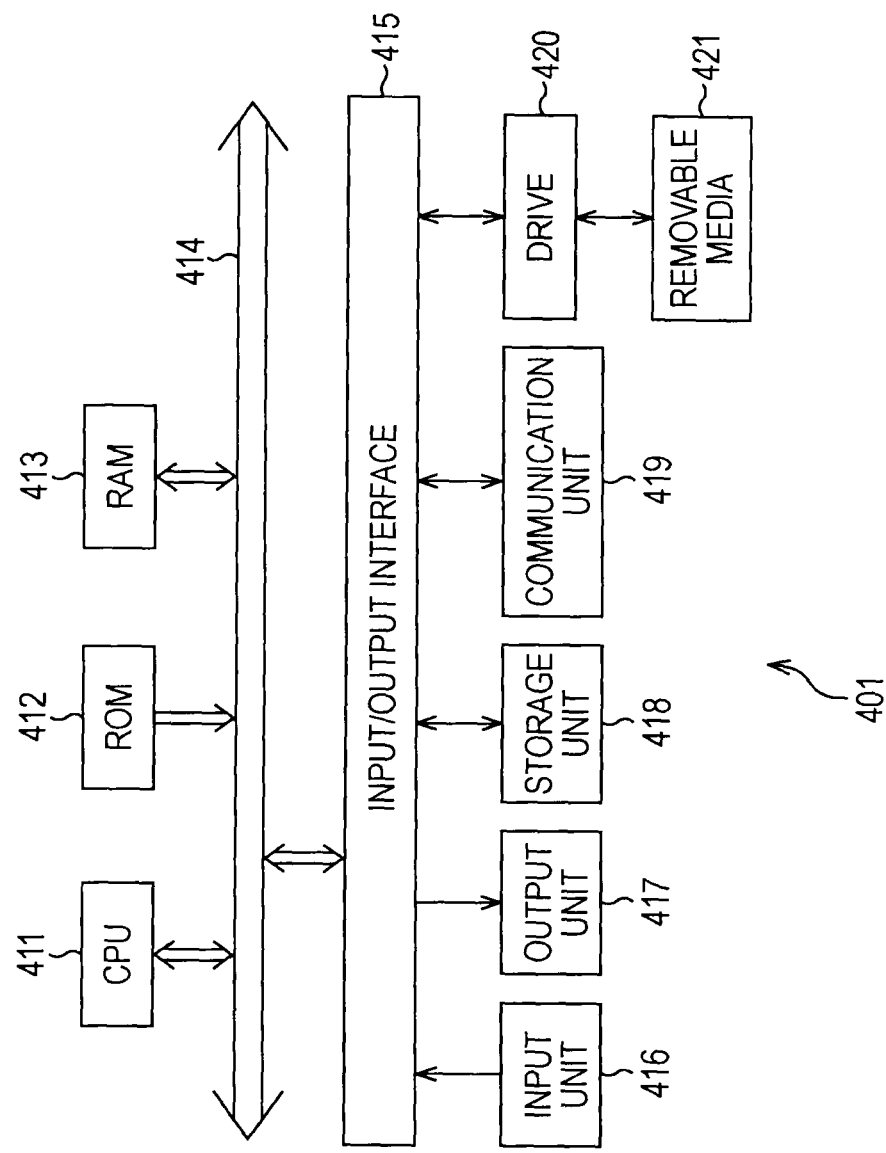
FIG. 48 is a block diagram illustrating a configuration example of a personal computer to which the present invention has been applied.

FIG. 48 is a block diagram illustrating a configuration example of a personal computer 401 for executing the above-described series of processing using a program.

A CPU (Central Processing Unit) 411 executes various types of processing in accordance with a program stored in ROM (Read Only Memory) 412, or a storage unit 418. A program which the CPU 411 executes, data, and so forth are stored in RAM (Random Access Memory) 413 as appropriate. The CPU 411, ROM 412, and RAM 413 are mutually connected through a bus 414.

The CPU 411 is also connected with an input/output interface 415 via the bus 414. The input/output interface 415 is connected with an input unit 416 made up of a keyboard, mouse, microphone, and so forth, and an output unit 417 made up of a display, speakers, and so forth. The CPU 411 executes various types of processing in response to instructions input from the input unit 416. Subsequently, the CPU 411 outputs the processing results to the output unit 417.

The storage unit 418 connected to the input/output interface 415 is made up of a hard disk for example, and stores a program which the CPU 411 executes, and various types of data. A communication unit 419 communicates with an external device via a network such as the Internet, a local network, or the like.

Also, a program may be obtained via the communication unit 419, and stored in the storage unit 418.

When a removable medium 421 such as a magnetic disk, optical disc, magneto-optical disk, semiconductor memory, or the like is mounted, a drive 420 connected to the input/output interface 415 drives that, and obtains a program or data or the like recorded therein. The obtained program and data are transferred to the storage unit 418 as necessary, and stored.

A program recording medium for storing a program which is installed into a computer, and made into a computer-executable state is configured of, as shown in FIG. 48, the removable medium 421 which is a package medium made up of a magnetic disk (including a flexible disk), optical disc (including CD-ROM (Compact Disc-Read Only Memory) and DVD (Digital Versatile Disc), semiconductor memory, or the like, or the ROM 412 in which a program is stored temporarily or eternally, a hard disk making up the storage unit 418, or the like. Storing a program in the program recording medium is performed via the communication unit 419 which is an interface such as a router, modem, or the like using a cable or wireless communication medium such as a local area network, the Internet, digital satellite broadcasting, or the like as necessary.

Note with the present Specification, steps for describing the program to be stored in the program recording medium include not only processing to be performed in time-sequence following the order laid but also processing to be executed in parallel or individually which is not necessarily performed in time-sequence.

The invention claimed is:

1. A signal processing device for detecting, from input interlaced signals, a sequence in which same fields are repeated at a predetermined rate, said signal processing device comprising:

a still/movement determining unit configured to calculate a difference evaluation value between each of a predetermined number of input fields to determine a smallest value and a second smallest value of difference evaluation values from among all difference evaluation values between each of the predetermined number of input fields, and to determine whether or not there is movement between the predetermined number of input fields based on the second smallest value of difference evaluation values the still/movement determining unit configured to determine that there is movement between two input fields when a difference between two inputs fields is greater than the second smallest value, and the still/movement determining unit configured to determine that there is no movement between two input fields when the difference between two inputs fields is less than the second smallest value; and a sequence determining unit configured to determine whether or not said predetermined number of fields fall under any one of a plurality of patterns classified based on the position of a repeated field in which said same field in said sequence is repeated as to said predetermined number of fields, and have a transition order making transition for each input of a field, based on a still position between fields regarding which determination has been made by said still/movement determining unit that said movement is not present, and to determine whether or not said pattern, regarding which determination is made that said predetermined number of fields fall under, is making transition in said transition order from said pattern regarding which determination was made that said predetermined number of fields from a predetermined number of times earlier fall under, thereby detecting said sequence from said interlaced signals.

2. The signal processing device according to claim 1, said sequence determining unit comprising:

a pattern detecting unit configured to detect whether or not said predetermined number of fields fall under any one of said plurality of patterns, based on a still position between fields regarding which determination has been made by said still/movement determining unit that said movement is not present; and a pattern transition determining unit configured to determine whether or not said pattern regarding which determination has been made that said predetermined number of fields fall under is making transition in said transition order from said pattern regarding which determination was made that said predetermined number of fields from a predetermined number of times earlier fall under.

3. The signal processing device according to claim 2, wherein said pattern detecting unit is configured to determine whether or not said predetermined number of fields fall under a pattern, to which said pattern, regarding which determination has been made that said predetermined number of fields from one time earlier fall under, should make transition to next, based on a still position between fields regarding which determination has been made by said still/movement determining unit that said movement is not present, and in the event that determination is made that said predetermined number of fields fall under the pattern to which transition should be made next, the pattern detecting unit is configured to count the number of times of consecutive transition; and said pattern transition determining unit determine whether or not said number of times of consecutive transition counted by said pattern detecting unit is equal to or greater than a predetermined number of times, thereby determining whether or not said pattern regarding which determination has been made that said predetermined number of fields fall under is making transition in said transition order from said pattern regarding which determination was made that said predetermined number of fields from a predetermined number of times earlier fall under.

4. The signal processing device according to claim 1, further comprising:

a evaluation value calculating unit configured to calculate difference evaluation value between each of said predetermined number of fields; and a threshold value calculating unit configured to calculate a threshold, based on the second smallest value of difference evaluation values between said fields calculated by said evaluation value calculating unit; wherein said still/movement determining unit is configured to determine whether or not there is movement in said fields, based on said difference evaluation values between said fields calculated by said evaluation value calculating unit, and said threshold value calculated by said threshold value calculating unit.

5. The signal processing device according to claim 4, further comprising:

a number-of-movements calculating unit configured to calculate the number of fields with movement in said predetermined number of fields, based on said difference evaluation values between said fields calculated by said evaluation value calculating unit, and said threshold value calculated by said threshold value calculating unit; wherein said sequence detecting unit is configured to determine whether or not said predetermined number of fields fall under said pattern, based on the number of fields with movement in said predetermined number of fields, calculated by said number-of-movements calculating unit.

6. The signal processing device according to claim 1, further comprising:

a signal processing unit configured to perform predetermined signal processing according to the detection results of said sequence performed by said sequence detecting unit.

7. The signal processing device according to claim 6, in the event that said sequence has been detected by said sequence detecting unit, said signal processing unit performs signal processing to thin said repeated field so as to convert said interlaced signals into progressive signals.

8. The signal processing device according to claim 7, further comprising:
    an IP conversion unit configured to perform IP (interlaced/progressive) conversion of said interlaced signals into progressive signals;
    a frame rate conversion unit configured to perform frame rate conversion of said progressive signals converted by said signal processing unit; and
    a signal switchover unit configured to switch between said progressive signals converted by said IP conversion unit and said progressive signals of which the frame rate has been converted by said frame rate conversion unit, in accordance with said sequence detection results performed by said sequence detecting unit, and output downstream.

9. A signal processing method for a signal processing device for detecting, from input interlaced signals, a sequence in which same fields are repeated at a predetermined rate, said method comprising:
    calculating a difference evaluation value between each of a predetermined number of input fields to determine a smallest value and a second smallest value of difference evaluation values from among all difference evaluation values between each of the predetermined number of input fields;
    determining whether or not there is movement between the predetermined number of input fields, based on the second smallest value of difference evaluation values, the determining including determining that there is movement between two input fields when a difference between two inputs fields is greater than the second smallest value, and determining that there is no movement between two input fields when the difference between two inputs fields is less than the second smallest value;
    determining whether or not said predetermined number of fields fall under any one of a plurality of patterns classified based on the position of a repeated field in which said same field in said sequence is repeated as to said predetermined number of fields, and have a transition order making transition for each input of a field, based on a still position between fields regarding which determination has been made by said determining that said movement is not present; and
    determining whether or not said pattern, regarding which determination is made that said predetermined number of fields fall under, is making transition in said transition order from said pattern regarding which determination was made that said predetermined number of fields from a predetermined number of times earlier fall under, thereby detecting said sequence from said interlaced signals.

10. A non-transitory computer readable medium encoded with a program for causing a computer to perform a method for detecting, from input interlaced signals, a sequence in which same fields are repeated at a predetermined rate, said method comprising:
    calculating a difference evaluation value between each of a predetermined number of input fields to determine a smallest value and a second smallest value of difference evaluation values from among all difference evaluation values between each of the predetermined number of input fields;
    determining whether or not there is movement between the predetermined number of input fields, based on the second smallest value of difference evaluation values, the determining including determining that there is movement between two input fields when a difference between two inputs fields is greater than the second smallest value, and determining that there is no movement between two input fields when the difference between two inputs fields is less than the second smallest value;
    determining whether or not said predetermined number of fields fall under any one of a plurality of patterns classified based on the position of a repeated field in which said same field in said sequence is repeated as to said predetermined number of fields, and have a transition order making transition for each input of a field, based on a still position between fields regarding which determination has been made by said determining that said movement is not present; and
    determining whether or not said pattern, regarding which determination is made that said predetermined number of fields fall under, is making transition in said transition order from said pattern regarding which determination was made that said predetermined number of fields from a predetermined number of times earlier fall under, thereby detecting said sequence from said interlaced signals.

11. A signal processing device for detecting, from input interlaced signals, a sequence in which same fields are repeated at a predetermined rate, said signal processing device comprising:
    still/movement determining means for calculating a difference evaluation value between each of a predetermined number of input fields to determine a smallest value and a second smallest value of difference evaluation values from among all difference evaluation values between each of the predetermined number of input fields, and determining whether or not there is movement between the predetermined number of input fields based on the second smallest value of difference evaluation values, the still/movement determining means determining that there is movement between two input fields when a difference between two inputs fields is greater than the second smallest value, and the still/movement determining means determining that there is no movement between two input fields when the difference between two inputs fields is less than the second smallest value; and
    sequence determining means for determining whether or not said predetermined number of fields fall under any one of a plurality of patterns classified based on the position of a repeated field in which said same field in said sequence is repeated as to said predetermined number of fields, and have a transition order making transition for each input of a field, based on a still position between fields regarding which determination has been made by said still/movement determining means that said movement is not present, and before determining whether or not said pattern, regarding which determination is made that said predetermined number of fields fall under, is making transition in said transition order from said pattern regarding which determination was made that said predetermined number of fields from a predetermined number of times earlier fall under, thereby detecting said sequence from said interlaced signals.

\* \* \* \* \*